(12) United States Patent
Konno et al.

(10) Patent No.: US 8,180,731 B2
(45) Date of Patent: May 15, 2012

(54) APPARATUS AND METHOD FOR COMPUTING EVALUATION VALUES OF CONTENT DATA STORED FOR REPRODUCTION

(75) Inventors: Tatsuya Konno, Tokyo (JP); Susumu Takatsuka, Tokyo (JP); Hideo Tsukazaki, Tokyo (JP); Takashi Kinouchi, Tokyo (JP); Kotaro Asaka, Tokyo (JP); Takashi Kawakami, Tokyo (JP); Yasuharu Seki, Chiba (JP)

(73) Assignee: Sony Corporation, Tokyo (JP)

( * ) Notice: Subject to any disclaimer, the term of this patent is extended or adjusted under 35 U.S.C. 154(b) by 1438 days.

(21) Appl. No.: 11/492,116

(22) Filed: Jul. 25, 2006

(65) Prior Publication Data

US 2007/0091357 A1    Apr. 26, 2007

(30) Foreign Application Priority Data

Aug. 1, 2005  (JP) .............................. P2005-223376

(51) Int. Cl.
*G06F 7/00* (2006.01)
*G06F 17/00* (2006.01)
*G06F 13/14* (2006.01)

(52) U.S. Cl. ..... 707/621; 707/610; 707/620; 369/29.02; 700/168

(58) Field of Classification Search .................. 707/621, 707/626, 999.107, 999.003–9, 999.101, 999.1; 709/232, 248, 219; 386/252, 240–248; 715/727
See application file for complete search history.

(56) References Cited

U.S. PATENT DOCUMENTS

| | | | |
|---|---|---|---|
| 7,647,346 B2 * | 1/2010 | Silverman et al. ...... | 707/999.107 |
| 7,765,326 B2 * | 7/2010 | Robbin et al. ................ | 709/248 |
| 2002/0160749 A1 * | 10/2002 | Nishikawa .................... | 455/408 |
| 2006/0195789 A1 * | 8/2006 | Rogers et al. ................. | 715/727 |

FOREIGN PATENT DOCUMENTS

| | | |
|---|---|---|
| EP | 1 548 740 A2 | 6/2005 |
| EP | 1 548 741 A1 | 6/2005 |
| JP | 2003-317451 | 11/2003 |
| JP | 2003-319366 | 11/2003 |
| JP | 2004-229035 | 8/2004 |
| JP | 2005-38541 | 2/2005 |
| JP | 2005-73190 | 3/2005 |
| JP | 2005-190640 | 7/2005 |

(Continued)

OTHER PUBLICATIONS

U.S. Appl. No. 11/495,694, filed Jul. 31, 2006, Tsukazaki et al.

(Continued)

*Primary Examiner* — Cam-Y Truong
*Assistant Examiner* — Cecile Vo
(74) *Attorney, Agent, or Firm* — Oblon, Spivak, McClelland, Maier & Neustadt, L.L.P.

(57) ABSTRACT

An information-processing apparatus, reproduction apparatus, communication method and computer program are disclosed wherein an evaluation value can be added automatically to contents stored in a storage apparatus or medium. The information-processing apparatus comprising an acquisition section which acquires, from a portable reproduction apparatus which is capable of reproducing contents data, reproduction history information of the contents data in the portable reproduction apparatus. An evaluation value arithmetic operation section arithmetically operates a computed evaluation value corresponding to the content data based on the reproduction history information acquired by the acquisition section. A transfer section transfers the computed evaluation value arithmetically operated by the evaluation value arithmetic operation section to the portable reproduction apparatus.

66 Claims, 27 Drawing Sheets

FOREIGN PATENT DOCUMENTS

JP        2005-243214        9/2005

OTHER PUBLICATIONS

U.S. Appl. No. 11/493,797, filed Jul. 27, 2006, Kinouchi et al.

U.S. Appl. No. 11/495,573, filed Jul. 31, 2006, Kawasaki et al.
Scott Knaster, "Sounds Awesome: Music on Your iPod", Hacking Ipod, XP002324019, Aug. 2004, pp. 1-12.
Troy Dreier, "Apple iPod 30 GB; Apple iTunes 4.0 reviews by PC Magazine", PC Magazine, XP002324018. May 13, 2003, 1 Page.

* cited by examiner

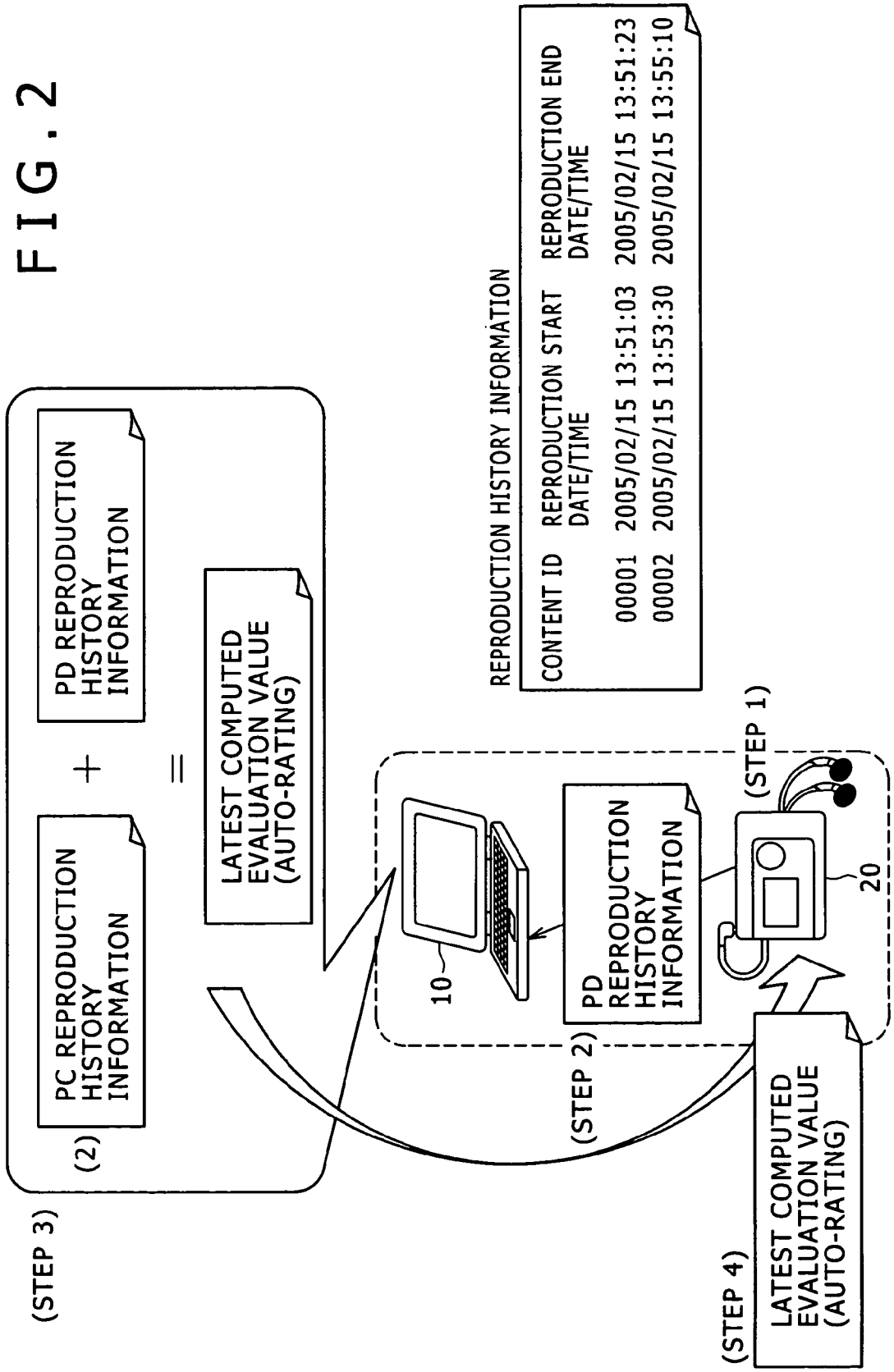

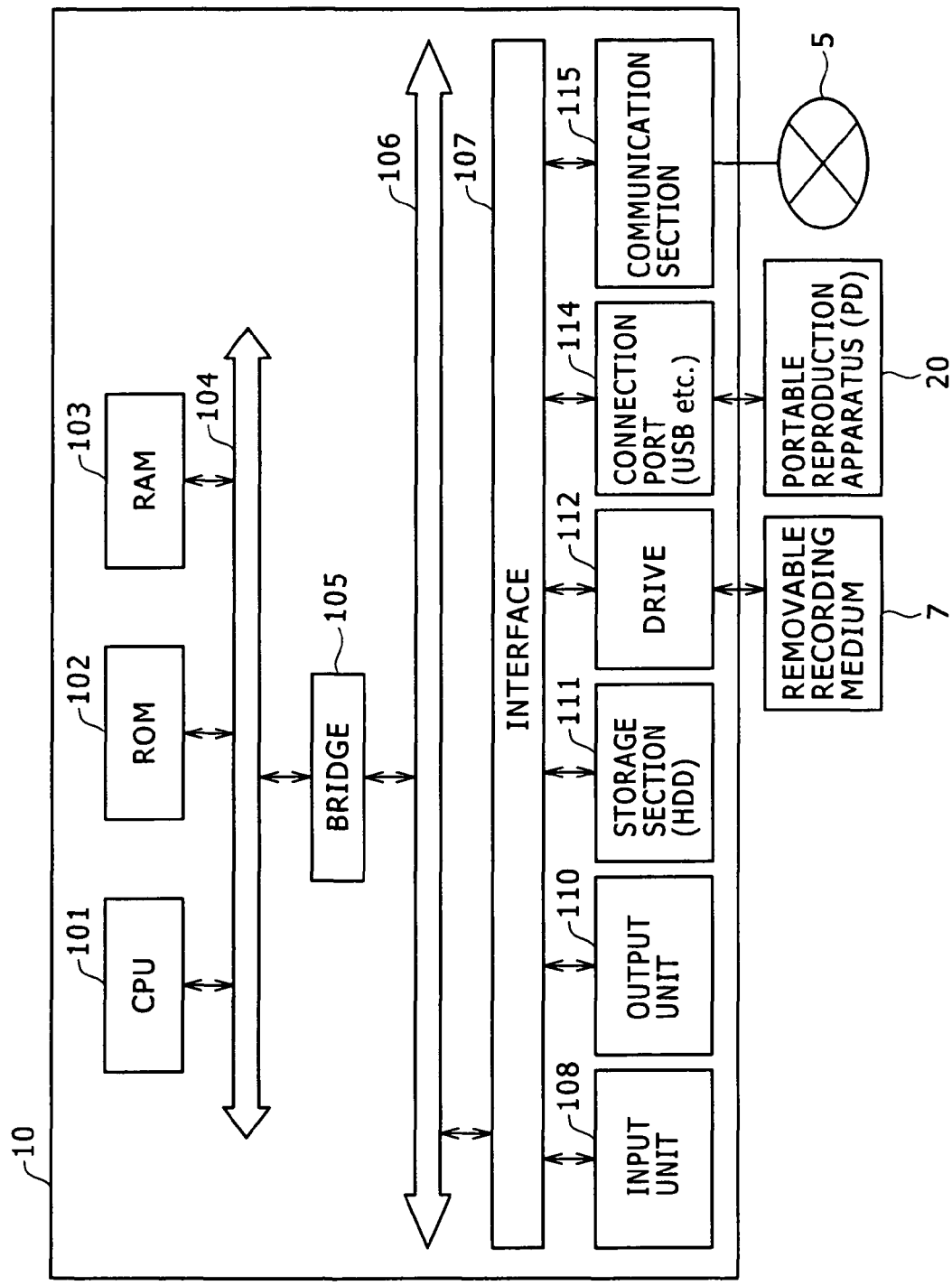

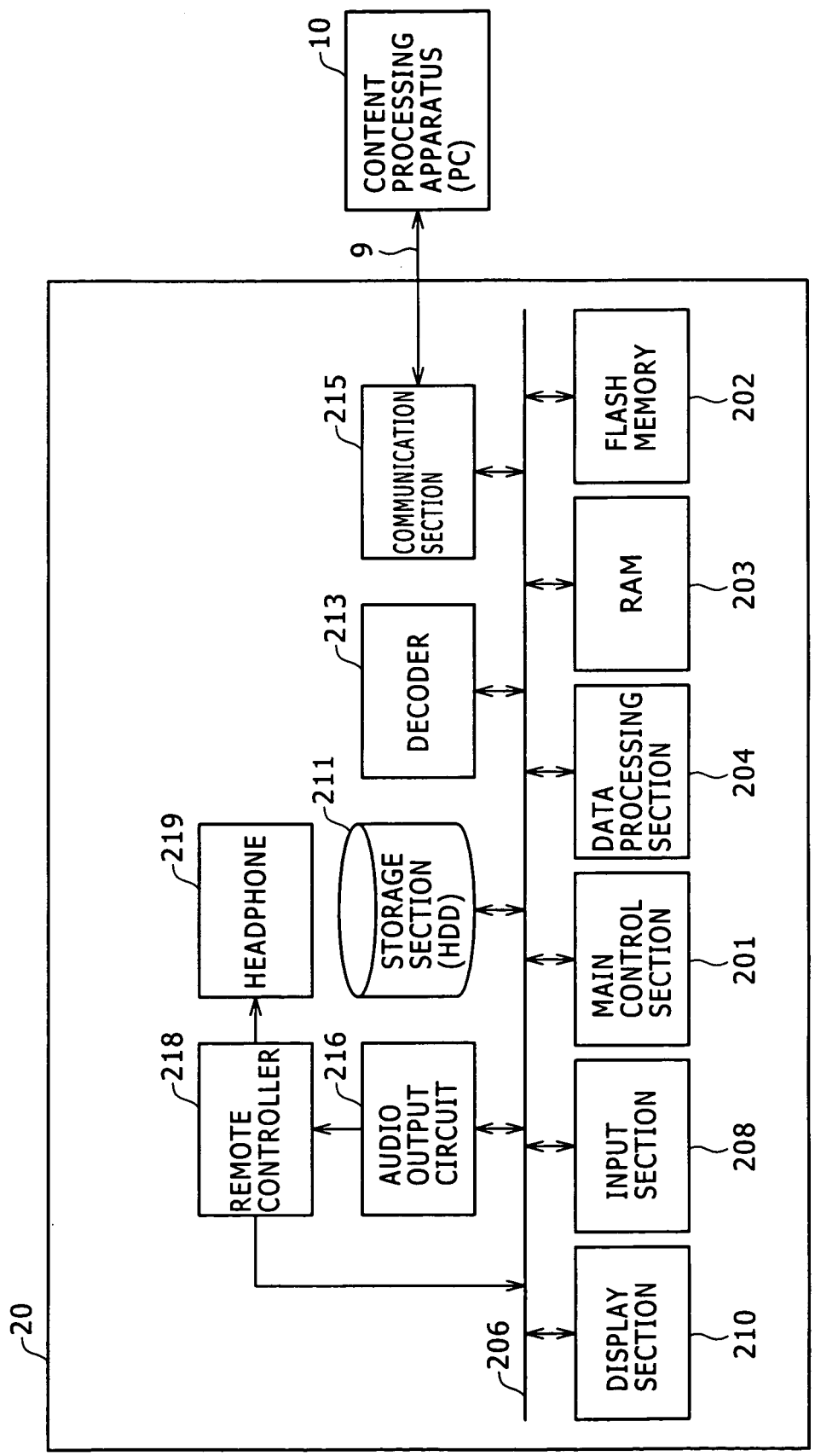

THE LOG IS UPDATED EACH TIME AN EVENT OCCURS

FIG.8

| EVENT ID | PROCESSING SUBSTANCE |
|---|---|
| 00 | START OF A CONTENT |
| 01 | START OF NORMAL REPRODUCTION |
| 02 | START OF STOP OR START OF TEMPORARY STOP |
| 03 | START OF FAST FORWARD |
| 04 | START OF REWIND |

FIG.10

| | |
|---|---|
| ● START ANOTHER MUSICAL CONTENT BY USING Next OR Search | ● Pause |
| — CID CID1<br>— Play t1<br>— Stop t2(Next START)<br>— CID CID2<br>— Play t3(Next COMPLETE) | — CID CID1<br>— Play t1<br>— Stop t2(Pause START)<br>— Play t3(Pause CANCEL) |
| ● REPRODUCTION FROM THE BEGINNING BY USING Prev | ● Rew(FF) |
| — CID CID1<br>— Play t1<br>— Stop t2(Prev START)<br>— CID CID2<br>— Play t3(Prev COMPLETE) | — CID CID1<br>— Play t1<br>— Stop t2(Rew START)<br>— Play t3(Rew CANCEL) |
| | ● TO THE NEXT MUSICAL CONTENT BY Rew(FF) |
| ● Repeat | — CID CID1<br>— Play t1<br>— Stop t2(Rew START)<br>— CID CID2<br>— Play t3(Rew CANCEL) |
| — CID CID1<br>— Play t1<br>— Stop t2<br>— CID CID1<br>— Play t3 | |

FIG.11

<INPUT EVALUATION VALUE SETTING SCREEN>

TITLE (TUNE NAME)
ARTIST NAME
ALBUM NAME
★★

| CONTENT ID | NUMBER OF REPRODUCTIONS | NUMBER OF RESTS | NUMBER OF SKIPS | NUMBER OF REPETITIONS | TOTAL REPRODUCTION DURATION (SECONDS) |
|---|---|---|---|---|---|
| 00001 | 6 | 2 | 1 | 2 | 1789 |
| 00005 | 2 | 0 | 0 | 0 | 210 |
| 13501 | 1 | 1 | 2 | 0 | 280 |
| 70221 | 3 | 0 | 0 | 0 | 564 |
| 00055 | 4 | 1 | 1 | 1 | 855 |
| 00301 | 5 | 2 | 0 | 2 | 1270 |
| 10001 | 3 | 0 | 1 | 1 | 744 |
| 25091 | 2 | 0 | 0 | 0 | 544 |
| 50407 | 2 | 0 | 0 | 1 | 500 |
| ... | ... | ... | ... | ... | ... |

| CONTENT ID (140a) | REPRODUCTION START DATE/TIME (140g) | REPRODUCTION END DATE/TIME (140h) | CONTINUOUS REPRODUCTION DURATION (SECONDS) (140i) |
|---|---|---|---|
| 13501 | 2004/6/6 0:30 | 2004/6/6 2:35 | 225 |
| 13501 | 2004/11/1 20:58 | 2004/11/1 21:06 | 225 |
| 13501 | 2004/11/1 20:57 | 2004/11/1 20:57 | 2 |
| 25091 | 2004/6/9 1:10 | 2004/6/9 1:14 | 234 |
| ⋮ | ⋮ | ⋮ | ⋮ |

FIG.15

<DECREASING AND INCREASING THE POINT COUNT REPRESENTING THE COMPUTED EVALUATION VALUE (AUTO-RATING)>

| | |
|---|---|
| CONTENT REPRODUCED (A PIECE OF MUSIC) CONTINUOUSLY FOR AT LEAST N SECONDS WITHOUT BEING SKIPPED | INCREASED BY 0.2 POINTS |
| CONTENT (A PIECE OF MUSIC) SKIPPED BEFORE THE LAPSE M (= N) SECONDS SINCE THE START OF REPRODUCTION | DECREASED BY 0.1 POINTS |
| CONTENT (TUNE) REGISTERED IN DELETION OBJECT LIST | DECREASED BY 1.0 POINT |

FIG. 17

| | 148b | 148c | 148d | 148e | 148f | 148g | 148h |
|---|---|---|---|---|---|---|---|
| CID | TITLE | ARTIST | ALBUM | GENRE | PLAY TIME (SECONDS) | COMPUTED EVALUATION VALUE (AUTO-RATING) | INPUT EVALUATION VALUE (MANUAL RATING) |
| 00001 | TITLE 9 | ARTIST 5 | ALBUM 6 | GENRE 1 | 225 | 4.2 | 4.0 |
| 00005 | TITLE 1 | ARTIST 1 | ALBUM 1 | GENRE 1 | 234 | 1.8 | 2.0 |
| 13501 | TITLE 4 | ARTIST 3 | ALBUM 3 | GENRE 2 | 199 | 3.0 | — |
| 70221 | TITLE 5 | ARTIST 3 | ALBUM 3 | GENRE 2 | 254 | 5.0 | 5.0 |
| 00055 | TITLE 6 | ARTIST 4 | ALBUM 4 | GENRE 1 | 248 | 5.0 | — |
| 00301 | TITLE 3 | ARTIST 2 | ALBUM 2 | GENRE 1 | 188 | 1.5 | 1.0 |
| 10001 | TITLE 2 | ARTIST 2 | ALBUM 2 | GENRE 1 | 269 | 1 | |
| 25091 | TITLE 8 | ARTIST 5 | ALBUM 5 | GENRE 1 | 201 | 3.0 | 3.0 |
| 50407 | TITLE 7 | ARTIST 5 | ALBUM 5 | GENRE 1 | 267 | 3.0 | 4.0 |
| ... | ... | ... | ... | ... | ... | ... | ... |

140a — 148

FIG.19A

FIG.19B ⇩ REPRODUCTION BY TEN TIMES FOR N SECONDS OR MORE DELETE-COMMAND PRESENT    ⇩ REPRODUCTION BY THREE TIMES FOR N SECONDS OR MORE (+0.2 x 3) REPRODUCTION BY TWO TIMES OR LESS FOR LESS THAN M SECONDS (-0.1 x 2)

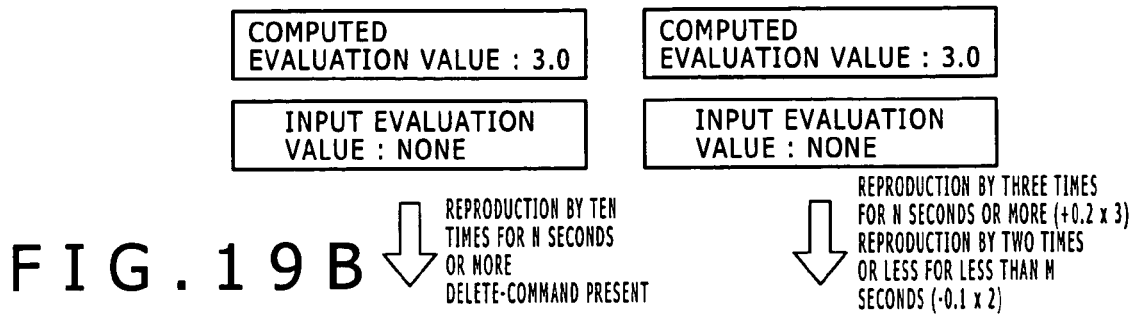

FIG.19C ⇩ INPUT EVALUATION VALUE 4 INPUTTED    ⇩ INPUT EVALUATION VALUE 3 INPUTTED

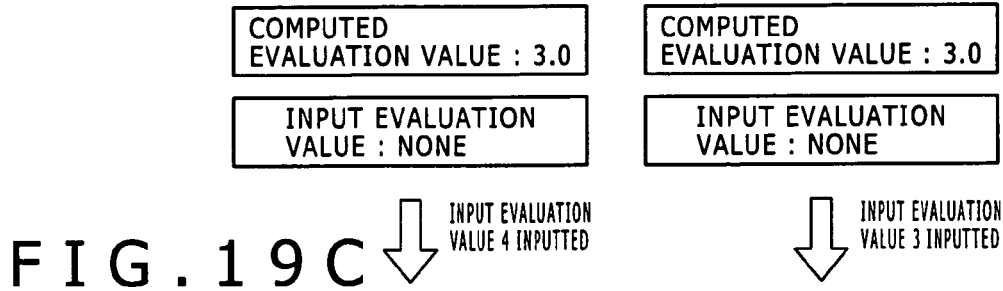

FIG.19D ⇩ CLEARING OF EVALUATION VALUES OF PD, TRANSFER, AFTER CONNECTION OF PC AND PD (+0.2 x 10 - 1.0)    ⇩

FIG.19E ⇩ AVERAGING (SYNCHRONIZATION) OF EVALUATION VALUES OF PC AND PD, (4.0 + 3.4) ÷ 2 = 3.7 (5.0 + 3.0) ÷ 2 = 4.0    ⇩

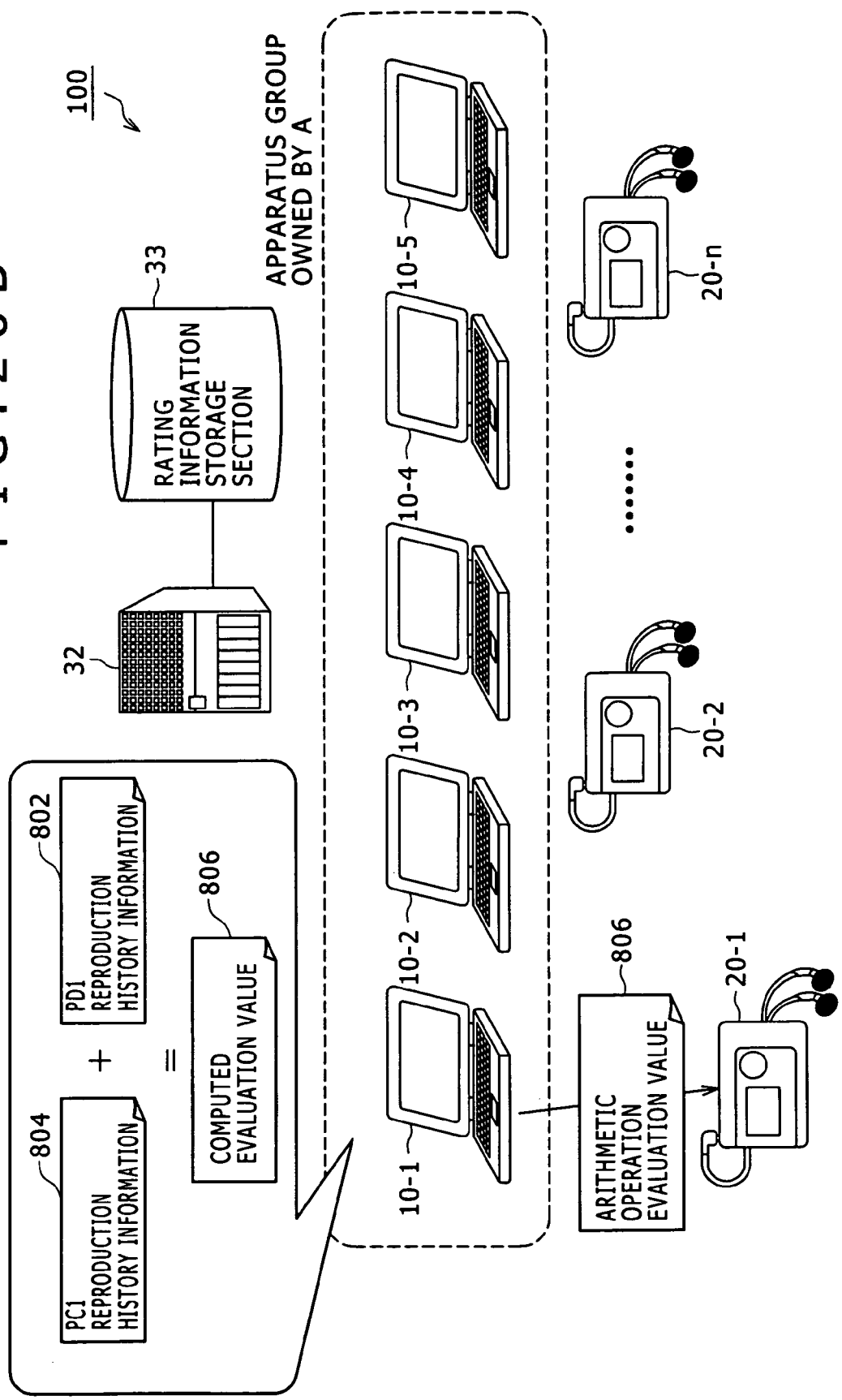

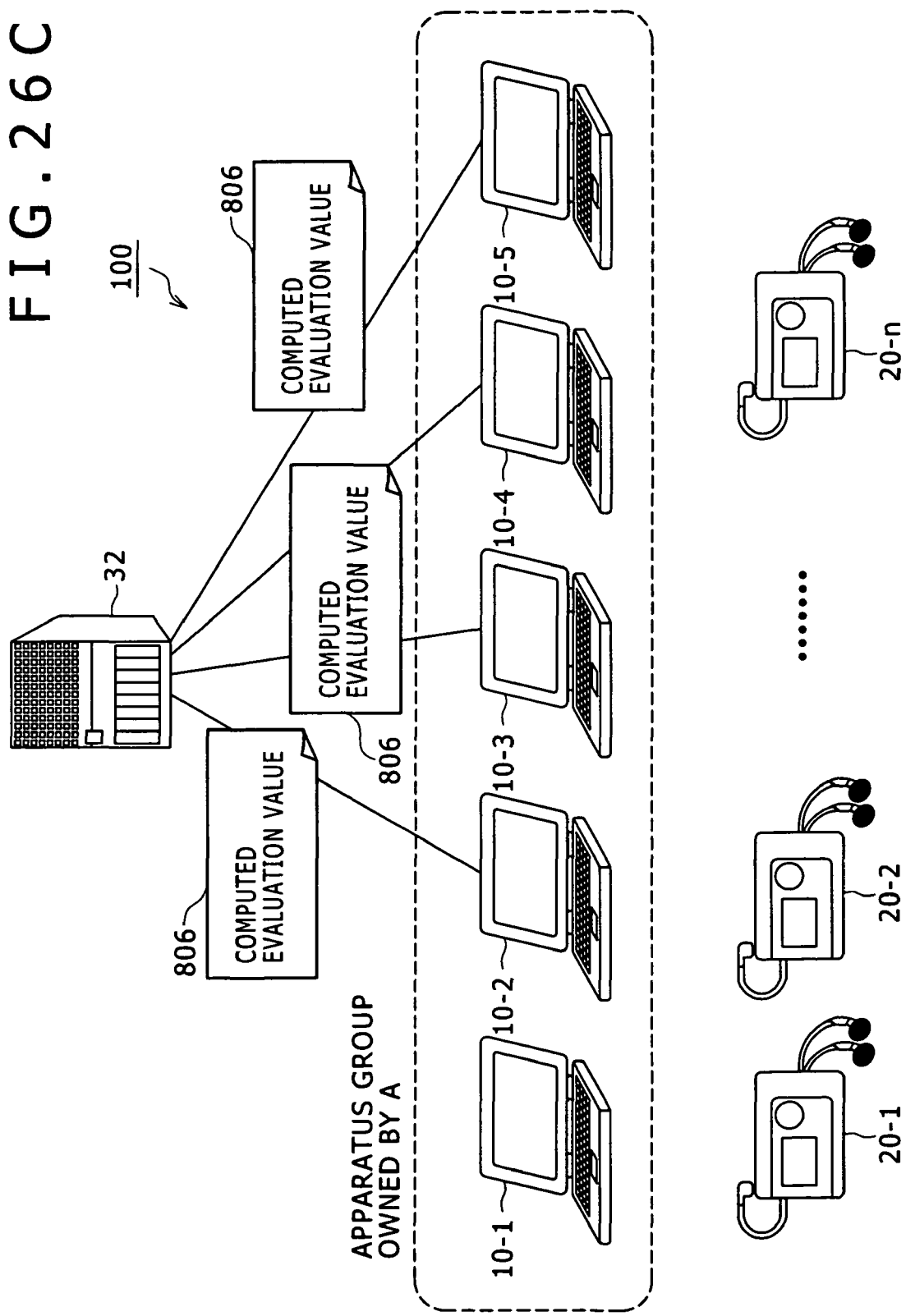

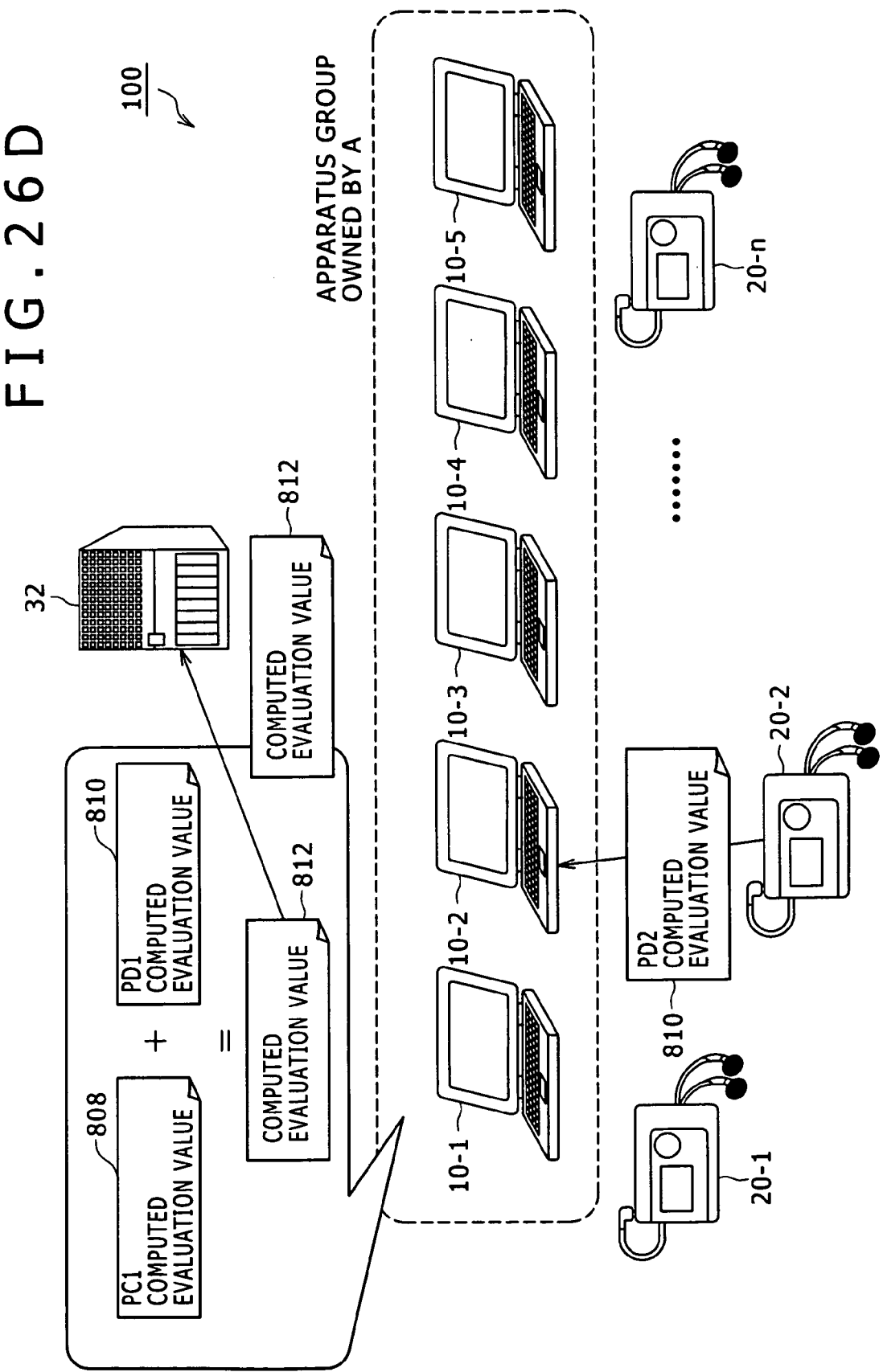

APPARATUS AND METHOD FOR COMPUTING EVALUATION VALUES OF CONTENT DATA STORED FOR REPRODUCTION

CROSS REFERENCES TO RELATED APPLICATIONS

The present invention contains subject matter related to Japanese Patent Application JP2005-223376 filed with the Japanese Patent Office on Aug. 1, 2005 the entire contents of which being incorporated herein by reference.

BACKGROUND OF THE INVENTION

1. Field of the Invention

This invention relates to an information-processing apparatus, a reproduction apparatus, a communication method and a computer program, and more particularly to an information-processing apparatus, a reproduction apparatus, a communication method and a computer program wherein an evaluation value of content data is used.

2. Description of the Related Art

In recent years, a recording and/or reproduction apparatus which includes a large-capacity recording medium such as a hard disk drive (HDD) or a semiconductor memory has been developed as a recording and/or reproduction apparatus for digital content data such as music content data. Such content data is hereinafter referred to simply as "content". As such recording/reproduction apparatus, not only an information-processing apparatus such as a personal computer (PC) in which a large-capacity storage medium can be incorporated readily but also a small-size portable reproduction apparatus (portable device: PD) which is easy to carry have been popularized generally. Such a portable reproduction apparatus as just mentioned can store an increased number of contents together with an increase of the storage capacity of the storage medium and can store, for example, several thousands or several tens of thousands of musical contents.

However, as it becomes possible for a recording and/or reproduction apparatus to store a very large number of contents, it becomes difficult to manage the stored contents. For example, a problem appears that those contents which are not enjoyed any more by the user as a result of a change in the liking of the user or together with the social trend remain stored in the storage medium. Operation of selecting and deleting such contents for every content is cumbersome, and after such operation, those contents which are necessary and those contents which are not necessary remain in a mixed state in the storage medium. Also it is a problem that it is difficult for the user to search a great number of contents for a content conforming to the liking of the user itself to reproduce the content.

Thus, a content data recording and reproduction apparatus which makes it possible to reproduce a content reflecting the liking of the user is disclosed in Japanese Patent Laid-Open No. 2005-38541 (hereinafter referred to as Patent Document 1). According to the apparatus, an evaluation value (evaluation point) of a content is recorded in addition to the content to allow evaluation (rating) of the content.

SUMMARY OF THE INVENTION

However, the apparatus of the prior art disclosed in Patent Document 1 has a problem in that inputting operation of an evaluation value is cumbersome because the user manually operates an apparatus to input the evaluation value of each content, that is, because of manual rating. Therefore, where user inputting is relied upon, it is difficult to add the evaluation value to a great number of contents stored in a storage medium. As a result, management of contents or reproduction conforming to the liking of the user cannot be implemented satisfactorily.

Therefore, it is desirable to provide a novel and improved information-processing apparatus, reproduction apparatus, communication method and computer program wherein an evaluation value can be added automatically to contents stored in a storage apparatus or medium.

According to an embodiment of the present invention, there is provided an information-processing apparatus including an acquisition section configured to acquire, from a portable reproduction apparatus which is capable of reproducing contents data, reproduction history information of the contents data in the portable reproduction apparatus; an evaluation value arithmetic operation section configured to arithmetically operate a computed evaluation value corresponding to the content data based on the reproduction history information acquired by the acquisition section; and a transfer section configured to transfer the computed evaluation value arithmetically operated by the evaluation value arithmetic operation section to the portable reproduction apparatus.

The information-processing apparatus may further include a content storage section configured to storing one or more content data; a reproduction section configured to reproduce the content data stored in the content storage section; a reproduction history production section configured to produce reproduction history information of the content data reproduced by the reproduction section; and an evaluation value recording section configured to record the computed evaluation value arithmetically operated by the evaluation value arithmetic operation section in a coordinated relationship with the content data into an evaluation value storage section; the evaluation value arithmetic operation section being operable to arithmetically operate the computed evaluation value corresponding to the content data based on the reproduction history information in the portable reproduction apparatus acquired by the acquisition section and the reproduction history information produced by the reproduction history production section.

In this instance, the information-processing apparatus may be configured such that the reproduction history production section produces the reproduction history information of the content data reproduced by the reproduction section and records the produced information into the reproduction history storage section; and the evaluation value arithmetic operation section arithmetically operates the computed evaluation value corresponding to the content data based on the reproduction history information in the portable reproduction apparatus acquired by the acquisition section and the reproduction history information recorded in the reproduction history storage section; and then the evaluation value recording section records the computed evaluation value in a coordinated relationship with the content data into the evaluation value storage section.

Or, the information-processing apparatus may be configured such that the evaluation value arithmetic operation section arithmetically operates the computed evaluation value corresponding to the content data based on the reproduction history information produced by the reproduction history production section; and the evaluation value recording section records the arithmetically operated computed evaluation value in a coordinated relationship with the content data into the evaluation value storage section; and then the evaluation value arithmetic operation section arithmetically operates the computed evaluation value corresponding to the content data in the portable reproduction apparatus based on the reproduction history information in the portable reproduction apparatus acquired by the acquisition section and further arithmetically operates a new computed evaluation value corresponding to the content data based on the arithmetically operated computed evaluation value and the computed evaluation value recorded in the evaluation value storage section; whereafter the evaluation value recording section records the new computed evaluation value in a coordinated relationship with the content data into the evaluation value storage section.

In this instance, the information-processing apparatus may be configured such that the acquisition section acquires the reproduction history information in the portable reproduction apparatus and the computed evaluation value stored in the portable reproduction apparatus from the portable reproduction apparatus; and the evaluation value arithmetic operation section arithmetically operates the computed evaluation value corresponding to the content data in the portable reproduction apparatus based on the reproduction history information in the portable reproduction apparatus acquired by the acquisition section and the computed evaluation value stored in the portable reproduction apparatus and further arithmetically operates a new computed evaluation value corresponding to the content data based on the arithmetically operated computed evaluation value and the computed evaluation value recorded in the evaluation value storage section; and then the evaluation value recording section records the new computed evaluation value in a coordinated relationship with the content data into the evaluation value storage section.

Or, the information-processing apparatus may be configured such that, every time the content data is reproduced by the reproduction section, the evaluation value arithmetic operation section arithmetically operates and updates the computed evaluation value corresponding to the content data, and the evaluation value recording section records the updated computed evaluation value into the evaluation value storage section.

The information-processing apparatus may be configured such that, when the content data stored in the content storage section is transferred to the portable reproduction apparatus, the transfer section selectively transfers the content data based on the computed evaluation value of the content data.

Or, the information-processing apparatus may further include a playlist production section configured to produce a playlist in which content identification information corresponding to the content data is listed based on the computed evaluation value stored in the evaluation value storage section.

Or else, the information-processing apparatus may further include an evaluation value transmission section configured to transmit the computed evaluation value stored in the evaluation value storage section to an external apparatus which is capable of providing the content data to the information-processing apparatus.

The information-processing apparatus may further include a registration ID storage section configured to store a device ID of the portable reproduction apparatus for permitting evaluation value arithmetic operation by the evaluation value arithmetic operation section; and wherein the acquisition section acquires the device ID of the portable reproduction apparatus together with reproduction history information of the content data in the portable reproduction apparatus, and the evaluation value arithmetic operation section arithmetically operates the computed evaluation value only when the device ID stored in the registration ID storage section and the device ID acquired by the acquisition section coincide with each other.

The information-processing apparatus may be configured such that a group ID produced in a unit of a user and applied by a group management server as a result of registration of the information-processing apparatus and/or the portable reproduction apparatus into the group management server is stored in the information-processing apparatus and/or the portable reproduction apparatus; and the acquisition section acquires the group ID stored in the portable reproduction apparatus together with the reproduction history information of the content data in the portable reproduction apparatus; and then the evaluation value arithmetic operation section arithmetically operates the computed evaluation value only when the group ID stored in the information-processing apparatus and the acquired group ID coincide with each other.

The information-processing apparatus may further include an evaluation value input section configured to set an input evaluation value corresponding to the content data stored in the content storage section based on a user input; and an evaluation value recording section configured to record the computed evaluation value arithmetically operated by the evaluation value arithmetic operation section and the input evaluation value set by the evaluation value input section in a coordinated relationship with the content data; and wherein the transfer section transfers the computed evaluation value and the input evaluation value stored in the evaluation value storage section to the portable reproduction apparatus.

In this instance, the information-processing apparatus may be configured such that the acquisition section acquires the computed evaluation value and/or the input evaluation value corresponding to the content data stored in the portable reproduction apparatus; and the evaluation value arithmetic operation section executes one or both of a process of arithmetically operating a new computed evaluation value corresponding to the content data based on the computed evaluation value of the content data acquired by the acquisition section and the computed evaluation value of the content data stored in the evaluation value storage section and another process of arithmetically operating a new input evaluation value corresponding to the content data based on the input evaluation value of the content data acquired by the acquisition section and the input evaluation value of the content data stored in the evaluation value storage section; and then the evaluation value recording section records the arithmetically operated new computed evaluation value and/or the acquired new input evaluation value in a coordinated relationship with the content data into the evaluation value storage section; whereafter the transfer section transfers the arithmetically operated new computed evaluation value and/or the acquired new input evaluation value to the portable reproduction apparatus.

The information-processing apparatus may further include a content storage section configured to store one or more content data; and a reproduction section configured to reproduce the content data stored in the content storage section; and wherein the evaluation value arithmetic operation section arithmetically operates the computed evaluation value so that the evaluation of the content data becomes higher every time reproduction of the content data is started by the reproduction section.

The information-processing apparatus may be configured such that the evaluation value arithmetic operation section arithmetically operates a continuous reproduction duration of the content data based on the reproduction history information of the content data and arithmetically operates the computed evaluation value so that the evaluation of the content data whose continuous reproduction duration is equal to or longer than a specific time period becomes higher.

The information-processing apparatus may be configured such that, if the evaluation value arithmetic operation section detects based on the reproduction history information of the content data that the object of reproduction is changed over to a different of the content data within a specific period of time after reproduction of one of the content data is started, then the evaluation value arithmetic operation section updates the computed evaluation value so that the evaluation of the one content data becomes lower.

The information-processing apparatus may be configured such that the evaluation value arithmetic operation section arithmetically operates a continuous reproduction duration of the content data based on the reproduction history information of the content data and arithmetically operates the computed evaluation value so that the evaluation of the content data whose continuous reproduction duration is equal to or shorter than a specific time period becomes lower.

The information-processing apparatus may be configured such that the acquisition section acquires content identification information corresponding to one or more content data designated as an object of deletion on the portable reproduction apparatus from the portable reproduction apparatus; and the evaluation value arithmetic operation section arithmetically operates the computed evaluation value so that the evaluation of the content data corresponding to the content identification information acquired by the acquisition section becomes lower.

The information-processing apparatus may further include a content storage section configured to store one or more content data; a reproduction section configured to reproduce the content data stored in the content storage section; an evaluation value input section configured to set an input evaluation value corresponding to the content data stored in the content storage section based on a user input; and an evaluation value recording section configured to record, where the content data corresponding to the reproduction history information acquired from the portable reproduction apparatus by the acquisition section is stored also in the content storage section, the computed evaluation value of the content data arithmetically operated by the evaluation value arithmetic operation section and the input evaluation value of the content data set by the evaluation value input section in a coordinated relationship with the content data into the evaluation value storage section.

In this instance, the information-processing apparatus may further include a display control section configured to cause a display section to selectively display the computed evaluation value and the input evaluation value regarding the same content data recorded in the evaluation value storage section.

In this instance, the display control section may cause the display section to display the input evaluation value preferentially to the computed evaluation value recorded in the evaluation value storage section.

Or, the information-processing apparatus may be configured such that, if the computed evaluation value is recorded but the input evaluation value is not recorded in the evaluation value storage section regarding specific content data, then the display control section controls the display section to display the computed evaluation value; but, if the input evaluation value regarding the specific content data is set by the evaluation value input section, then the evaluation value recording section records the input evaluation value in a coordinated relationship with the specific content data into the evaluation value storage section and the display control section controls the display section to display the input evaluation value in place of the computed evaluation value.

In this instance, the information-processing apparatus may be configured such that, if, also when the display control section controls the display section to display the input evaluation value corresponding to the specific content data, the reproduction history information of the specific content data is acquired from the portable reproduction apparatus by the acquisition section or reproduction of the specific content data is performed by the reproduction section, then the evaluation value arithmetic operation section arithmetically re-operates the computed evaluation value corresponding to the specific content data based on the reproduction history information of the specific content data acquired by the acquisition section or on the reproduction history information of the specific content data reproduced by the reproduction section, and the evaluation value recording section updates the computed evaluation value stored in the evaluation value storage section to the arithmetically re-operated new computed evaluation value.

The information-processing apparatus may further include a connection detection section configured to detect that the portable reproduction apparatus is connected to the information-processing apparatus; and wherein if it is detected by the connection detection section that the portable reproduction apparatus is connected, then the acquisition section acquires the reproduction history information of the content data in the portable reproduction apparatus from the portable reproduction apparatus and the evaluation value arithmetic operation section arithmetically operates the computed evaluation value corresponding to the content data based on the reproduction history information of the content data in the portable reproduction apparatus acquired by the acquisition section, and the transfer section transfers the computed evaluation value arithmetically operated by the evaluation value arithmetic operation section to the portable reproduction apparatus.

In this instance, the information-processing apparatus may further include a content storage section configured to store one or more content data; a reproduction section configured to reproduce the content data stored in the content storage section; a reproduction history production section configured to produce reproduction history information of the content data by the reproduction section; and an evaluation value recording section configured to record the computed evaluation value arithmetically operated by the evaluation value arithmetic operation section based on the reproduction history information produced by the reproduction history production section into the evaluation value storage section; and wherein, if it is detected by the connection detection section that a continuous connection duration between the portable reproduction apparatus and the information-processing apparatus exceeds a specific time period, then the evaluation value arithmetic operation section arithmetically re-operates the computed evaluation value, which is stored in the evaluation value storage section and corresponds to the content data stored in the portable reproduction apparatus, based on the reproduction history information newly produced by the reproduction history production section, and the transfer section transfers the computed evaluation value arithmetically re-operated by the evaluation value arithmetic operation section to the portable reproduction apparatus.

The information-processing apparatus may be configured such that, after the computed evaluation value arithmetically operated by the evaluation value arithmetic operation section based on the reproduction history information of the content data in the portable reproduction apparatus is transferred to the portable reproduction apparatus by the transfer section, a command is issued to the portable reproduction apparatus to delete the reproduction history information stored in the portable reproduction apparatus.

The information-processing apparatus further include a content storage section configured to store a plurality of content data including content data same as the content data stored in the portable reproduction apparatus; a search list production section configured to produce a list of content identification information corresponding to the plural content data; and an evaluation value recording section configured to record the computed evaluation value arithmetically operated by the evaluation value arithmetic operation section in a coordinated relationship with the content data into the evaluation value storage section; and wherein the search list production section produces a list in which the plural pieces of content identification information are sorted in response to the computed evaluation values stored in the evaluation value storage section.

The information-processing apparatus may further include a content storage section configured to store one or more content data; and a content deletion section configured to delete, when some or all of the content data stored in the content storage section are transferred to the portable reproduction apparatus by the transfer section, some of contents stored in a storage medium corresponding to the portable reproduction apparatus in response to the computed evaluation value of the content data; and wherein the transfer section transfers the content data to be transferred to the portable reproduction apparatus after the content data is deleted by the content deletion section.

In this instance, the deletion section may include a free capacity detection section configured to detect a free capacity of the storage medium corresponding to the portable reproduction apparatus; a comparison section configured to compare the capacity of the content data to be transferred to the portable reproduction apparatus by the transfer section and the free capacity detected by the free capacity detection section; an under-capacity detection section configured to detect an under-capacity where it is decided by the comparison section that the free capacity is insufficient; a selection section configured to select content data corresponding to the under-capacity from within the content data stored in the storage medium corresponding to the portable reproduction apparatus in response to the computed evaluation value of the content data; and a deletion section configured to delete the content data selected by the selection section from the storage medium corresponding to the portable reproduction apparatus.

Or, the information-processing apparatus may be configured such that the content deletion section does not delete the content data, which has been ripped from a removable storage medium and is stored in the content storage section by the information-processing apparatus, from the storage medium corresponding to the portable reproduction apparatus.

According to another embodiment of the present invention, there is provided a reproduction apparatus including a content storage section configured to store one or more content data; a reproduction section configured to reproduce the content data stored in the content storage section; a reproduction history production section configured to produce reproduction history information of the content data reproduced by the reproduction section and record the produced information into a reproduction history storage section; a transfer section configured to transfer the reproduction history information recorded in the reproduction history storage section to an external apparatus in response to a request from the external apparatus; an acquisition section configured to acquire a computed evaluation value of the content data arithmetically operated by the external apparatus at least based on the reproduction history information; and an evaluation value recording section configured to record the computed evaluation value acquired by the acquisition section in a coordinated relationship with the content data into an evaluation value storage section.

The transfer section may transfer a device ID of the reproduction apparatus together with the reproduction history information of the content data to the external apparatus in response to the request from the external apparatus.

The reproduction apparatus may be configured such that a group ID produced in a unit of a user and applied by a group management server as a result of registration of the external apparatus and/or the reproduction apparatus into the group management server is stored in the external apparatus and/or the reproduction apparatus; and the transfer section transfers the group ID stored in the reproduction apparatus together with the reproduction history information of the content data to the external apparatus in response to the request from the external apparatus.

The reproduction apparatus may further include an evaluation value input section configured to set an input evaluation value corresponding to the content data stored in the content storage section in accordance with a user input; and wherein the evaluation value recording section records the computed evaluation value acquired by the acquisition section and the input evaluation value set by the evaluation value input section in a coordinated relationship with the content data into the evaluation value storage section.

In this instance, the reproduction apparatus may further include a display control section configured to control a display section to selectively display the computed evaluation value and the input evaluation value regarding the same content data recorded in the evaluation value storage section.

Further, the display control section may control the display section to display the input evaluation value preferentially to the computed evaluation value recorded in the evaluation value storage section.

Or the reproduction apparatus may be configured such that, if the computed evaluation value is recorded but the input evaluation value is not recorded in the evaluation value storage section regarding specific content data, then the display control section controls the display section to display the computed evaluation value; but, if the input evaluation value regarding the specific content data is set by the evaluation value input section, then the evaluation value recording section records the input evaluation value in a coordinated relationship with the specific content data into the evaluation value storage section and the display control section controls the display section to display the input evaluation value in place of the computed evaluation value.

In this instance, the reproduction apparatus may be configured such that, also in a mode wherein the display control section controls the display section to display the input evaluation value corresponding to the specific content data, the transfer section transfers the reproduction history information of the content data to the external apparatus in response to the request from the external apparatus; and the acquisition section acquires the computed evaluation value of the content data arithmetically operated by the external apparatus based on the reproduction history information; and then the evaluation value recording section records the computed evaluation value acquired by the acquisition section in a coordinated relationship with the content data into the evaluation value storage section.

The reproduction apparatus may be configured such that the transfer section transfers the computed evaluation value and/or the input evaluation value corresponding to the content data stored in the evaluation value storage section to the external apparatus in response to the request from the external apparatus; and the acquisition section acquires a new input evaluation value arithmetically operated by the external apparatus based on the transferred computed evaluation value and the computed evaluation value stored in the external apparatus and/or a new input evaluation value arithmetically operated by the external apparatus based on the transferred input evaluation value and the input evaluation value stored in the external apparatus; and then the evaluation value recording section updates the computed evaluation value and/or the input evaluation value stored in the evaluation value storage section in a coordinated relationship with the content data to the acquired new computed evaluation value and/or the acquired new input evaluation value.

The reproduction apparatus may be configured such that the transfer section transfers the reproduction history information and the computed evaluation value stored in the evaluation value storage section to the external apparatus in response to the request from the external apparatus; and the acquisition section acquires a new computed evaluation value corresponding to the content data arithmetically operated by the external apparatus at least based on the reproduction history information and the transferred computed evaluation value; and then the evaluation value recording section updates the computed evaluation value stored in a coordinated relationship with the content data in the evaluation value storage section to the acquired new computed evaluation value.

The reproduction apparatus may further include a deletion instruction receiving section configured to record, if a deletion instruction of one or more content data stored in the content storage section is received, content identification information corresponding to the content data designated as an object of deletion into a deletion content storage section; and wherein the transfer section transfers the content identification information recorded in the deletion content storage section together with the reproduction history information of the specific content data to the external apparatus in response to the request from the external apparatus.

The reproduction apparatus may be configured such that the reproduction history information stored in the reproduction history storage section is deleted after the computed evaluation value arithmetically operated by the external apparatus based on the reproduction history information is acquired by the acquisition section in response to the transfer of the reproduction history information of the content data by the transfer section.

According to a further embodiment of the present invention, there is provided a communication method for an information-processing apparatus capable of communicating with a portable reproduction apparatus which can reproduce content data, including an acquisition step of acquiring reproduction history information of the content data in the portable reproduction apparatus from the portable reproduction apparatus; an evaluation value arithmetic operation step of arithmetically operating a computed evaluation value corresponding to the content data based on the reproduction history information acquired at the acquisition step; and a transfer step of transferring the computed evaluation value arithmetically operated at the evaluation value arithmetic operation step to the portable reproduction apparatus.

The communication method may further include a reproduction step of reproducing one or more content data stored in a content storage section; a reproduction history production step of producing reproduction history information of the content data reproduced at the reproduction step; and an evaluation value recording step of recording the computed evaluation value arithmetically operated at the evaluation value arithmetic operation step in a coordinated relationship with the content data into an evaluation value storage section; and wherein, at the evaluation value arithmetic operation step, the computed evaluation value corresponding to the content data is arithmetically operated based on the reproduction history information acquired at the acquisition step and the reproduction history information produced at the reproduction history production step.

In this instance, the communication method may be configured such that, at the reproduction history production step, the reproduction history information of the content data reproduced at the reproduction step is produced and recorded into a reproduction history storage section; and at the evaluation value arithmetic operation step, the computed evaluation value corresponding to the content data is arithmetically operated based on the reproduction history information in the portable reproduction apparatus acquired at the acquisition step and the reproduction history information recorded in the reproduction history storage section; and then at the evaluation value recording step, the arithmetically operated computed evaluation value is recorded in a coordinated relationship with the content data in the evaluation value storage section; whereafter, at the transfer step, the arithmetically operated computed evaluation value is transferred to the reproduction apparatus.

Or, the communication method may further include a first evaluation value arithmetic operation step of arithmetically operating a computed evaluation value corresponding to the content data based on the reproduction history information of the content data reproduced at the reproduction step; a first evaluation value recording step of recording the computed evaluation value arithmetically operated at the first evaluation value arithmetic operation step in a coordinated relationship with the content data into the evaluation value storage section; a second evaluation value arithmetic operation step of arithmetically operating a computed evaluation value corresponding to the content data in the portable reproduction apparatus based on the reproduction history information in the portable reproduction apparatus acquired at the acquisition step; a first transfer step of transferring the computed evaluation value arithmetically operated at the second evaluation value arithmetic operation step to the portable reproduction apparatus; a third evaluation value arithmetic operation step of arithmetically operating a new computed evaluation value corresponding to the content data based on the computed evaluation value arithmetically operated at the second evaluation value arithmetic operation step and the computed evaluation value recorded in the evaluation value storage section at the first evaluation value recording step; and a second transfer step of transferring the computed evaluation value arithmetically operated at the third evaluation value arithmetic operation step to the portable reproduction apparatus.

In this instance, every time the content data is reproduced at the reproduction step, the processes at the first evaluation value arithmetic operation step and the first evaluation value recording step may be executed so that the computed evaluation value corresponding to the content data is arithmetically operated and updated.

Or, the communication method may further include a deletion instruction step of issuing an instruction to delete the reproduction history information stored in the portable reproduction apparatus to the portable reproduction apparatus after the process at the first transfer step is performed but before the process at the third evaluation value arithmetic operation step is performed.

The communication method may further include an evaluation value inputting step of setting an input evaluation value corresponding to the content data stored in a content storage section of the information-processing apparatus based on a user input; an evaluation value recording step of recording the computed evaluation value arithmetically operated at the evaluation value arithmetic operation step and the input evaluation value set at the evaluation value inputting step in a coordinated relationship with the content data into the evaluation value storage section; and wherein, at the transfer step, the computed evaluation value and the input evaluation value recorded in the evaluation value storage section are transferred to the portable reproduction apparatus.

The communication method may be configured such that, at the acquisition step, the computed evaluation value and/or the input evaluation value corresponding to the content data stored in the portable reproduction apparatus are acquired from the portable reproduction apparatus; and the evaluation value arithmetic operation step includes one of both of a step of arithmetically operating a new computed evaluation value corresponding to the content data based on the computed evaluation value of the content data acquired at the acquisition step and the computed evaluation value of the content data stored in the evaluation value storage section, and a step of arithmetically operating a new input evaluation value corresponding to the content data based on the input evaluation value of the content data acquired at the acquisition step and the input evaluation value of the content data stored in the evaluation value storage section; at the evaluation value recording step, the arithmetically operated new computed evaluation value and/or the acquired new input evaluation value being recorded in a coordinated relationship with the content data into the evaluation value storage section; at the transfer step, the arithmetically operated new computed evaluation value and/or the acquired new input evaluation value being transferred to the portable reproduction apparatus.

The communication method may further include an evaluation value input step of setting an input evaluation value corresponding to the content data stored in a content storage section of the information-processing apparatus based on a user input; an evaluation value recording step of recording the computed evaluation value arithmetically operated at the evaluation value arithmetic operation step and the input evaluation value set at the evaluation value input step in a coordinated relationship with the content data into the evaluation value storage section; and a display control step of controlling a display section to selectively display the computed evaluation value and the input evaluation value regarding the same content data stored in the evaluation value storage section.

In this instance, at the display control step, the input evaluation value may be displayed preferentially to the computed evaluation value recorded in the evaluation value storage section on the display section.

Or, the communication method may be configured such that, if the computed evaluation value is recorded but the input evaluation value is not recorded in the evaluation value storage section regarding specific content data, then the computed evaluation value is displayed by the display section at the display control step; but, if the input evaluation value regarding the specific content data is set at the evaluation value input step, then the input evaluation value is recorded, at the evaluation value recording step, in a coordinated relationship with the specific content data into the evaluation value storage section, and then at the display control step, the input evaluation value is displayed in place of the computed evaluation value on the display section.

In this instance, the communication method may be configured such that, if, also when the input evaluation value corresponding to the specific content data is displayed on the display section at the display control step, the reproduction history information of the specific content data is acquired from the portable reproduction apparatus at the acquisition step or reproduction of the specific content data stored in a content storage section of the information-processing apparatus is performed at the reproduction step, then the evaluation value arithmetic operation step is executed to arithmetically re-operate the computed evaluation value corresponding to the specific content data based on the reproduction history information of the specific content data acquired at the acquisition step or on the reproduction history information of the specific content data reproduced at the reproduction step, and the evaluation value recording step is executed to update the computed evaluation value stored in the evaluation value storage section to the arithmetically re-operated new computed evaluation value.

The communication method may further include a connection detection step of detecting that the portable reproduction apparatus is connected to the information-processing apparatus; and wherein, if it is detected at connection detection step that the portable reproduction apparatus is connected, then the acquisition step, evaluation value arithmetic operation step and transfer state are executed.

In this instance, the communication method may further include a reproduction step of reproducing one or more content data stored in a content storage section of the information-processing apparatus; a reproduction history production step of producing reproduction history information of the content data reproduced at the reproduction step; an evaluation value recording step of recording the computed evaluation value arithmetically operated at the evaluation value arithmetic operation step based on the reproduction history information of the content data reproduced at the reproduction step into the evaluation value storage section; and a connection time detection step of detecting that a continuous connection duration between the portable reproduction apparatus and the information-processing apparatus exceeds a specific time period; and wherein, if it is detected that the continuous connection duration between the portable reproduction apparatus and the information-processing apparatus exceeds the specific time period, then the evaluation value arithmetic operation step is executed to arithmetically re-operate the computed evaluation value, which is stored in the evaluation value storage section and corresponds to the content data stored in the portable reproduction apparatus, based on the reproduction history information newly produced at the reproduction history production step, and then the transfer step is executed to transfer the arithmetically re-operated computed evaluation value to the portable reproduction apparatus.

The communication method may further include a free capacity decision step of deciding whether or not a storage medium corresponding to the portable reproduction apparatus has a free capacity; a content deletion step of deleting, if it is decided at the free capacity decision step that the storage medium does not have a free capacity, some of the content data stored in the storage medium corresponding to the portable reproduction apparatus in response to the computed evaluation value of the content data; and a step of transferring some or all of the content data stored in a content storage section of the information-processing apparatus to the portable reproduction apparatus.

According to a still further embodiment of the present invention, there is provided a communication method for a reproduction apparatus capable of communicating with an external apparatus, including a reproduction step of reproducing one or more content data stored in a content storage section of the reproduction apparatus; a reproduction history production step of producing reproduction history information of the content data reproduced at the reproduction step and recording the produced information into a reproduction history storage section of the reproduction apparatus; a transfer step of transferring the reproduction history information recorded in the reproduction history storage section to the external apparatus in response to a request from the external apparatus; an acquisition step of acquiring a computed evaluation value of the content data arithmetically operated by the external apparatus at least based on the reproduction history information from the external apparatus; and an evaluation value recording step of recording the computed evaluation value acquired at the acquisition step in a coordinated relationship with the content data into an evaluation value storage section of the reproduction apparatus.

The communication method may further include an evaluation value input step of setting an input evaluation value corresponding to the content data stored in the content storage section in accordance with a user input; and wherein, at the evaluation value recording step, the computed evaluation value acquired at the acquisition step and the input evaluation value set at the evaluation value input step are recorded in a coordinated relationship with the content data into the evaluation value storage section.

In this instance, the communication method may further include a display control step of controlling a display section to selectively display the computed evaluation value and the input evaluation value regarding the same content data recorded in the evaluation value storage section.

Further, at the display control step, the display section may be controlled to display the input evaluation value preferentially to the computed evaluation value recorded in the evaluation value storage section.

In this instance, the communication method may be configured such that, if the computed evaluation value is recorded but the input evaluation value is not recorded in the evaluation value storage section regarding specific content data, then the display section is controlled to display the computed evaluation value at the display control step; but, if the input evaluation value regarding the specific content data is set at the evaluation value input step, then the input evaluation value is recorded in a coordinated relationship with the specific content data into the evaluation value storage section at the evaluation value recording step and the display section is controlled to display the input evaluation value in place of the computed evaluation value at the display control step.

Or, the communication method may be configured such that, also in a mode wherein the display section is controlled to display the input evaluation value corresponding to the specific content data at the display control step, the transfer step, acquisition step and recording step are executed.

The communication method may be configured such that, at the transfer step, the computed evaluation value and/or the input evaluation value corresponding to the content data stored in the evaluation value storage section are transferred to the external apparatus in response to the request from the external apparatus; and, at the acquisition step, a new input evaluation value arithmetically operated by the external apparatus based on the transferred computed evaluation value and the computed evaluation value stored in the external apparatus and/or a new input evaluation value arithmetically operated by the external apparatus based on the transferred input evaluation value and the input evaluation value stored in the external apparatus are acquired; and then, at the evaluation value recording step, the computed evaluation value and/or the input evaluation value stored in the evaluation value storage section in a coordinated relationship with the content data are updated to the acquired new computed evaluation value and/or the acquired new input evaluation value.

The communication method may further include a step of receiving a deletion instruction of one or more content data stored in the content storage section; and a step of recording content identification information corresponding to the content data designated as an object of deletion into a deletion content storage section; and wherein, at the transfer step, the content identification information recorded in the deletion content storage section is transferred together with the reproduction history information of the specific content data to the external apparatus in response to the request from the external apparatus.

The communication method may further include a first transfer step of transferring the reproduction history information of the content data in response to the request from the external apparatus; a first acquisition step of acquiring the computed evaluation value of the content in the reproduction apparatus arithmetically operated based at least on the reproduction history information by the external apparatus; a first recording step of recording the computed evaluation value acquired at the first acquisition step in a coordinated relationship with the content data into the evaluation value storage section; a second transfer step of transferring the computed evaluation value recorded at the first recording step to the external apparatus; a second acquisition step of acquiring, from the external apparatus, a new computed evaluation value corresponding to the content data arithmetically operated by the external apparatus based on the computed evaluation value transferred at the second transfer step and the computed evaluation value stored in the external apparatus; and a second recording step of recording the new computed evaluation value acquired at the second evaluation step in a coordinated relationship with the content data into the evaluation value storage section.

In this instance, the communication method may further include a deletion step of deleting the reproduction history information stored in the reproduction history storage section after the first acquisition step but before the second transfer step.

According to a yet further embodiment of the present invention, there is provided a recording medium on or in which a computer-readable program for a communication process for an information-processing apparatus capable of communicating with a portable reproduction apparatus which can reproduce content data is recorded, the program including an acquisition process of acquiring reproduction history information of the content data in the portable reproduction apparatus from the portable reproduction apparatus; an evaluation value arithmetic operation process of arithmetically operating a computed evaluation value corresponding to the content data based on the reproduction history information acquired by the acquisition process; and a transfer process of transferring the computed evaluation value arithmetically operated by the evaluation value arithmetic operation process to the portable reproduction apparatus.

According to a yet further embodiment of the present invention, there is provided a recording medium on or in which a computer-readable program for a communication process for a reproduction apparatus capable of communicating with an external apparatus is recorded, the program including a reproduction process of reproducing one or more content data stored in a content storage section of the reproduction apparatus; a reproduction history production process of producing reproduction history information of the content data reproduced by the reproduction process and recording the produced information into a reproduction history storage section of the reproduction apparatus; a transfer process of transferring the reproduction history information recorded in the reproduction history storage section to the external apparatus in response to a request from the external apparatus; an acquisition process of acquiring a computed evaluation value of the content data arithmetically operated by the external apparatus at least based on the reproduction history information from the external apparatus; and an evaluation value recording process of recording the computed evaluation value acquired by the acquisition process in a coordinated relationship with the content data into an evaluation value storage section of the reproduction apparatus.

The information-processing apparatus, reproduction apparatus, communication methods and computer programs according to an embodiment of the present invention have the configurations described above. Consequently, the information-processing apparatus can arithmetically operate the evaluation value of a content reproduced by the reproduction apparatus automatically in response to the reproduction history of the content on the reproduction apparatus (auto-rating). Therefore, the evaluation value of a content which is enjoyed frequently increases automatically while the evaluation value of another content which is seldom enjoyed drops automatically. Accordingly, also where a large number of contents are stored in the storage medium, the user can manage the contents efficiently by reproducing a content conforming to the liking of the user itself or by deleting an unnecessary content based on the evaluation value added to the contents. Further, the reproduction history on the reproduction apparatus is arithmetically operated to calculate the evaluation value by the information-processing apparatus, and the calculated evaluation value is transferred to and recorded into the reproduction apparatus. Consequently, also where the reproduction apparatus has a comparatively low processing capacity or is restricted in terms of the battery, the evaluation value of a content can be arithmetically operated rapidly and efficiently. Also the exhaustion of the battery of the reproduction apparatus can be prevented.

In summary, with the information-processing apparatus, reproduction apparatus, communication methods and computer programs according to an embodiment of the present invention, an evaluation value of each of contents stored in a storage apparatus or medium can be added automatically to the stored content.

The above and other features and advantages of the present invention will become apparent from the following description and the appended claims, taken in conjunction with the accompanying drawings in which like parts or elements denoted by like reference characters.

BRIEF DESCRIPTION OF THE DRAWINGS

FIG. 2 is a diagrammatic view schematically illustrating a procedure of arithmetically operating a computed evaluation value in the communication system;

FIG. 4 is a block diagram schematically showing an example of a hardware configuration of an information-processing apparatus according to the embodiment of the present invention;

FIG. 5 is a block diagram schematically showing an example of a hardware configuration of a portable reproduction apparatus according to the embodiment of the present invention;

FIG. 8 is a view illustrating event logs used in the portable reproduction apparatus;

FIG. 10 is a view illustrating a corresponding relationship between reproduction operations and event logs in the portable reproduction apparatus;

FIG. 11 is a view showing a display screen when an input evaluation value is to be inputted and set on the portable reproduction apparatus;

FIGS. 13 and 14 are views illustrating the storage substance of an analysis result storage section shown in FIG. 12;

FIGS. 15 and 16 are views illustrating a particular arithmetic operation method for a computed evaluation value by the information-processing apparatus;

FIG. 17 is a view illustrating the storage substance of a content information storage section shown in FIG. 12;

FIGS. 19A to 19E are diagrammatic views illustrating a variation of a computed evaluation value and an input evaluation value regarding the same content stored in both of the information-processing apparatus and the portable reproduction apparatus in the communication method;

FIGS. 26A to 26D are schematic views illustrating operation of the communication system.

DETAILED DESCRIPTION OF THE PREFERRED EMBODIMENT

Preferred Embodiment

In the following, a communication system, an information-processing apparatus, a reproduction apparatus, a communication method and a computer program according to a preferred embodiment of the present invention are described in detail with reference to the accompanying drawings.

<System Configuration>

First, a general configuration of the communication system 100 according to the present embodiment is described with reference to FIG. 1. It is to be noted that FIG. 1 is a block diagram schematically showing a general configuration of the communication system 100 according to the present embodiment.

Figure 1:
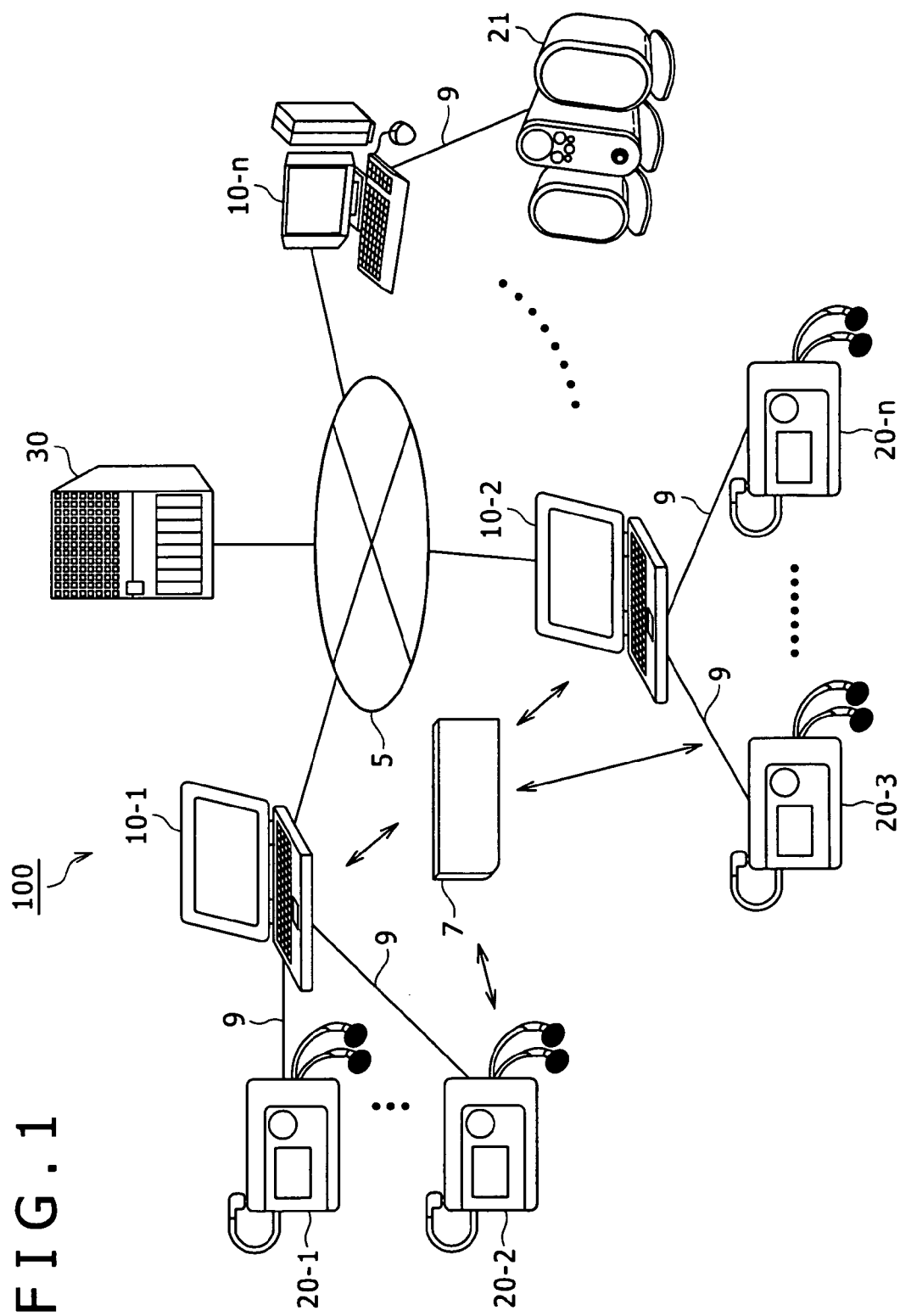
FIG. 1 is a block diagram schematically showing a general configuration of a communication system according to a preferred embodiment of the present invention.

As shown in FIG. 1, the communication system 100 according to the present embodiment includes a plurality of information-processing apparatus 10-1, 10-2, ..., 10-n (in the following description, any of them may be generally referred to as "information-processing apparatus 10" or "PC 10"). The communication system 100 further includes a plurality of portable reproduction apparatus (PD) 20-1, 20-2, ..., 20-n (in the following description, any of them may be generally referred to as "portable reproduction apparatus 20" or "PD 20"). The communication system 100 further includes a stationary reproduction apparatus 21, a distribution server 30, a network 5 and a local line 9 which interconnect the components mentioned, and a removable recording medium 7.

Meanwhile, content data (hereinafter referred to merely as "content") in the present embodiment may be an arbitrary content such as, for example, a sound (Audio) content of music, a lecture, a radio program or the like, an image (Video) content formed from a still picture or pictures or moving pictures which form a movie, a television program, a video program, a photograph, a painting, a chart or the like, an electronic book (E-book), a game or software. In the following description, a music content, particularly a music content distributed from a distribution server or ripped from a music CD, is described as an example of a content. However, the embodiment of the present invention is not limited to such an example as just mentioned. Further, a content in the embodiment of the present embodiment may be, for example, a copyright management object content, that is, a content whose copyright is managed by a copyright management system such as, for example, the check-in check-out system or the group management system or may be a content whose copyright is not managed.

Each information-processing apparatus 10 is a recording and reproduction apparatus which can record and reproduce a content. More particularly, the information-processing apparatus 10 is formed from a computer apparatus (which may be of the notebook type or of the desk top type) such as, for example, a personal computer (hereinafter referred to as "PC"). However, the information-processing apparatus 10 is not limited to any of such examples as just mentioned but may be any apparatus such as, for example, a PDA (Personal Digital Assistant), a game machine for home use, an information appliance or the like only if the apparatus has a communication function through the network 5.

The information-processing apparatus 10 can connect for communication to the distribution server 30, for example, through the network 5. The information-processing apparatus 10 can install, for example, software for a content distribution service and software for a ripped content sharing service. Consequently, the information-processing apparatus 10 can acquire a content (hereinafter referred to as distributed content) distributed from the distribution server 30 and record the distributed content on a recording medium such as a storage apparatus or the removable recording medium 7.

Further, the information-processing apparatus 10 can produce a content newly, for example, by self recording (self sound recording, image recording or the like), ripping or the like and record the content on the storage apparatus or the removable recording medium 7. It is to be noted that the self recording signifies to record images/sound and so forth picked up/collected by an image pickup apparatus/sound collection apparatus provided in the information-processing apparatus 10 itself as video/audio digital data. Meanwhile, the ripping signifies to extract content data (sound data, image data or the like) of the digital type recorded on a recording medium such as a music CD, a video DVD, a software CD-ROM and so forth, convert the content data into data of a file format which can be processed by a computer and record the data on the storage apparatus or the removable recording medium 7.

Each information-processing apparatus 10 can compression-encode the distributed content and the ripped content described above in accordance with a predetermined compression encoding method such as, for example, the ATRAC3 (Advanced Transform Acoustic Coding 3) method or the MP3 (MPEG Audio Layer-3) method, encrypt the content using an encryption method such as the DES (Data Encryption Standard) and record the encrypted content.

Further, the information-processing apparatus 10 transmits and receives the distributed content or the ripped content to and from another information-processing apparatus 10 or a portable reproduction apparatus 20 through the network 5 or the local line 9 or can transfer the distributed content or ripped content through the removable recording medium 7. Consequently, a content can be shared between a plurality of information-processing apparatus 10 and a plurality of portable reproduction apparatus 20 through provision/acquisition of the content.

Each of the portable reproduction apparatus 20 is a portable device (hereinafter referred to as "PD") which is a portable content reproduction apparatus. More particularly, the portable reproduction apparatus 20 is formed, for example, from a portable audio player which includes a hard disk drive (HDD) having a storage capacity of several tens GB or the like. However, the portable reproduction apparatus 20 is not limited to such an example as just described but may be any of various portable apparatus such as a portable video/audio player, a PDA, a portable telephone set and a PHS terminal. Further, a storage medium built in the portable reproduction apparatus 20 or the removable recording medium 7 which can be loaded into the portable reproduction apparatus 20 is not limited to an HDD mentioned hereinabove but may be any recording medium which can be accessed at random such as an optical disk, a magneto-optical disk, a flash memory, a FeRAM or a magnetic memory. It is to be noted that the portable reproduction apparatus 20 may be a machine only for reproduction of a content.

The portable reproduction apparatus 20 can be locally connected to the information-processing apparatus 10, for example, through the local line 9 and can communicate various kinds of data with the information-processing apparatus 10. The local line 9 is formed from a wire cable such as, for example, a USB (Universal System Interface) cable or a SCSI (Small Computer System Interface) cable. It is to be noted that the information-processing apparatus 10 and the portable reproduction apparatus 20 may be configured for data communication with each other by radio communication.

Any of such portable reproduction apparatus 20 as described above can reproduce a content transferred from an information-processing apparatus 10 through the local line 9 or a content provided by the removable recording medium 7.

The stationary reproduction apparatus 21 is formed, for example, from a music recording/reproduction apparatus of the stationary type. The stationary reproduction apparatus 21 has functions substantially same as those of the portable reproduction apparatus 20 described above. In the following, while principally the portable reproduction apparatus 20 are described in detail, the description can be applied also to the stationary reproduction apparatus 21.

The distribution server 30 is formed from a computer apparatus which includes a server function or the like. The distribution server 30 is used to provide a content distribution service. In particular, the distribution server 30 distributes a content to an information-processing apparatus 10 owned by the user through the network 5 in accordance with a distribution request from the information-processing apparatus 10.

The distribution server 30 is, for example, an EMD server which provides an electronic music distribution (EMD) service. The distribution server 30 compression-codes a music content of an object of distribution in accordance with a compression coding method such as, for example, the ATRAC3 method or the MP3 method, encrypts the coded music content in accordance with an encryption method such as the DES and distributes the encrypted music content to the information-processing apparatus 10. Further, the distribution server 30 encrypts a content key for decrypting the distributed content and transmits the encrypted content key to the information-processing apparatus 10 together with the encrypted distributed content. Further, the distribution server 30 performs an accounting process for the user who has purchased the content in response to the distribution of the content.

The network 5 is a communication line network which interconnects the content processing apparatus 10 and the distribution server 30 for bidirectional communication. The network 5 is formed from a public network such as, for example, the Internet, a telephone network or a satellite communication network or a dedicated network such as a WAN, a LAN or an IP-VPN and may be any of a wire network and a radio network.

Further, such a network 5 as described above includes a private network. The private network is a network which interconnects a plurality of information-processing apparatus 10 among which a content is shared within a private use as viewed from a point of view of copyright management. A particular example of such a private network as just mentioned may be, for example, a network which interconnects a plurality of information-processing apparatus 10 used by the same user, a home network used in the same home to interconnect a plurality of information-processing apparatus 10, a LAN which interconnects a plurality of information-processing apparatus 10 used within a limited group (company, friends or the like) of a small scale, or the like.

The removable recording medium 7 is a storage medium which can store various kinds of data such as contents, attribute information of the contents and so forth and may be any of various optical disks such as, for example, a DVD-R, a DVD-RW, DVD-RAM, a CD-R, a CD-RW, and a magneto-optical disk, magnetic disks such as a flexible disk and a hard disk, and various semiconductor memories. It is to be noted that the removable recording medium 7 may be a recording medium with a copyright management function which, for example, uses a cryptographic key or the like to limit copying, reproduction and so forth of a content.

The removable recording medium 7 functions as a content providing/acquiring medium between the information-processing apparatus 10. For example, if the removable recording medium 7 in which a content is written by the information-processing apparatus 10-1 is loaded into any information-processing apparatus 10 so that the content may be read out, then the content can be provided from the information-processing apparatus 10-1 to the information-processing apparatus 10. Further, the information-processing apparatus 10 can provide/acquire a content to and from a content reproduction apparatus 20, which cannot be connected to the network 5, through the removable recording medium 7. Further, the removable recording medium 7 functions also as a providing/acquiring medium of content attribute information between the information-processing apparatus 10. Furthermore, the removable recording medium 7 can be inserted into a content selling terminal (not shown) provided at a location forwardly of a shop or the like and store and provide a content purchased in response to a user operation to an information-processing apparatus 10.

<Outline of the Evaluation Value Adding Method to a Content>

Now, an outline of an evaluation value addition method for each content in the communication system 100 according to the present embodiment is described.

In the communication system 100 according to the present embodiment, an evaluation value (rank) of any of contents possessed by the information-processing apparatus 10 and the portable reproduction apparatus 20 can be arithmetically operated automatically based on reproduction histories of the content of the information-processing apparatus 10 and the portable reproduction apparatus 20 and displayed on the display screen. In the present embodiment, an evaluation value arithmetically operated automatically based on reproduction history information of a content is referred to as "computed evaluation value". Further, to automatically produce a computed evaluation value and coordinate the computed evaluation value with a content is referred to as "auto-rating". In contrast, an evaluation value set based on a user input is referred to as "input evaluation value", and to manually produce an input evaluation value and coordinate the input evaluation value with a content is referred to as "manual rating".

In the auto-rating, it is necessary for the computed evaluation value to reflect a liking of the content to the user. To this end, the computed evaluation value is preferably set such that it has a high value with regard to a content which conforms to the liking of the user (for example, a content whose reproduction frequency is high). On the other hand, with regard to a content which does not conform to the liking of the user (for example, a content whose reproduction frequency is low), the computed evaluation value is set so as to have a low value.

Such auto-rating can be applied, for example, in the following manner. In particular, the computed evaluation value is used (1) as a reference parameter when the user searches for a content, (2) as an index for calculation of profile data to be used to grasp the liking of the user, and (3) as a reference for selection of a content to be deleted in a portable reproduction apparatus 20 from restrictions to the storage capacity when a large number of contents are to be transferred from an information-processing apparatus 10 to the portable reproduction apparatus 20.

Here, a procedure of arithmetically operating a computed evaluation value according to the present embodiment is described roughly with reference to FIG. 2. FIG. 2 is a view schematically illustrating a procedure of arithmetically operating a computed evaluation value according to the present embodiment.

If it is intended to determine a computed evaluation value through auto-rating, then when any of various contents (tunes or pieces of music) is reproduced by a portable reproduction apparatus (PD) 20, reproduction history information (reproduction log) then is recorded on the real time bases (step 1).

The reproduction history information recorded by the portable reproduction apparatus 20 includes, for example, a content ID of the reproduced content and reproduction start date/time data and reproduction end date/time data of the content. It is to be noted that the reproduction history information may otherwise be log data from which such reproduction start date/time data and reproduction end date/time data can be calculated. On the other hand, also an information-processing apparatus 10 produces reproduction history information when a content is reproduced thereon.

In this manner, the portable reproduction apparatus 20 is configured such that it cannot determine the reproduction count number of each content but records reproduction history in response to reproduction of a content. Therefore, the portable reproduction apparatus 20 cannot reflect a change from an unused state to a used state of a content on the real time basis on the display thereon.

Then, when the information-processing apparatus 10 and the portable reproduction apparatus 20 are connected to each other, the reproduction history data are transferred from the portable reproduction apparatus 20 to the information-processing apparatus 10 (step 2). The reproduction history information of the portable reproduction apparatus 20 is erased after it is transferred to the information-processing apparatus 10.

Further, the information-processing apparatus 10 calculates the latest computed evaluation value which reflects the reproduction history of both of the information-processing apparatus 10 itself and the portable reproduction apparatus 20 based on the reproduction history information of the information-processing apparatus 10 and the reproduction history information of the portable reproduction apparatus 20. Thereupon, the information-processing apparatus 10 may sum the reproduction history information of the information-processing apparatus 10 itself and the reproduction history information of the portable reproduction apparatus 20 at the timing at which the reproduction history information from the portable reproduction apparatus 20 is received and then calculate the latest computed evaluation value based on the summed reproduction history information. Or, the information-processing apparatus 10 may reflect the reproduction history information dynamically on the computed evaluation value every time the content is reproduced on the information-processing apparatus 10.

It is to be noted that the timing at which such a transfer process of reproduction history information from the portable reproduction apparatus 20 to the information-processing apparatus 10 and an arithmetic operation process of the computed evaluation value as described above are executed is, for example, immediately after the information-processing apparatus 10 and the portable reproduction apparatus 20 are connected to each other. However, while the information-processing apparatus 10 and the portable reproduction apparatus 20 remain connected to each other continuously, the transfer process and the arithmetic operation process may be executed after every predetermined interval of time (for example, after every one hour). This makes it possible to reflect the reproduction history where the content is reproduced within the predetermined interval of time periodically on the computed evaluation value.

Thereafter, the latest computed evaluation value arithmetically operated in such a manner as described above is transferred from the information-processing apparatus 10 to the portable reproduction apparatus 20 and recorded into the portable reproduction apparatus 20 (step 4). As a result, the portable reproduction apparatus 20 can display the computed evaluation value of the content upon reproduction of the content.

In this manner, according to the auto-rating, reproduction history information is transmitted from the portable reproduction apparatus 20 to the information-processing apparatus 10, and a computed evaluation value is arithmetically operated by the information-processing apparatus 10 and transferred to the portable reproduction apparatus 20. Accordingly, even if a content is reproduced on the portable reproduction apparatus 20, the reproduction history of the content is not immediately reflected on the computed evaluation value on the portable reproduction apparatus 20.

Usually, a reproduction apparatus, particularly the portable reproduction apparatus 20, is restricted in terms of a battery in addition to a low processing capacity of a processor when compared with the information-processing apparatus 10. Accordingly, if it is tried to cause the portable reproduction apparatus 20 to automatically arithmetically operate an evaluation value based on a reproduction history, then there is a problem not only in that much time is required for the arithmetic operation process but also in that the battery is exhausted.

However, in the auto-rating in the present embodiment, the arithmetic operation process of a computed evaluation value is executed by the information-processing apparatus 10 in place of the portable reproduction apparatus 20 and the computed evaluation value of a result of the arithmetic operation is transferred to the portable reproduction apparatus 20. Consequently, the computed evaluation value can be arithmetically operated rapidly, and exhaustion of the battery of the portable reproduction apparatus 20 can be suppressed. However, when the processing capacity of the processor for the portable reproduction apparatus 20 is enhanced, the evaluation value may be arithmetically operated by the portable reproduction apparatus 20.

On the other hand, in the manual rating, not only the information-processing apparatus 10 but also the portable reproduction apparatus 20 can set an input evaluation value based on a user input. Accordingly, the input evaluation value of each content is reflected immediately as attribute information of the content.

Figure 3A:
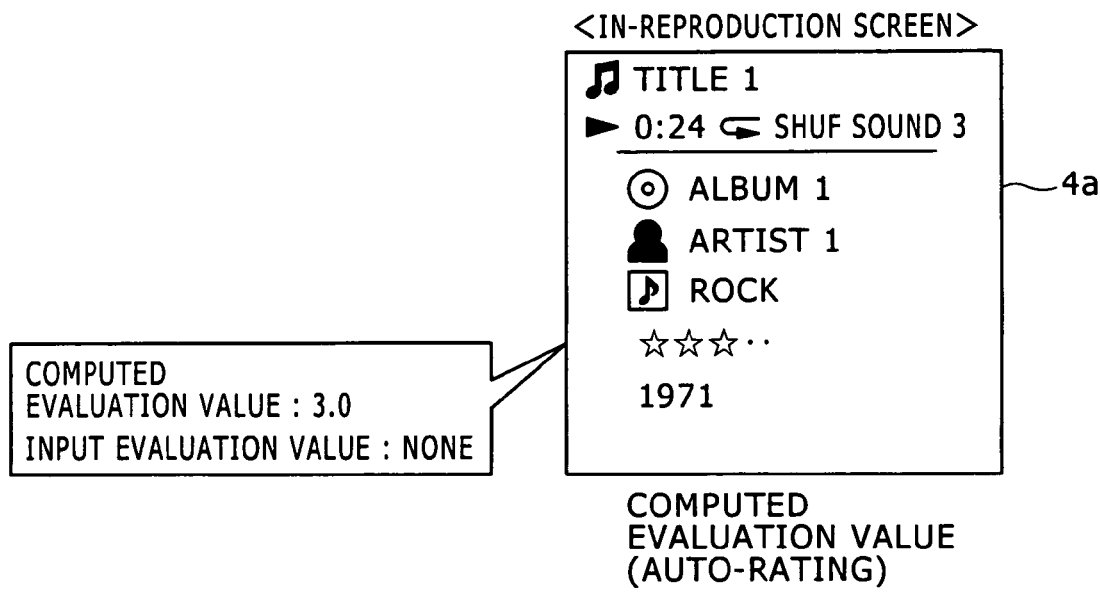
FIGS. 3A and 3B are schematic views showing display screens on which a computed evaluation value and an input evaluation value are displayed, respectively, in the communication system.
Figure 3B:
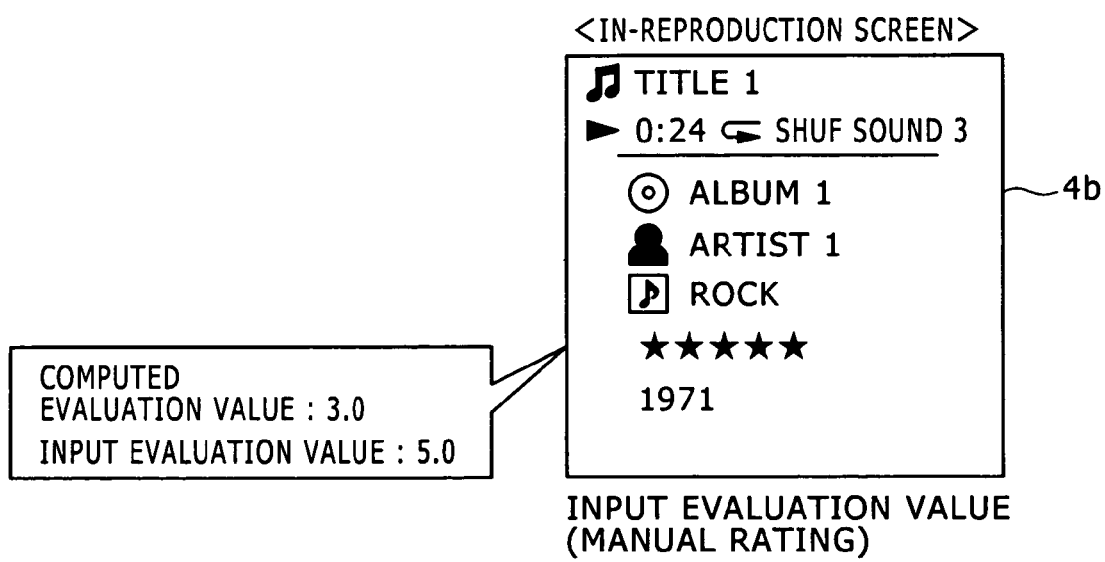

Now, the computed evaluation value and the input evaluation value are described more particularly with reference to FIGS. 3A and 3B. It is to be noted that FIGS. 3A and 3B show a display screen 4a on which a computed evaluation value is displayed and a display screen 4b on which an input evaluation value is displayed, respectively, when a content is reproduced by the portable reproduction apparatus 20.

As seen in FIG. 3A, the computed evaluation value by the auto-rating is displayed, for example, in the form of the number of light star marks "☆" on the display screen 4a. Meanwhile, as seen in FIG. 3B, the input evaluation value by the manual rating is displayed, for example, in the form of the number of dense star marks "★" on the display screen 4b. Consequently, the user can distinguish the two evaluation values from each other. The computed evaluation value by the auto-rating and the input evaluation value by the manual rating are displayed, for example, at one of five stages (from 1 point to 5 points). In the example of FIG. 3A, the computed evaluation value of the content of "title 1" is 3 points, and in the example of FIG. 3B, the input evaluation value of the content of "title 1" is 5 points.

Further, although, when the computed evaluation value is displayed, it is displayed on five stages as described above, it has an actual value, for example, to one decimal (unit of 0.1). Accordingly, for example, an actual computed evaluation value is displayed as an integral number point (0, 1, 2, 3, 4 or 5 points) by counting fractions over ½ as one and disregarding the rest. For example, where the computed evaluation value arithmetically operated is 3.2 points, it is displayed as 3 points.

Further, an initial value of the computed evaluation value can be set freely on the content distribution service side. For example, if the service side does not perform special setting, then the initial value of the computed evaluation value of a content is set, for example, to 3.0. On the other hand, for a content (tune or piece of music) which the label or the service side intends to recommend, for example, a point value higher than 3.0 may be set as an initial value.

On the other hand, in the manual rating, the user can manually set an input evaluation value among five stages from 0 to 5 not only on the information-processing apparatus 10 but also on the portable reproduction apparatus 20. The input evaluation value does not have any value immediately after the content is acquired (for example, immediately after the content is distributed or ripped). Thereafter, if an input evaluation value is inputted based on a user input, then it is kept fixed until after another input evaluation value is inputted later by the user.

Further, if an input evaluation value is inputted and set for a certain content in the manual rating, then the input evaluation value is displayed while the display of a computed evaluation value of the content is eliminated. In other words, for the same content, the input evaluation value is displayed preferentially to the computed evaluation value. Accordingly, the user can normally confirm only one of an input evaluation value and a computed evaluation value on the display screen 4a or the display screen 4b. In particular, where an input evaluation value is set for the content, the input evaluation value is displayed (refer to FIG. 3B), but where an input evaluation value is not set for the content, a computed evaluation value is displayed (refer to FIG. 3A).

By such preferential display of an input evaluation value, cumbersomeness in that a plurality of different evaluation values are displayed with regard to the same content on the same display screen and confusion of the user can be prevented. Besides, an evaluation value which esteems the will of the user can be displayed. However, the display is not limited to the example just described, but the computed evaluation value may otherwise be displayed preferentially to the input evaluation value, or both evaluation values may be displayed on the same screen.

It is to be noted that, also after the input evaluation value is set and displayed, a computed evaluation value by auto-rating continues to be stored and also the arithmetic operation process of the computed evaluation value upon reproduction of the content is successively performed. Further, if the user performs a particular operation, then the display of the input evaluation value by the manual rating may be removed while the computed evaluation value by the auto-rating is displayed again. This makes it possible for the user to confirm the computed evaluation value also after an input evaluation value is set.

Further, in the auto-rating, the reproduction history of the portable reproduction apparatus 20 is read into the information-processing apparatus 10, and the computed evaluation value is arithmetically operated from both of the read-in reproduction history and the reproduction history of the information-processing apparatus 10 by the information-processing apparatus 10. Therefore, an operation performed on the portable reproduction apparatus 20 and having an influence on the auto-rating is not immediately reflected on the display of the computed evaluation value on the portable reproduction apparatus 20. On the other hand, upon the manual rating, the input evaluation value inputted and set newly is reflected immediately on the detailed display screen for each tune on the portable reproduction apparatus 20.

As described above, in the present embodiment, each content can be evaluated based on two different evaluation values including a computed evaluation value in the auto-rating and an input evaluation value in the manual rating. In the following, a configuration for implementing such an evaluation value adding method (rating method) of a content as just described is described in detail.

<Hardware Configuration of the Information Processing Apparatus (PC)>

Now, a hardware configuration of the information-processing apparatus 10 according to the present embodiment is described with reference to FIG. 4. It is to be noted that FIG. 4 is a block diagram schematically showing an example of a hardware configuration of the information-processing apparatus 10 according to the present embodiment.

As shown in FIG. 4, the information-processing apparatus 10 includes, for example, a CPU (Central Processing Unit) 101, a ROM (Read Only Memory) 102, a RAM (Random Access Memory) 103, a host bus 104, a bridge 105, and an external bus 106. The information-processing apparatus 10 further includes an interface 107, an input unit 108, an output unit 110, a storage section (HDD) 111, a drive 112, a connection port 114, and a communication section 115.

The CPU 101 functions as an arithmetic operation processing apparatus and a control apparatus and operates in accordance with various programs to control the components in the information-processing apparatus 10. The ROM 102 stores programs, arithmetic operation parameters and so forth to be used by the CPU 101. The RAM 103 temporarily stores a program to be used for execution by the CPU 101, parameters which vary suitably during the execution and so forth. The CPU 101, ROM 102 and RAM 103 are connected to each other by the host bus 104 formed from a CPU bus or the like.

The host bus 104 is connected to the external bus 106 such as a PCI (Peripheral Component Interconnect/Interface) bus or the like through the bridge 105.

The input unit 108 is formed from inputting elements such as, for example, a mouse, a keyboard, a touch panel, buttons, switches and levers, an input control circuit for producing and outputting an input signal to the CPU 101, and so forth. The user of the information-processing apparatus 10 can operate the input unit 108 to input various data to the information-processing apparatus 10 and issue a command of a processing operation to the information-processing apparatus 10.

The output unit 110 is formed from a display apparatus such as, for example, a CRT (Cathode Ray Tube) display apparatus, a liquid crystal display (LCD) apparatus, lamps or the like and a sound outputting apparatus such as a speaker. The output unit 110 outputs, for example, a reproduced content. In particular, the display apparatus displays various kinds of information such as reproduced video data in the form of a text or an image. Meanwhile, the sound outputting apparatus emits sound of reproduced sound data or the like.

The storage section 111 is an apparatus for data storage formed as an example of a storage section of the information-processing apparatus 10 according to the present embodiment and is formed from, for example, an HDD (Hard Disk Drive)

or the like. The storage section 111 drives the hard disk to store programs to be executed by the CPU 101 and various data.

The drive 112 is a reader/writer for a storage medium and is built in or externally provided for the information-processing apparatus 10. The drive 112 records/reproduces various data of contents, attribute information of the contents and so forth on/from the removable recording medium 7 such as a magnetic disk, an optical disk, a magneto-optical disk or a semiconductor memory loaded in the information-processing apparatus 10.

In particular, the drive 112 reads out data recorded on the removable recording medium 7 and supplies the data to the RAM 103 connected thereto through the interface 107, external bus 106, bridge 105 and host bus 104. The CPU 101 stores the data into the ROM 102, the storage section 111 or the like as occasion demands. Meanwhile, the drive 112 receives data stored in the ROM 102, the storage section 111 or the like, data newly produced or data acquired from an external apparatus from the CPU 101 and writes the data on the removable recording medium 7.

The connection port 114 is a port for connecting an external peripheral apparatus such as, for example, a portable reproduction apparatus 20 and has connection terminals such as USB terminals, IEEE1394 terminals or the like. The connection port 114 is connected to the CPU 101 and so forth through the interface 107, external bus 106, bridge 105, host bus 104 and so forth. By such a connection port 114 as just described, the information-processing apparatus 10 can communicate various data such as a content and attribute information of the content and a control signal through the portable reproduction apparatus 20 and the local line 9. The connection port 114 allows communication connection to a portable reproduction apparatus by any of wire communication and radio connection. For example, the connection portion 114 complies with the Bluetooth, 802.11a/b/g or the like.

The communication section 115 is a communication interface formed from a communication device or the like for connecting, for example, to the network 5. The communication section 115 transmits and receives various data of a content and attribute information of the content, a control signal and so forth to and from an external apparatus such as another information-processing apparatus (PC) 10 or the distribution server 30 through the network 5. The communication interface may comply with the Ethernet or the Giga Ethernet, or may comply, in an environment which allows direct communication with a radio access point, with the Bluetooth, 802.11a/b,g or the like.

It is to be noted that the distribution server 30 has a hardware configuration substantially similar to that of the information-processing apparatus 10, and therefore, overlapping description of the hardware configuration is omitted herein to avoid redundancy.

<Hardware Configuration of the Portable Reproduction Apparatus (PD)>

Now, a hardware configuration of the portable reproduction apparatus 20 according to the present embodiment is described with reference to FIG. 5. It is to be noted that FIG. 5 is a block diagram schematically showing an example of a hardware configuration of the portable reproduction apparatus 20 according to the present embodiment.

As shown in FIG. 5, the portable reproduction apparatus 20 includes, for example, a main control section 201, a flash memory 202, a RAM 203, a data processing section 204, a bus 206, and an input section 208. The portable reproduction apparatus 20 further includes a display section 210, a storage section (HDD) 211, a decoder 213, a communication section 215, an audio output circuit 216, a remote controller 218, and a headphone 219.

The main control section 201 functions as a control apparatus and controls the components of the portable reproduction apparatus 20. The flash memory 202 stores, for example, a program which defines action of the main control section 201 and various data. Meanwhile, the RAM 203 is formed from, for example, an SDRAM (Synchronous DRAM) and temporarily stores various data relating to processes of the main control section 201.

The data processing section 204 is formed from a system LSI or the like and processes data to be transferred in the portable reproduction apparatus 20. The bus 206 is a data line which interconnects the main control section 201, flash memory 202, RAM 203, data processing section 204, input section 208, display section 210, storage section (HDD) 211, decoder 213, communication section 215, audio output circuit 216 and so forth.

The input section 208 and the remote controller 218 are formed from operation elements such as, for example, a touch panel, button keys, levers, dials and so forth, and an input control circuit. The input control circuit produces an input signal in response to an operation of any of the operation elements by the user and outputs the input signal to the main control section 201. The user of the portable reproduction apparatus 20 can input various data or input a processing action command to the portable reproduction apparatus 20 by operating the input section 208 or the remote controller 218 which is hereinafter described.

The display section 210 is formed from, for example, an LCD panel and an LCD control circuit, an organic EL panel and an organic EL control circuit and so forth. The display section 210 displays various kinds of information in the form of a text or an image under the control of the main control section 201. For example, the display section 210 can display attribute information of contents retained in the portable reproduction apparatus 20 such as a title name, an album name, an artist name, an evaluation value and so forth.

The storage section 211 is an apparatus for data storage formed as an example of a storage section of the portable reproduction apparatus 20 according to the present embodiment. The storage section 211 is formed from, for example, a hard disk drive (HDD) having a storage capacity of several tens GB and stores compressed contents, programs of the main control section 201 and various data such as processing data. It is to be noted that, as the storage medium provided in the portable reproduction apparatus 20, a semiconductor memory such as the flash memory 202 or the removable recording medium 7 can be adopted in addition to the hard disk drive.

The decoder 213 performs a decryption process, a decoding process, a surround process, a conversion process into PCM data and so forth of encrypted contents data.

The communication section 215 is formed from a USB controller, a USB terminal and so forth and transmits and receives various data such as a content and attribute information of the content, a control signal and so forth to and from a information-processing apparatus 10 connected through the local line 9 such as a USB cable. The communication section 215 can be connected for communication with an information-processing apparatus by wire communication or radio connection. For example, the communication section 215 includes with the Bluetooth, 802.11a/b,g or the like.

The audio output circuit 216 amplifies analog audio data decoded by the decoder 213 and DA converted by the CPU and outputs the amplified analog audio data to the remote controller 218. The analog audio data are outputted from the remote controller 218 to the headphone 219 and outputted from a speaker built in the headphone 219.

Here, principal data flows in the portable reproduction apparatus 20 having such a hardware configuration as described above are described.

First, a data flow when the portable reproduction apparatus (PD) 20 receives a content from an information-processing apparatus (PC) 10 is described. When the portable reproduction apparatus 20 and the information-processing apparatus 10 are connected to each other by the local line 9 such as a USB cable, the information-processing apparatus 10 recognizes the portable reproduction apparatus 20 as a removable storage medium (HDD). If, in this state, the information-processing apparatus 10 transmits content data and control information to the portable reproduction apparatus 20, then the communication section 215 receive the data. Then, the received content data are stored directly into the storage section 211 by the communication section 215. Meanwhile, the control information received by the communication section 215 is inputted to the main control section 201 via the data processing section 204 and stored into a predetermined storage region.

Now, a data flow when the portable reproduction apparatus (PD) 20 reproduces a content is described. First, a reproduction request of a content is inputted to the main control section 201. Then, if reproduction of the content is permitted by the main control section 201, then the data processing section 204 reads out content data of an object of reproduction from the storage section 211 and transfers the content data to the RAM 203. Further, the data processing section 204 simultaneously and parallelly transfers the content data transferred to the RAM 203 to the decoder 213. Then, the decoder 213 performs a decryption process of a content in en encrypted form, a decoding process, a surround process, a conversion process into PCM data and so forth of the content data and transfers resulting data to the main control section 201. Further, the main control section 201 performs volume adjustment of the PCM data inputted thereto by means of a DA converter (not shown) and converts resulting data into analog audio data, and transfers the analog audio data to an amplifier of the audio output circuit 216. The audio output circuit 216 outputs the analog audio data from the headphone 219 through the remote controller 218.

<Functional Configuration of the Portable Reproduction Apparatus (PD)>

Figure 6:
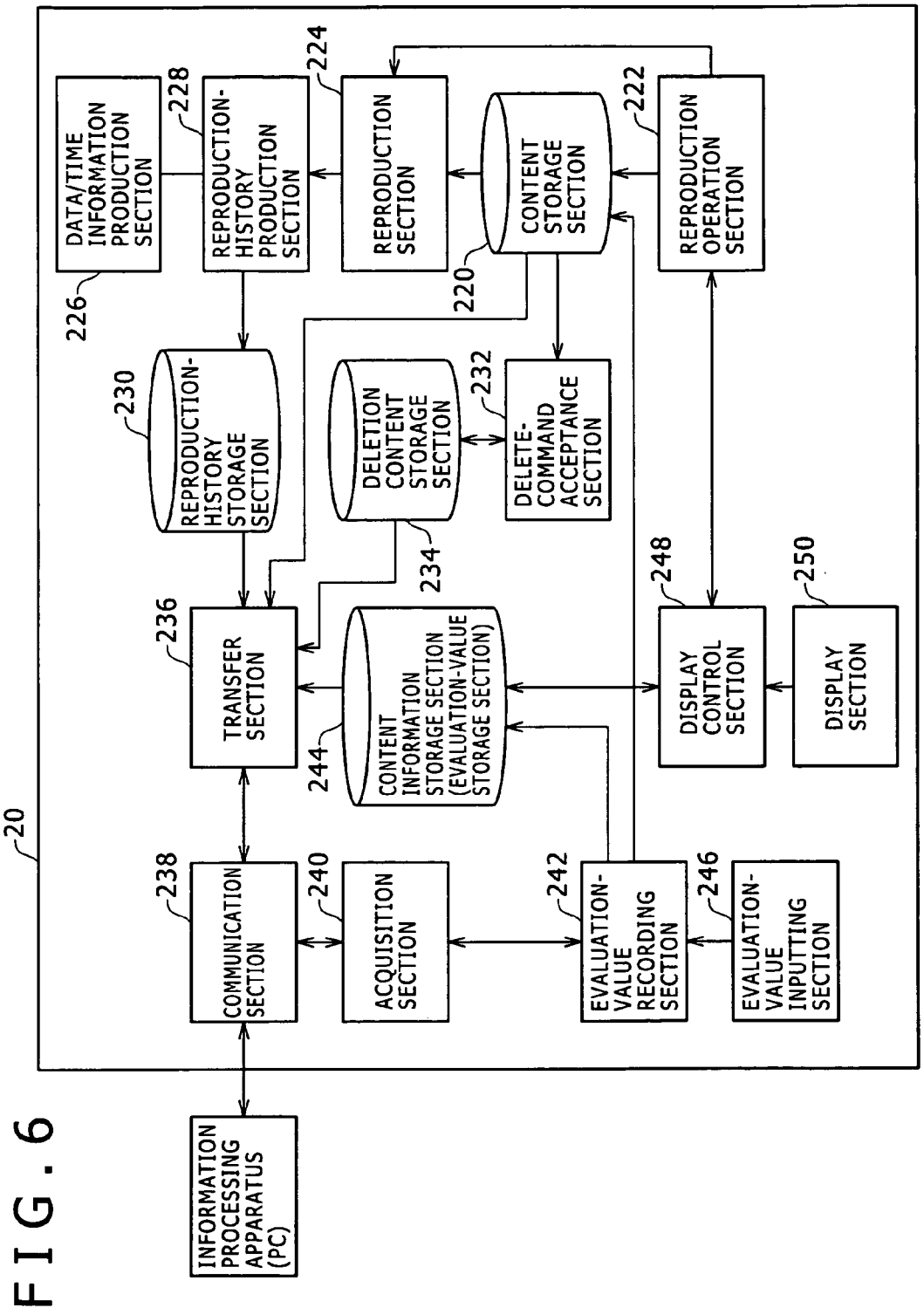
FIG. 6 is a block diagram schematically showing a functional configuration of the portable reproduction apparatus.

Now, principal functions of the portable reproduction apparatus 20 according to the present embodiment are described with reference to FIG. 6. FIG. 6 is a block diagram schematically showing functions of the portable reproduction apparatus 20 according to the present embodiment.

Referring to FIG. 6, the portable reproduction apparatus 20 includes, as principal components thereof, for example, a content storage section 220, a reproduction operation section 222, a reproduction section 224, a date/time information production section 226, a reproduction-history production section 228, and a reproduction-history storage section 230. The portable reproduction apparatus 20 further includes, as principal components thereof, a delete-command acceptance section 232, a deletion content storage section 234, a transfer section 236, a communication section 238, and an acquisition section 240. The portable reproduction apparatus 20 further includes, as principal components thereof, an evaluation-value recording section 242, a content information storage section (evaluation-value storage section) 244, an evaluation-value input section 246, a display control section 248 and a display section 250.

The content storage section 220 is formed from a recording medium such as, for example, the storage section 211 such as an HDD, the flash memory 202 or the removable recording medium 7, and has a function of storing a plurality of contents therein. To each of the contents stored in the content storage section 220, a content ID for uniquely identifying the content is added. The contents stored in the content storage section 220 may include contents transferred to the portable reproduction apparatus 20 from an information-processing apparatus 10 and contents acquired through the removable recording medium 7. Further, the contents stored in the content storage section 220 may be acquired from an external apparatus such as the distribution server 30 or another portable reproduction apparatus 20.

The reproduction operation section 222 accepts a reproduction operation for a content inputted by the user through the input section 208 provided on the portable reproduction apparatus 20 and provides information of the accepted reproduction operation to the reproduction section 224. Reproduction operations which can be inputted by the user may include operations for causing the portable reproduction apparatus 20 to execute, for example, selection of a content to be reproduced, reproduction of the selected content, fast feeding of the content being reproduced, rewinding of the content being reproduced, stopping (including temporary stopping or pause) of the reproduction of the content being reproduced, skipping of the content being reproduced and so forth. The skipping of the content being reproduced signifies to perform a rewinding operation or a fast feeding operation while one content is being reproduced to change over the object of reproduction from the one content to another content.

The reproduction section 224 has a function of reproducing a content stored on the content storage section 220. The reproduction section 224 acquires information of a reproduction operation from the reproduction operation section 222 and performs a process for a content based on the acquired information of the reproduction operation. The process for a content to be executed by the reproduction section 224 includes reproduction of the content, fast feeding of the content being reproduced, rewinding of the content being reproduced, stopping of the reproduction of the content being reproduced and so forth. If the reproduction section 224 starts any of such processes for a content, then it notifies the reproduction-history production section 228 of the start of the process (in the following description, a start of a process for a content by the reproduction section 224 is sometimes referred to also as occurrence of an event). When the notification of occurrence of an event is to be issued, the reproduction section 224 provides the reproduction-history production section 228 with the type of the started process (the type of a started process such as reproduction of the content, fast feeding of the content being reproduced, rewinding of the content being reproduced, stopping of the reproduction of the content being reproduced and so forth is sometimes referred to also as event type) and identification information (for example, a content ID) of the content of the object of processing.

The date/time information production section 226 produces information of the date and hour. More particularly, the date/time information production section 226 acquires the date and hour from a built-in clock of the portable reproduction apparatus 20 and produces date/time information which includes the date and hour. The date/time information production section 226 produces date/time information in accordance with a request from the reproduction-history production section 228 and outputs the produced date/time information to the reproduction-history production section 228.

The reproduction-history production section 228 has a function of producing reproduction history information representative of the substance of a process for a content by the reproduction section 224 and recording the produced reproduction history information. More particularly, the reproduction-history production section 228 has a function of producing an event log in response to a process for a content performed by the reproduction section 224 and writing the produced event log into the reproduction-history storage section 230. It is to be noted that the event log corresponds to reproduction history information in the present embodiment.

More specifically, the reproduction-history production section 228 receives a notification of occurrence of an event from the reproduction section 224. When the notification of occurrence of an event is received, the reproduction-history production section 228 acquires date/time information from the date/time information production section 226 and produces an event log wherein the acquired date/time information, an event type included in the notification of occurrence of the event and the content ID of the processing object are coordinated with each other. Then, the reproduction-history production section 228 writes the produced event log into the reproduction-history storage section 230 such that event logs are arranged in a time series.

The reproduction-history storage section 230 is formed from, for example, the storage section 211 such as an HDD, the flash memory 202 or the like and stores an event log (reproduction history information) produced by the reproduction-history production section 228.

Figure 7A:
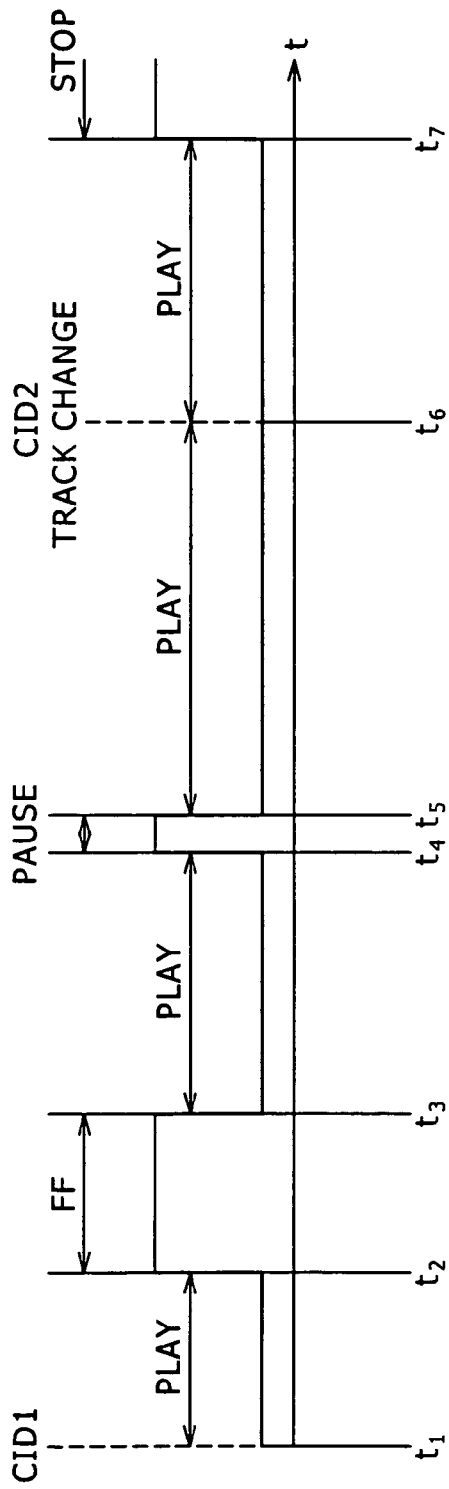
FIGS. 7A and 7B are diagrammatic views illustrating a relationship between event logs and reproduction operations of the portable reproduction apparatus.
Figure 7B:
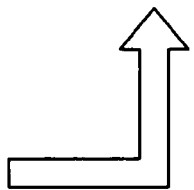

Here, an event log is described in detail with reference to FIGS. 7A to 10. FIGS. 7A and 7B illustrate a relationship between reproduction operations and event logs. Reference characters "CID1" and "CID2" in FIGS. 7A and 7B denote each a content ID, "Play" denotes reproduction of the content, "FF" fast feeding of the content being reproduced, "Pause" temporary stopping of the content being reproduced, and "Stop" stopping of the content being reproduced. Further, reference character t in FIGS. 7A and 7B denotes lapse of time, and t1 to t7 denote each the date and hour at which an event based on a reproduction operation occurs.

First, reproduction operations by the user and processes of the reproduction section 224 performed in response to the reproduction operations are described with reference to FIG. 7A. According to the example of FIG. 7A, the user would first input a command to reproduce the content CID1 through the portable reproduction apparatus 20, and the reproduction section 224 starts reproduction of the content CID1 in accordance with the command. Then, during the reproduction of the content CID1, the user would input a command to the portable reproduction apparatus 20 at time (date and hour) t1 to fast feed the content CID1, and the reproduction section 224 starts fast feeding of the content CID1 in accordance with the command at time t2. Then, if the user cancels the fast feeding command, then the reproduction section 224 starts reproduction of the content CID1 again at the point of time at which the command is canceled, that is, at time t3.

Then, during reproduction of the content CID1, the user would input a command to the portable reproduction apparatus 20 to temporarily stop the content being reproduced. In accordance with the command, the reproduction section 224 starts stopping of the reproduction of the content CID1 at time t4. If the user cancels the command for temporary stopping, then the reproduction section 224 starts reproduction of the content CID1 again at the point of time at which the command is canceled, that is, at time t5. Thereafter, the reproduction section 224 starts reproduction of the content COID2 at time t6 without receiving a command of the user. This indicates that the reproduction of the content CID1 is performed up to the last end of the content data which form the content CID1, and thereafter, reproduction of the content CID2 which is to be reproduced next to the content CID1 in order is started automatically. Then, during the reproduction of the content CID2, the user would input a command to the portable reproduction apparatus 20 to stop the reproduction of the content being reproduced. In accordance with the command, the reproduction section 224 starts stopping of the reproduction of the content CID2 at time t7.

As described above, the reproduction section 224 starts a process for a content in response to a reproduction operation of the content by the user. Then, after the reproduction section 224 starts a certain process (which is referred to as first process) in response to the command of the user, it continuously performs the first process for a time until a next process (which is referred to as second process) is started in response another command of the user. In short, the reproduction section 224 performs a reproduction process from time t1 to time t2, a fast feeding process from time t2 to time t3, another reproduction process from time t3 to time t4, a stopping process from time t4 to time t5, and a further reproduction process from time t5 to time t7.

Starting of each process by the reproduction section 224 is conveyed as occurrence of an event to the reproduction-history production section 228. Then, an event log is produced for every occurrence of an event by the reproduction-history production section 228 and is recorded into the reproduction-history storage section 230. The event log is produced in one record for each one event, and such event logs are recorded in a time series in an occurring order. Also a content ID is included in each event log in order to allow identification of a content of a processing object. Event logs produced based on occurrence situations of the events illustrated in FIG. 7A are illustrated in FIG. 7B. Referring to FIG. 7B, event logs denoted by Record #1 to Record #9 are produced corresponding to occurrence of the events. The event logs Record #1 and Record #7 are records for specifying the contents of the processing object. Records in each of which a date and hour (t1 to t7) at which an event occurs and an event type (PLAY, FF, STOP or the like) are placed are recorded in order of the date and hour of occurrence of the events next to the record in which the content ID is placed.

Figure 9:
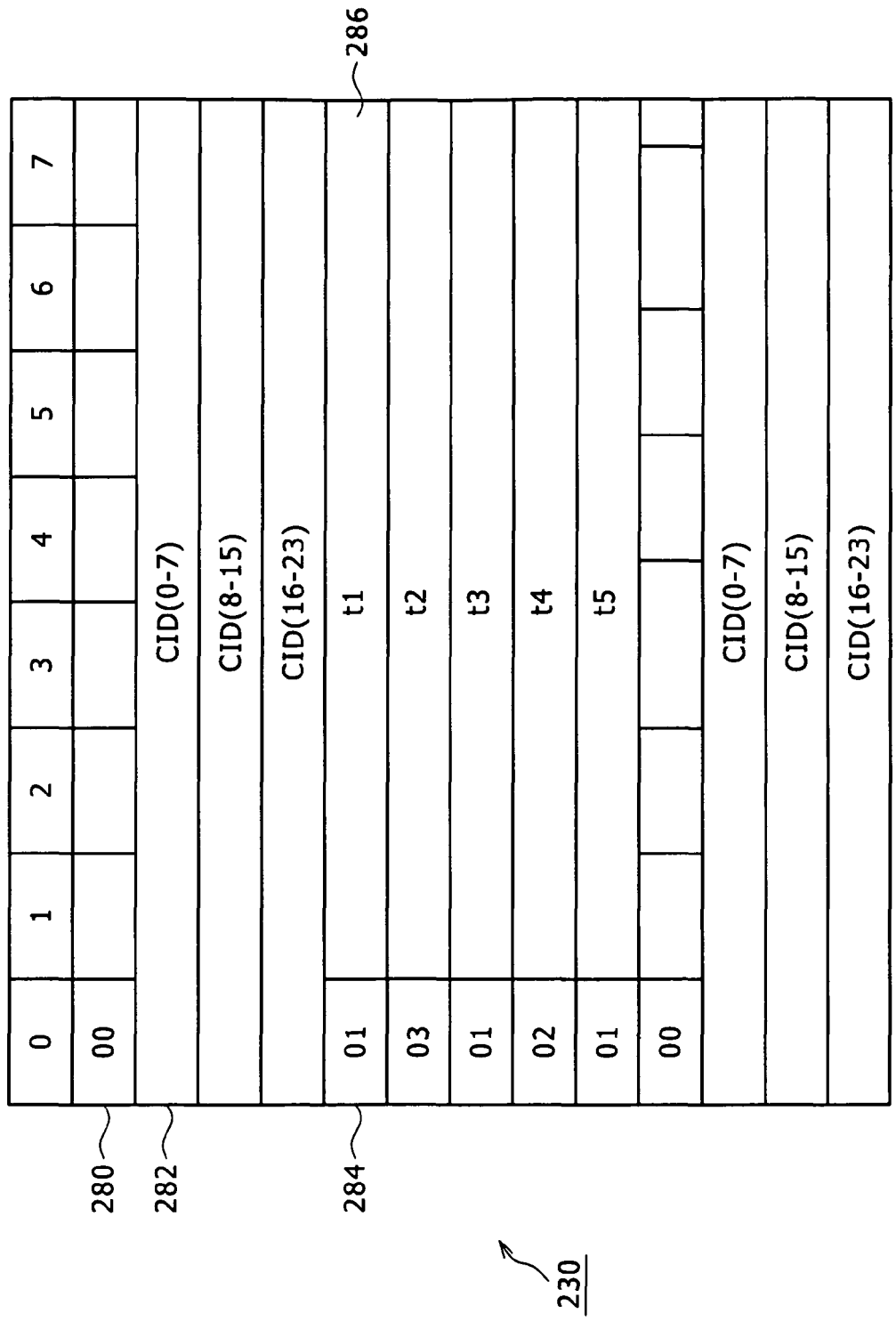
FIG. 9 is a view illustrating an example of a format of the event logs.

FIG. 9 illustrates an example of a data format of an event log stored in the reproduction-history storage section 230 and illustrates an example of records where the event logs illustrated in FIG. 7B are stored in the data format in the reproduction-history storage section 230. Referring to FIG. 9, the event logs are stored in a unit of 8 bytes in the reproduction-history storage section 230. An event ID is placed in the first byte (reference 280, 284 and so forth), and a content ID (reference numeral 282) or date/time information (reference numeral 286) is placed next to the event ID.

An event ID is described with reference to FIG. 8. An event ID is an ID which indicates a type of the event. As seen in FIG. 8, each event ID 270 is coordinated with processing substance 272, and the event ID "00" indicates a start of a content; "01" reproduction of the content; "02" stopping of reproduction; "03" fast feeding; and "04" rewinding. FIGS. 7B and 9 are referred to based on the coordination.

The event log Record #1 in FIG. 7B corresponds to the event ID "00" placed in the first byte and a content ID 282 placed next to the first byte in FIG. 9. It is to be noted that, in the example illustrated, the content ID is formed from 24 bytes, and therefore, the second to eighth bytes in the record of 8 bytes in which the event ID "00" is placed are left blank and the succeeding 3 records (8 bytes×3=24 bytes) are used to place the content ID.

The event log Record #2 in FIG. 7B corresponds, in FIG. 9, to the event ID "01" (reference numeral 284) placed in the first byte and date/time information t1 (reference numeral 286) placed next to the event ID. The date/time information is placed using 7 bytes from the second to the eighth bytes of one record formed from 8 bytes.

The event log Record #3 in FIG. 7B corresponds, in FIG. 9, to the event ID "03" placed in the first byte and date/time information t2 placed next to the event ID. Thereafter, the event logs Record #4 to Record #9 in FIG. 7B are stored in the format illustrated in FIG. 9 in the reproduction-history storage section 230.

FIG. 10 illustrates operation categories each representing a reproduction operation carried out by the user and each coordinated with an event log generated for the reproduction operations represented by the category. The portable reproduction apparatus 20 includes typically buttons serving as a command input section. By operating one of the buttons, the user is capable of giving a Next, Search, Prev, Repeat, Pause, Rew or FF command to the portable reproduction apparatus 20. The Next command given in the course of reproduction of a content is used to reproduce the next content included in a reproduction order as a content immediately following the content currently being reproduced. The Search command is used to reproduce a content found in a search process. The Prev command given in the course of reproduction of a content is used to reproduce the immediately preceding content included in a reproduction order as a content immediately preceding the content currently being reproduced. The Repeat command given in the course of reproduction of no content is used to reproduce a content most recently reproduced. On the other hand, the Repeat command given in the course of reproduction of a content is used to again reproduce the content currently being reproduced. The Pause command is a command to temporarily stop reproduction of a content being reproduced currently. The Rew command is used to rewind a content being reproduced currently. The FF command is used to fast forward a content being reproduced currently.

The Rew command to the immediately preceding content in FIG. 10 is used to rewind a content being reproduced currently and then switch the object of reproduction from the content being reproduced to another content immediately preceding the content being reproduced. By the same token, the FF command to the immediately following content is used to fast feed a content being reproduced currently and then switch the object of reproduction from the content being reproduced to another content immediately following the content being reproduced. In other words, the Rew command to the immediately preceding content and the FF command to the immediately following content correspond each to a command issued by the user to skip a content currently being reproduced.

If the Next or Search command is issued by a reproduction operation of the user, then stopping (Stop) of reproduction of the content (CID1) being reproduced is recorded as an event log, and then the content ID (CID2) of the content designated by the Next or Search command is recorded, whereafter starting (Play) of reproduction is recorded as seen in FIG. 10.

If the Prev command is issued by a reproduction operation of the user, then stopping (Stop) of reproduction of the content (CID1) being reproduced is recorded as an event log, and the content ID (CID1) of the content designated by the Prev command is recorded, and then starting (Play) of reproduction is recorded as seen in FIG. 10.

If the Repeat command is issued by a reproduction operation of the user, then stopping (Stop) of reproduction of the content (CID1) being reproduced is recorded as an event log, and the content ID (CID1) of the content designated so as to be reproduced again by the Repeat command is recorded, and then starting (Play) of reproduction is recorded as seen in FIG. 10.

If the Pause command is issued by a reproduction operation of the user, then stopping (Stop) of reproduction of the content (CID1) being reproduced is recorded as an event log, and thereafter, reproduction of the same content re-started upon cancellation of the Pause command is recorded as starting (Play) of reproduction as seen in FIG. 10.

If the Rew command is issued by a reproduction operation of the user, then stopping (Stop) of reproduction of the content (CID1) being reproduced is recorded as an event log, and thereafter, reproduction of the same content re-started upon cancellation of the REW command is recorded as starting (Play) of reproduction as seen in FIG. 10. This similarly applies also when the FF command is issued.

If the Rew command is issued by a reproduction operation of the user and rewinding is performed until the reproduction object moves to another tune, then stopping (Stop) of reproduction of the content (CID1) being reproduced is recorded as an event log, and thereafter, the content ID (CID2) of the content whose reproduction is started upon cancellation of the Rew command and starting (Play) of reproduction are recorded as seen in FIG. 10. This similarly applies also when the FF command is issued.

Various events are described in detail above. The portable reproduction apparatus 20 can reflect any reproduction operation situation of a content by the user on an event log by including the substance of a process for the content and the starting date and hour of the processes in the event log. A reproduction operation situation of a content by the user includes, for example, timings at and the number of times by which the user reproduces the content, the number of times by which rewinding or fast feeding is performed during reproduction of the content, the number of times by which the content is skipped and so forth.

Referring back to FIG. 6, description of the functional configuration of the portable reproduction apparatus 20 is continued.

If the delete-command acceptance section 232 receives a command to delete a plurality of contents stored in the content storage section 220 in response to a user input, then it records the content IDs corresponding to the contents which are an object of deletion of the command into the deletion content storage section 234. More particularly, the delete-command acceptance section 232 produces and stores a deletion object list into the deletion content storage section 234. The deletion object list is a list of content IDs corresponding to contents which are designated so as to be deleted by the user in the portable reproduction apparatus 20. It is to be noted that the delete-command acceptance section 232 may record, in addition to the deletion object list, information which can specify the contents of the object of the deletion command (attribute information of the contents such as, for example, a title name, an album name or an artist name).

The deletion content storage section 234 is formed from, for example, the storage section 211 such as an HDD, the flash memory 202 or the like and stores the deletion object list described above.

The transfer section 236 has a function of transferring, in accordance with a transfer request from an external apparatus such as an information-processing apparatus 10 or the distribution server 30, event logs (reproduction history information) stored in the reproduction-history storage section 230 to the external apparatus through the communication section 238. More particularly, if a request from an information-processing apparatus 10 connected to the portable reproduction apparatus 20 is received, then the transfer section 236 reads out the event logs from the reproduction-history storage section 230 and transmits the read out event logs to the information-processing apparatus 10 connected to the portable reproduction apparatus 20.

Further, the transfer section 236 reads out, in accordance with a request from the information-processing apparatus 10, a computed evaluation value or values corresponding to one or more contents stored in the content storage section 220 from the content information storage section 244 serving as an evaluation-value storage section and transmits the read out computed evaluation value or values solely or together with the reproduction history information described hereinabove to the information-processing apparatus 10. Consequently, the information-processing apparatus 10 can, for example, average the computed evaluation values transferred thereto and the computed evaluation values of the contents stored therein to produce new computed evaluation values corresponding to the contents and transmit the produced computed evaluation values to the portable reproduction apparatus 20.

Further, where an input evaluation value or values corresponding to one or more contents stored in the content storage section 220 are stored in the content information storage section 244, the transfer section 236 reads out the input evaluation values from the content information storage section 244 in accordance with a request from the information-processing apparatus 10 and transfers the read out input evaluation values solely or together with the reproduction history information described hereinabove to the information-processing apparatus 10. Consequently, the information-processing apparatus 10 can, for example, average the input evaluation values transferred thereto and the input evaluation values of the contents stored therein to produce new input evaluation values corresponding to the contents and transmit the produced input evaluation values to the portable reproduction apparatus 20.

Further, the transfer section 236 transfers the device ID of the portable reproduction apparatus 20 together with the reproduction history information in accordance with a request from the information-processing apparatus 10. The device ID is an identifier for identifying the portable reproduction apparatus 20. Where such a device ID is transmitted, it is possible to record the device ID into the information-processing apparatus 10 thereby to register the portable reproduction apparatus 20 corresponding to the device ID into the information-processing apparatus 10. For example, such a registration may be used as a condition for allowing communication of information of, for example, a content, attribute information, reproduction history information, a computed evaluation value and an input evaluation value of the content, a deletion object list, a playlist and so forth between the portable reproduction apparatus 20 corresponding to the device ID and the information-processing apparatus 10. This makes it possible to prevent the information from being shared by many and unspecific apparatus.

Further, the transfer section 236 can transfer content IDs stored in the deletion content storage section 234 and designated as an object of deletion, for example, an estimated deletion list, to the information-processing apparatus 10 connected to the portable reproduction apparatus 20 together with reproduction history information of particular content data in accordance with a request from the information-processing apparatus 10. This makes it possible for the portable reproduction apparatus 20 to issue a request to the information-processing apparatus 10 connected to the portable reproduction apparatus 20 to delete a content stored in the content storage section 220 of the portable reproduction apparatus 20 so that the content is deleted from the information-processing apparatus 10.

In short, it is not suitable for the information-processing apparatus 10 itself to perform deletion of a content from restrictions of the processing capacity or the battery. Therefore, where a request to delete a content is issued by the user, the information-processing apparatus 10 writes the content ID of the content into a deletion object list to retain the same. Then, when the information-processing apparatus 10 and the portable reproduction apparatus 20 are connected to each other, the information-processing apparatus 10 transmits the deletion object list to the portable reproduction apparatus 20. Consequently, the content is deleted from the content storage section 220 of the portable reproduction apparatus 20 based on the deletion object list by a deletion execution section (not shown) of the information-processing apparatus 10 connected to the portable reproduction apparatus 20.

The acquisition section 240 has a function of acquiring, from an external apparatus such as an information-processing apparatus 10 or the distribution server 30, a computed evaluation value and so forth arithmetically operated based on reproduction history information by the external apparatus. In particular, if reproduction history information (event logs) of one or more contents stored in the portable reproduction apparatus 20 is transferred to the information-processing apparatus 10 by the transfer section 236, then the information-processing apparatus 10 arithmetically operates the computed evaluation values of the contents corresponding to the reproduction history information based on the reproduction history information and the reproduction history information of the information-processing apparatus 10. Further, the information-processing apparatus 10 updates the input evaluation values of the contents as occasion demands, and transmits the computed evaluation values and the input evaluation values to the portable reproduction apparatus 20. The acquisition section 240 receives and acquires the computed evaluation values and/or the input evaluation values from the information-processing apparatus 10 through the communication section 238. Further, the acquisition section 240 outputs the computed evaluation values and/or the input evaluation values acquired in this manner to the evaluation-value recording section 242.

Further, the acquisition section 240 can acquire a content, attribute information of the content, a playlist and so forth from the information-processing apparatus 10 connected to the portable reproduction apparatus 20. The acquisition section 240 records the content, attribute information of the content, playlist and so forth acquired in this manner into the content storage section 220, a playlist storage section (not shown) or the like.

The evaluation-value recording section 242 records computed evaluation values and input evaluation values acquired from the information-processing apparatus 10 in a coordinated relationship with corresponding content data into the content information storage section 244 serving as an evaluation-value storage section. In particular, the evaluation-value recording section 242 stores computed evaluation values, input evaluation values and the content IDs of contents to which a computed evaluation value and an input evaluation value are added, inputted from the acquisition section 240, into the content information storage section 244. It is to be noted that the contents corresponding to the computed evaluation values and the input evaluation values are stored in the content storage section 220 of the portable reproduction apparatus 20.

Further, every time computed evaluation values and input values are acquired by the acquisition section 240, the evaluation-value recording section 242 updates the computed evaluation values and the input evaluation values stored in the content information storage section 244 with the acquire new computed evaluation values and input evaluation values, respectively.

The content information storage section 244 is formed from, for example, the storage section 211 such as an HDD, the flash memory 202 or the like. The content information storage section 244 stores attribute information of contents (computed evaluation value, input evaluation value, title, artist, album name, genre and so forth) in a coordinated relationship with the content IDs of the contents. The content information storage section 244 is formed as an evaluation-value storage section in the present embodiment. However, the evaluation-value storage section is not limited to this, but computed evaluation values and input evaluation values can be acquired separately from some other attribute information in the evaluation-value storage section.

The evaluation-value input section 246 sets an input evaluation value corresponding to a content stored in the content storage section 220 in response to a user input. For example, if the user performs a predetermined operation during reproduction of a particular content, then an input evaluation value setting screen 4c is displayed on the display section 250 of the portable reproduction apparatus 20 by the display control section 248 as seen in FIG. 11. If the user performs an evaluation value inputting operation in response to the input evaluation value setting screen 4c, then the evaluation-value input section 246 sets an input evaluation value of one of, for example, 1 to 5 to the content being reproduced in response to the evaluation value inputting operation. In the example of the input evaluation value setting screen 4c of FIG. 11, the input evaluation value of the content is set to 2 points "★★".

The evaluation-value input section 246 outputs the input evaluation value set in this manner and the content ID to the evaluation-value recording section 242. The evaluation-value recording section 242 records the input evaluation value into the content information storage section 244 together with the content ID. Consequently, also the portable reproduction apparatus 20 can set an input evaluation value of a content and display the latest input evaluation value immediately.

The display control section 248 controls display of various kinds of information on the display section 250. In particular, for example, the display control section 248 reads out a computed evaluation value or an input evaluation value regarding the same content in the content information storage section 244 and causes the display section 250 to display the input evaluation value preferentially to the computed evaluation value as described hereinabove with reference to FIG. 3. Further, if an input evaluation value of the particular content is set by the content information storage section 244 while the computed evaluation value is displayed, then the display control section 248 controls the display section 250 to display the thus set input evaluation value in place of the computed evaluation value being displayed.

Further, the display control section 248 controls the display section 250 to display a playlist stored in the play list storage section not shown. Furthermore, the display control section 248 controls the display section 250 to display various search screens in response to the substance of an operation of the user.

Also in a mode wherein the input evaluation value corresponding to the particular content data is displayed on the display section 250 under the control of the display control section 248, for example, when connection between the portable reproduction apparatus 20 and the information-processing apparatus 10 is established, the transfer section 236 transfers reproduction history information to the information-processing apparatus 10 in accordance with a request from the information-processing apparatus 10. Then, the acquisition section 240 acquires the computed evaluation value arithmetically operated by the information-processing apparatus 10 based on the thus transferred reproduction history information, and the evaluation-value recording section 242 records the computed evaluation value into the content information storage section 244. Consequently, even for a content whose input evaluation value is set already, the computed evaluation value of the content is updated at any time to the latest value which reflects the reproduction situation then. It is to be noted that the display section 250 is formed from the display section 210 or the like.

Further, after the computed evaluation value transmitted from the information-processing apparatus 10 is acquired by the acquisition section 240 and recorded into the content information storage section 244 by the evaluation-value recording section 242 in response the transfer of the reproduction history information (event logs) by the transfer section 236, the reproduction-history production section 228 deletes the transferred reproduction history information stored in the reproduction-history storage section 230. As a result, the reproduction history information transferred to the information-processing apparatus 10 and reflected on the computed evaluation value is deleted, and new reproduction history information is recorded into the reproduction-history storage section 230 in response to a later reproduction operation of the content. Accordingly, the same reproduction history information can be prevented from being reflected in an overlapping fashion on the computed evaluation value.

Functional configurations of the components of the portable reproduction apparatus 20 according to the present embodiment are described above. It is to be noted that the reproduction operation section 222, reproduction section 224, date/time information production section 226, delete-command acceptance section 232, transfer section 236, acquisition section 240, evaluation-value recording section 242, evaluation-value input section 246, display control section 248 and so forth may be formed, for example, as hardware having the functions or may be configured by installing a program for causing a computer to implement the functions into the portable reproduction apparatus 20.

<Functional Configuration of the Information Processing Apparatus (PC)>

Now, principal functions of the information-processing apparatus 10 according to the present embodiment are described with reference to FIG. 12. It is to be noted that FIG. 12 schematically shows various functions of the information-processing apparatus 10 according to the present embodiment.

Figure 12:
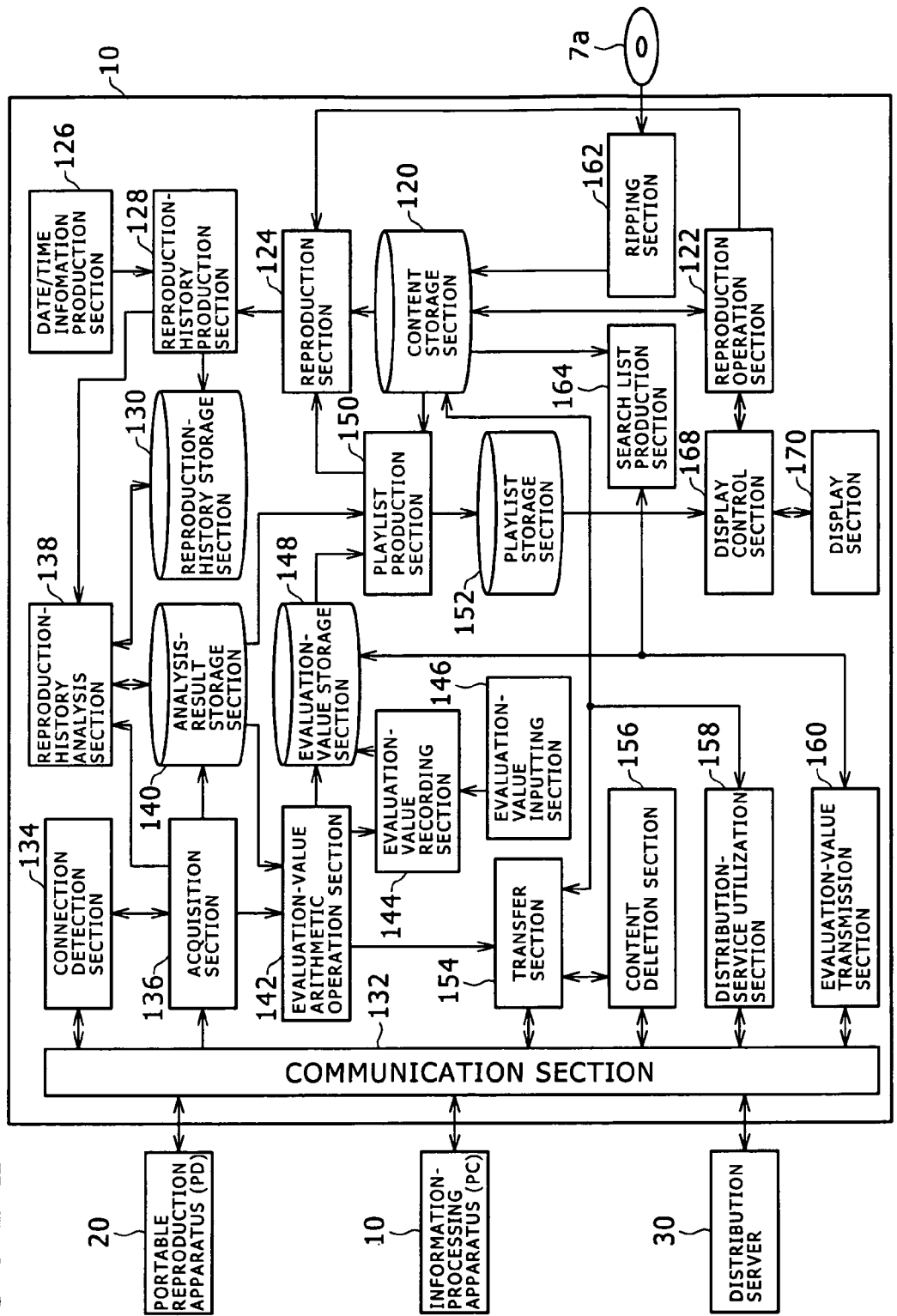
FIG. 12 is a block diagram schematically showing a functional configuration of the information-processing apparatus.

Referring to FIG. 12, the information-processing apparatus 10 includes, as principal components thereof, a content storage section 120, a reproduction operation section 122, a reproduction section 124, a date/time information production section 126, a reproduction-history production section 128, and a reproduction-history storage section 130. The information-processing apparatus 10 further includes, as principal components thereof, a communication section 132, a connection detection section 134, an acquisition section 136, a reproduction-history analysis section 138, an analysis-result storage section 140, and an evaluation-value arithmetic operation section 142. The information-processing apparatus 10 further includes, as principal components thereof, an evaluation-value recording section 144, an evaluation-value input section 146, a content information storage section 148 serving as an evaluation-value storage section, a playlist production section 150, a playlist storage section 152, and a transfer section 154, a content deletion section 156. The information-processing apparatus 10 further includes, as principal components thereof, a distribution-service utilization section 158, an evaluation-value transmission section 160, a ripping section 162, a search list production section 164, a display control section 168, an a display section 170.

Among the components mentioned, the content storage section 120, reproduction operation section 122, reproduction section 124, date/time information production section 126, reproduction-history production section 128 and reproduction-history storage section 130 have functional configurations substantially similar to those of the content storage section 220, reproduction section 224, reproduction operation section 222, date/time information production section 226, reproduction-history production section 228 and reproduction-history storage section 230 of the portable reproduction apparatus 20 described hereinabove, respectively. Therefore, overlapping description of them is omitted herein to avoid redundancy. The information-processing apparatus 10 can perform various processes for a content in response to a reproduction operation by the user to produce and record an event log as reproduction history information similarly to the portable reproduction apparatus 20.

It is to be noted that the content storage section 120 is formed from a storage medium such as, for example, the storage section 111 such as an HDD, a semiconductor memory or the removable recording medium 7 and has a function of storing a plurality of contents. Further, the reproduction-history production section 128 can output an event log produced thereby directly to the reproduction-history analysis section 138 without the intervention of the reproduction-history storage section 130.

The communication section 132 is formed, for example, from the connection port 114, communication section 115 and so forth and can communicate various kinds of information with a portable reproduction apparatus 20 and the distribution server 30 through the local line 9 and the network 5.

The connection detection section 134 detects that an external apparatus is connected to the information-processing apparatus 10 through the communication section 132. In particular, the connection detection section 134 detects that a portable reproduction apparatus 20 is locally connected to the connection port 114 through the local line 9 and notifies the acquisition section 136 of such connection. Further, the connection detection section 134 can detect a continuous connection time period between the portable reproduction apparatus 20 and the information-processing apparatus 10 and, if it detects that the continuous connection time period exceeds a particular time period (for example, one hour), then it notifies the acquisition section 136 of this.

The acquisition section 136 has a function of acquiring reproduction history information, computed evaluation values, input evaluation values and so forth stored in the portable reproduction apparatus 20 through the communication section 132. In particular, if a notification of detection of connection to the portable reproduction apparatus 20 is received from the connection detection section 134, then the acquisition section 136 acquires event logs as reproduction history information of the portable reproduction apparatus 20 connected thereto from the portable reproduction apparatus 20.

Then, the acquisition section 136 outputs the event logs acquired from the portable reproduction apparatus 20 to the analysis-result storage section 140. Further, the acquisition section 136 acquires computed evaluation values and input evaluation values of contents stored in the portable reproduction apparatus 20 from the portable reproduction apparatus 20 and outputs the acquired values to the evaluation-value arithmetic operation section 142.

Furthermore, the acquisition section 136 acquires, from the portable reproduction apparatus 20, for example, a deletion object list as information representative of content IDs corresponding to one or more contents designated so as to be deleted from the portable reproduction apparatus 20 by the user. As a result, the contents are deleted from the storage section of the portable reproduction apparatus 20 based on the deletion object list by a deletion execution section (not shown) of the information-processing apparatus 10 connected to the portable reproduction apparatus 20. The information-processing apparatus 10 uses the deletion object list to delete the contents in the portable reproduction apparatus 20. Consequently, the processing load to the portable reproduction apparatus 20 can be reduced to reduce the exhaustion of the battery thereby to make it possible to execute reproduction of a content and so forth for a long period of time. Further, the acquisition section 136 outputs the acquired deletion object list to the evaluation-value arithmetic operation section 142.

The reproduction-history analysis section 138 performs an analysis of event logs stored as reproduction history information in the reproduction-history storage section 130 and event logs acquired as reproduction history information from the portable reproduction apparatus 20 by the acquisition section 136. In the following description, an event log stored in the reproduction-history storage section 130 is referred to as event log of the information-processing apparatus 10, and an event log acquired from the portable reproduction apparatus 20 by the acquisition section 136 is referred to as event log of the portable reproduction apparatus 20. Where an event log may be any of an event log of the information-processing apparatus 10 and an event log of the portable reproduction apparatus 20, it is referred to merely as event log, and where both event logs are to be pointed to, they are referred to as both event logs.

In particular, the reproduction-history analysis section 138 determines reproduction start date/time, reproduction end date/time, a reproduction time number, a rest time number, a skip time number, a repeat time number and a total reproduction time period of a content from event logs. The reproduction-history analysis section 138 can determine a reproduction start date/time of a content corresponding to a content ID by extracting date/time information included in an event log of start of reproduction positioned immediately succeeding a record in which a content ID is placed from the event log.

Further, the reproduction-history analysis section 138 can determine, from an event log, reproduction end date/time of a content by extracting date/time information included in an event log of a reproduction start date/time or a stop of reproduction of the content. More particularly, an event log of a reproduction stop positioned immediately preceding to a record in which a content ID is placed indicates an end of reproduction of the content whose reproduction has been stopped by occurrence of the reproduction stopping event. Accordingly, date/time information included in the event log of a stop of reproduction positioned immediately preceding to the record in which the content ID is placed indicates a reproduction end date/time of the content whose reproduction is stopped by occurrence of the reproduction stop event.

Meanwhile, if an event log of a stop of reproduction is not found immediately preceding to the record in which the content ID is placed, then an event log of a start of reproduction which is positioned immediately succeeding the record in which the content ID is placed indicates the reproduction end date/time of the immediately preceding content together with new reproduction start date/time. Therefore, the reproduction-history analysis section 138 can determine, from an event log, the reproduction end date/time of each content by extracting the date/time information included in a reproduction starting or stopping event log of the contents.

Further, the reproduction-history analysis section 138 can determine the number of times of reproduction of each content based on a reproduction start event log positioned immediately succeeding each record in which the content ID is placed. Further, the reproduction-history analysis section 138 can determine the number of times of a rest, the number of times of a skip and the number of times of a repeat of each content based on an event log corresponding to each reproduction operation illustrated in FIG. 8. Further, the reproduction-history analysis section 138 can determined a total reproduction time period of each content by extracting and calculating with related event logs for each content.

After the analysis of event logs, the reproduction-history analysis section 138 records a result of the analysis into the analysis-result storage section 140. The analysis-result storage section 140 is formed from a storage medium such as the storage section 211 such as an HDD, the flash memory 202 or the like, and stores an analysis result of the event logs by the reproduction-history analysis section 138. More particularly, for example, information of the number of times of reproduction, the number of times of a rest, the number of times of a skip, the number of times of a repeat and the total reproduction time period of each content is stored as the result of analysis into the analysis-result storage section 140. Further, the analysis-result storage section 140 may store, as an analysis result, the reproduction start date/time, the reproduction end date/time and the continuous reproduction timer period for each reproduction. Furthermore, the reproduction end date/time of each content may be stored in the analysis-result storage section 140. Here, an analysis result stored in the analysis-result storage section 140 is described with reference to FIGS. 13 and 14.

FIGS. 13 and 14 illustrate an example of an analysis result stored in the analysis-result storage section 140. FIG. 13 illustrates the storage substance of the analysis-result storage section 140 where results of an analysis of reproduction situations of contents from events are stored in the analysis-result storage section 140 (the stored substance is hereinafter referred to sometimes as reproduction situation table). As seen in FIG. 13, the reproduction situation table of the analysis-result storage section 140 stores a content ID (CID) 140*a*, a number of reproductions 140*b*, a number of pauses 140*c*, a number of skips 140*d*, a number of repetitions 140*e* and a total reproduction duration 140*f* in a coordinated relationship with each other for each content.

Where the analyzed event logs in the analysis-result storage section 140 are those of the information-processing apparatus 10, a reproduction time number, a rest time number, a skip time number, a repeat time number and a total reproduction time period of a content reproduced by the information-processing apparatus 10 are stored in the reproduction situation table. Where the analyzed event logs in the analysis-result storage section 140 are those of the portable reproduction apparatus 20, a reproduction time number, a rest time number, a skip time number, a repeat time number and a total reproduction time period of a content reproduced by the portable reproduction apparatus 20 are stored in the reproduction situation table. On the other hand, where the analyzed event logs in the analysis-result storage section 140 are those of the information-processing apparatus 10 and the portable reproduction apparatus 20, a reproduction time number, a rest time number, a skip time number, a repeat time number and a total reproduction time period of a content reproduced by at least one of the information-processing apparatus 10 and the portable reproduction apparatus 20 are stored in the reproduction situation table. For a content which is reproduced by both of the information-processing apparatus 10 and the portable reproduction apparatus 20, total values of the reproduction time number and so forth on the information-processing apparatus 10 and the reproduction time number and so forth on the portable reproduction apparatus 20 are stored in the analysis-result storage section 140.

The content ID 140*a* is an identifier for uniquely identifying a content. The number of reproductions 140*b* is the number of times by which the content identified with the content ID 140*a* has been reproduced. The number of pauses 140*c* is the number of times by which reproduction has been stopped during reproduction of the content identified with the content ID 140*a*. The number of skips 140*d* is the number of times by which the content identified with the content ID 140*a* has been skipped during reproduction. The number of repetitions 140*e* is the number of times by which the content identified with the content ID 140*a* has been reproduced repetitively. The total reproduction duration 140*f* is the sum of periods of time within which the content identified with the content ID 140*a* has been reproduced. It is to be noted that preferably the sum of periods of time within which the content has been reproduced actually is placed in the total reproduction duration 140*f*. In other words, preferably the time period placed in the total reproduction duration 140*f* includes no periods of time within which fast feeding has been performed, no periods of time within which rewinding has been performed, and no periods of time within which reproduction has been stopped.

FIG. 14 illustrates the storage substance of the analysis-result storage section 140 where results of an analysis of a history of reproductions of contents from event logs are stored in the analysis-result storage section 140 (the stored analysis results are hereinafter referred to sometimes as reproduction history table). One history of production from a reproduction start event positioned immediately succeeding a record in which a content ID is placed in an event log to a reproduction end event described hereinabove. As seen in FIG. 14, a content ID 140*a*, a reproduction start date/time 140*g*, a reproduction end date/time 140*h* and a continuous reproduction duration 140*i* are stored in a coordinated relationship with each other in the reproduction history table of the analysis-result storage section 140.

If event logs analyzed by the analysis-result storage section 140 are those of the information-processing apparatus 10, then a reproduction start date/time, a reproduction end date/time and a continuous reproduction time period of a content reproduced on the information-processing apparatus 10 are placed in the reproduction history table. If event logs analyzed by the analysis-result storage section 140 are those of the portable reproduction apparatus 20, then a reproduction start date/time, a reproduction end date/time and a continuous reproduction time period of a content reproduced by the portable reproduction apparatus 20 are placed in the reproduction history table. On the other hand, if event logs analyzed by the analysis-result storage section 140 are those of the information-processing apparatus 10 and the portable reproduction apparatus 20, then a reproduction start date/time, a reproduction end date/time and a continuous reproduction time period of a content reproduced on one of the information-processing apparatus 10 and the portable reproduction apparatus 20 are placed in the reproduction history table.

The content ID 140a is an identifier for uniquely identifying a content. The reproduction start date/time 140g is a date/time at which reproduction of a content identified with the content ID 140a is started. More particularly, date/time information included in an event log of a start of reproduction positioned immediately succeeding a record in which a content ID is placed in the event log. The reproduction end date/time 140h is a reproduction end date/time at which reproduction of a content identified with the content ID 140a is started at a date/time placed in the reproduction start date/time 140g. The reproduction end date/time can be determined in such a manner as described hereinabove. The continuous reproduction duration 140i is a period of continuous reproduction time when reproduction of a content identified with the content ID 140a is started at the date/time placed in the reproduction start date/time 140g. The period of time placed in the continuous reproduction duration 140i may not include those periods of time within which rewinding, fast feeding and temporary stopping have been performed. In particular, the period of time within which a content has been continuously reproduced actually can be determined by subtracting those periods of time within which rewinding, fast feeding and temporary stopping have been performed from a period of time obtained by subtracting the reproduction start date/time 140g from the reproduction end date/time 140h which can be determined by the method described hereinabove.

Results of an analysis stored in the analysis-result storage section 140 are described in detail above. Referring back to FIG. 12, the functional configuration of the information-processing apparatus 10 is further described.

The evaluation-value arithmetic operation section 142 has a function of arithmetically operating a computed evaluation value corresponding to each content data based on reproduction history information of the portable reproduction apparatus 20 acquired by the acquisition section 136 and reproduction history information of the information-processing apparatus 10 produced by the reproduction-history production section 128. Here, the reproduction history information of the portable reproduction apparatus 20 used for the evaluation value arithmetic operation is, in the present embodiment, results of an analysis by the reproduction-history analysis section 138 of event logs of the portable reproduction apparatus 20 acquired by the acquisition section 136 as described above. Meanwhile, the reproduction history information of the information-processing apparatus 10 used for the evaluation value arithmetic operation is, in the present embodiment, results of an analysis by the reproduction-history analysis section 138 of event logs of the information-processing apparatus 10 produced by the reproduction-history production section 128 as described above.

The evaluation value arithmetic operation by the evaluation-value arithmetic operation section 142 may be performed, for example, at a timing when connection between the information-processing apparatus 10 and the portable reproduction apparatus 20 is established. In particular, if the connection detection section 134 detects that a portable reproduction apparatus 20 is connected to the information-processing apparatus 10, then the acquisition section 136 acquires event logs of the portable reproduction apparatus 20. Then, the event logs of the portable reproduction apparatus 20 are analyzed by the reproduction-history analysis section 138, and a result of the analysis is stored into the analysis-result storage section 140. Thus, the evaluation-value arithmetic operation section 142 reads out the result of the analysis from the analysis-result storage section 140 and arithmetically operates the computed evaluation values of the portable reproduction apparatus 20 based on the result of the analysis. Further, the evaluation-value arithmetic operation section 142 arithmetically operates a new computed evaluation value corresponding to the content based on the computed evaluation values of the portable reproduction apparatus 20 arithmetically operated as described above and the computed evaluation values of the information-processing apparatus 10 regarding the same content arithmetically operated in the past and stored already in the content information storage section 148 serving as an evaluation-value storage section. The new computed evaluation value is outputted to the transfer section 154 and transferred to the portable reproduction apparatus 20, and is outputted to the evaluation-value recording section 144 and recorded into the content information storage section 148 serving as the evaluation-value storage section.

On the other hand, where the information-processing apparatus 10 and the portable reproduction apparatus 20 are connected continuously, the information-processing apparatus 10 acquires event logs from the portable reproduction apparatus 20 after every particular interval of time (for example, after one hour). Then, the information-processing apparatus 10 arithmetically operates the computed evaluation values based on a result of an analysis of the event logs. Then, the information-processing apparatus 10 transfers the computed evaluation values arithmetically operated thereby to the portable reproduction apparatus 20 so that they are recorded into the content information storage section 148.

Further, where the information-processing apparatus 10 and the portable reproduction apparatus 20 are connected continuously, the evaluation-value arithmetic operation section 142 arithmetically operates, after every predetermined interval of time described above (for example, after every one hour), the computed evaluation values of the information-processing apparatus 10 stored in the content information storage section 148 again based on a result of an analysis of event logs produced newly by the reproduction-history production section 128. Then, the evaluation-value arithmetic operation section 142 transfers the computed evaluation values arithmetically operated thereby again to the portable reproduction apparatus 20 so that they may be recorded into the content information storage section 148.

Further, irrespective of whether or not the information-processing apparatus 10 and the portable reproduction apparatus 20 are connected to each other, the evaluation-value arithmetic operation section 142 may arithmetically operate, for example, every time a reproduction process of a content is performed by the reproduction section 124 of the portable reproduction apparatus 20 (every time a reproduction event of a content occurs), the computed evaluation values of the information-processing apparatus 10 based on reproduction history information (analysis result of event logs) according to the reproduction process. Consequently, the computed evaluation values of the information-processing apparatus 10 stored in the content information storage section 148 can be updated dynamically for every reproduction process of an individual content.

Further, the evaluation-value arithmetic operation section 142 has a function of merging the computed evaluation values of the portable reproduction apparatus 20 acquired by the acquisition section 136 and the computed evaluation values of the information-processing apparatus 10 stored in the content information storage section 148 to calculate new computed evaluation values. The evaluation-value arithmetic operation section 142 further has a function of merging the input evaluation values of the portable reproduction apparatus 20 acquired by the acquisition section 136 and the input evaluation values of the information-processing apparatus 10 stored in the content information storage section 148 to calculate new input evaluation values.

In particular, if the computed evaluation values and the input evaluation values of the portable reproduction apparatus 20 are acquired by and inputted from the acquisition section 136, then the evaluation-value arithmetic operation section 142 reads out the computed evaluation values and the input evaluation values of the portable reproduction apparatus 20 and the computed evaluation values and the input evaluation values of the information-processing apparatus 10 regarding the same content from the content information storage section 148. Then, the evaluation-value arithmetic operation section 142 averages the computed evaluation values of the portable reproduction apparatus 20 and the computed evaluation values of the information-processing apparatus 10 to calculate new computed evaluation values. Further, the evaluation-value arithmetic operation section 142 averages the input evaluation values of the portable reproduction apparatus 20 and the input evaluation values of the information-processing apparatus 10 to calculate new input evaluation values. Furthermore, the evaluation-value arithmetic operation section 142 stores the new computed evaluation values and input evaluation values into the content information storage section 148 and outputs them to the transfer section 154 so as to be transferred to the portable reproduction apparatus 20.

In this manner, the evaluation-value arithmetic operation section 142 functions also as an evaluation value synthesis section for merging and synchronizing the computed evaluation values and the input evaluation values stored in the information-processing apparatus 10 and the computed evaluation values and the input evaluation values stored in the portable reproduction apparatus 20.

Figure 16:
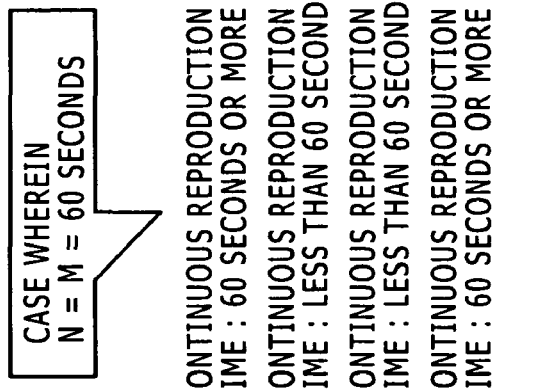

Here, a particular arithmetic operation method of a computed evaluation value (a point adjusting method for auto-rating) based on reproduction history information by the evaluation-value arithmetic operation section 142 is described with reference to FIGS. 15 and 16.

The information-processing apparatus 10 can acquire and record a new content into the content storage section 120 by downloading a distributed content from the distribution server 30, by ripping a content from a recording medium 7a by means of the ripping section 162 or importing a content from some other content reproduction software which the information-processing apparatus 10 has. Where the information-processing apparatus 10 acquires a new content in this manner, the initial value for the computed evaluation value of the content is set to, for example, "3.0" as described hereinabove.

In order to perform rating which reflects the liking of the user, the computed evaluation value set for the new content described above is adjusted in such references as illustrated in FIG. 15 in response to a later reproduction operation by the user.

First, a method of adding a computed evaluation value of a content (for example, a favorite tune) which conforms to the liking of the user is described. If the content is reproduced over a sufficiently long period of time and enjoyed by the user, then it can be decided that the content conforms to the liking of the user. Therefore, preferably the computed evaluation value is arithmetically operated so that the evaluation of the content may be raised every time the content is reproduced continuously for more than a particular period of time.

Therefore, in the present embodiment, as seen in FIG. 15, the computed evaluation value of a "content reproduced continuously for an addition reference time period (N seconds) without being skipped" is incremented by a predetermined addition point (for example, 0.2 points). In particular, if the continuous reproduction time period of a content is equal to or longer than the predetermined addition reference time period (N seconds), then the computed evaluation value is incremented by the predetermined addition point. Consequently, if a content is continuously reproduced sufficiently after reproduction of the content is started, then the computed evaluation value can be arithmetically operated so as to raise the evaluation of the content.

For example, the predetermined addition reference time period N can be set to an arbitrary time period equal to or shorter than a reproduction time period of a common content in response to such a reproduction time period of a common content (for example, 5 minutes) or to the tendency of enjoyment of the user. Further, the predetermined addition point may be set arbitrarily in response to the tendency of enjoyment of the user. In the present embodiment, the addition reference time period N is set, for example, to 60 seconds (one minute) and the predetermined addition point is set to 0.2 points.

In this instance, every time a certain content is reproduced for a period equal to or longer than 60 seconds, the computed evaluation value of the content is incremented by 0.2 points. However, after an upper limit value (for example, 5.0) to the computed evaluation value is reached, the computed evaluation value is not incremented any more.

Now, a method of decrementing the computed evaluation value of a content which does not conform to the liking of the user (for example, a tune which the user does not like) is described. An operation which the user performs for a content which the user does not like may be [operation 1] an operation of skipping a reproduced content (tune) because the user finds that it does not like the content when it listens to the content, [operation 2] an operation of registering a content which the user wants to delete on the portable reproduction apparatus 20 into a deletion object list, or the like.

Therefore, in the present embodiment, in order to cope with the "operation 1" described above, the computed evaluation value of a "content skipped before the lapse of a predetermined subtraction reference time period (M seconds) since the start of reproduction" is decremented by a predetermined first subtraction point (for example, 0.1 point) as seen in FIG. 15. In particular, if the continuous reproduction time period of a content is less than the predetermined reference time period (M seconds), then the computed evaluation value is decremented by the predetermined subtraction point. Consequently, if the content is skipped in a short time after reproduction of the content is started, then the computed evaluation value can be arithmetically operated so that the evaluation of the content may be decreased.

It is to be noted that the predetermined subtraction reference time period M can be set to an arbitrary time period in response to a reproduction time period of a common content or to the tendency of enjoyment of the user. The subtraction reference time period M may be equal to the addition reference time period N (N=M) or may be shorter than the addition reference time period N (N>M). In the case of N=M, if a certain content is reproduced, then the computed evaluation value of the content can be incremented or decremented without fail irrespective of presence or absence of a skip. On the other hand, in the case of N>M, if a certain content is reproduced, then the computed evaluation value can be held from incrementing or decrementing where the continuous reproduction time period of the content is shorter than N.

Further, although the predetermined first subtraction point can be set freely in response to the tendency of enjoyment of the user, in order to prevent the computed evaluation value from becoming excessively low, the first subtraction point is preferably set to a value equal to or lower than the addition point "0.2". In the present embodiment, the addition reference time period N is set, for example, to 60 seconds (M=N) and the predetermined subtraction point is set to 0.1.

In this instance, every time a certain content is skipped in less than 60 seconds, the computed evaluation value of the content is decremented by 0.1 point. However, if the computed evaluation value decreases to a lower limit value set therefor (for example, 1.0), then it is not decremented any more.

Meanwhile, in order to cope with the "operation 2" described hereinabove, the computed evaluation value of a "content registered in a deletion object list" is decremented by a predetermined second subtraction point (for example, 1.0 point). The predetermined second subtraction point can be set freely in response to the tendency of enjoyment of the user. However, in order to reflect the will of the user, who issued a command to delete the content, highly on the computed evaluation value, the predetermined second subtraction point is preferably set to a value equal to or higher than several times the addition point (0.2) and the first subtraction point (0.1).

Here, a particular example of such an arithmetic operation method of the computed evaluation value as described above is described. For example, if the reproduction history includes four times of reproduction, then for the content whose content ID is "000001", the computed evaluation value of the content is incremented by 0.2 points because the continuous reproduction time period is equal to or longer than the addition reference time period N (60 seconds). For the content whose content ID is "000002", the computed evaluation value of the content is decremented by 0.1 point because the continuous reproduction time period is shorter than the subtraction reference time period M (60 seconds). Further, for the content whose content ID is "000003", since the reproduction history recorded includes two times of reproduction and the continuous reproduction time period in the first time reproduction in the reproduction history is shorter than the subtraction reference time period M (60 seconds), the computed evaluation value of the content is decremented by 0.1 point. However, since the continuous reproduction time period in the second time reproduction of the reproduction history is equal or longer than the addition reference time period N (60 seconds), the computed evaluation value of the content is incremented by 0.2 points.

A processing flow for executing an arithmetic operation process of such a computed evaluation value as described above is described. If an event log is acquired from the portable reproduction apparatus 20 or an event log is produced on the information-processing apparatus 10 and an analysis process for the acquired or produced event log is performed, then the evaluation-value arithmetic operation section 142 reads out, for example, a continuous reproduction time period corresponding to an evaluation object from within analysis results of event logs stored in the analysis-result storage section 140. Then, if the continuous reproduction time period is equal to or longer than the reference time period (N=60 seconds), then the evaluation-value arithmetic operation section 142 increments the existing computed evaluation value by 0.2 points. However, if the continuous reproduction time period is shorter than the subtraction reference time (M=60 seconds), then the evaluation-value arithmetic operation section 142 decrements the existing computed evaluation value by 0.1 point.

It is to be noted that, if a continuous reproduction time period is not included in the analysis results of the event logs, then the evaluation-value arithmetic operation section 142 may perform the arithmetic operation process described above after it calculates a continuous reproduction time period from the difference between the reproduction start date/time and the reproduction end date/time.

The evaluation-value arithmetic operation section 142 may not decide the subtraction of the computed evaluation value based on the continuous reproduction time period as described above but may detect, for example, based on a result of an analysis of an event log or on an event log itself, whether or not a content is skipped in less than the subtraction reference time period M after reproduction of the content is started (the fact itself of occurrence of skipping), and decrement the computed evaluation value when such skipping is detected.

Then, if a deletion object list is acquired from the portable reproduction apparatus 20, then the evaluation-value arithmetic operation section 142 subtracts 1.0 point from the existing computed evaluation value of the content corresponding to each content ID included in the acquired deletion object list.

As a result of such an arithmetic operation process as described above, the computed evaluation value of a content reproduced on the portable reproduction apparatus 20 or the information-processing apparatus 10 or a content designated so as to be deleted is updated to a value which reflects the latest reproduction history or the like.

It is to be noted that, according to the technique described above, a content whose reproduction time period (time length of one tune) is shorter than M seconds (for example, 60 seconds) inevitably becomes an object of decrementing of the computed evaluation value. Therefore, in this instance, for the computed evaluation value of a content whose reproduction time period is shorter than M seconds, (1) taking a clear-cut attitude that the auto-rating does not function, the decrementing may always be permitted, or (2) the computed evaluation value may be fixed to its initial value (for example, 3.0), or else (3) every time the content is reproduced, the computed evaluation value is normally incremented by a predetermined addition point irrespective of the continuous reproduction time period. It is to be noted that, even for a content whose reproduction time period is shorter than M seconds, the input evaluation value in the manual rating may be permitted to function normally similarly as described above.

A particular arithmetic operation technique for the computed evaluation value by the evaluation-value arithmetic operation section 142 is described above. In this manner, the evaluation-value arithmetic operation section 142 automatically increments or decrements the computed evaluation value of a content in response to a reproduction situation of the content (continuous reproduction time period, presence or absence of a skip or the like). By such automatic adjustment of the computed evaluation value, the liking of the user can be reflected on the computed evaluation value of each content, and rating which is high in convenience to the user can be implemented. In the following, the functional configuration of the information-processing apparatus 10 is continued referring back to FIG. 12.

The evaluation-value recording section 144 records a computed evaluation value arithmetically operated by the evaluation-value arithmetic operation section 142 in a coordinated relationship with the content into the content information storage section 148 serving as an evaluation-value storage section. In particular, the evaluation-value recording section 144 stores a computed evaluation value inputted from the evaluation-value arithmetic operation section 142, an input evaluation value and the content ID of a content to which the computed evaluation value and the input evaluation value are added into the content information storage section 148.

The evaluation-value input section 146 sets an input evaluation value corresponding to a content stored in the content storage section 120 in response to a user input similarly to the evaluation-value input section 246. Further, the evaluation-value input section 146 outputs the input evaluation value set in this manner and the content ID to the evaluation-value recording section 144. The evaluation-value recording section 144 records the input evaluation value into the content information storage section 148 together with the content ID. Consequently, the information-processing apparatus 10 can set an input evaluation value of a content and display the latest input evaluation value immediately.

The playlist production section 150 produces a playlist in which attribute information of those contents which satisfy a predetermined condition is listed based on analysis results of event logs stored in the analysis-result storage section 140 and/or computed evaluation values or input evaluation values stored in the content information storage section 148.

The playlist is a list in which identification information (content ID and so forth) and attribute information of contents is listed, and the information-processing apparatus 10 and the portable reproduction apparatus 20 can reproduce a content corresponding to a content ID in the playlist in accordance with the playlist. Accordingly, if the portable reproduction apparatus 20 or the information-processing apparatus 10 has a playlist in which attribute information, for example, of those contents which conform to the liking of the user is listed, then the portable reproduction apparatus 20 or the information-processing apparatus 10 can reproduce a content conforming to the liking of the user by reproducing the content with reference to the playlist.

The attribute information of a content includes information of the title of a tune to be played by reproduction of the content, and the album name, artist name and so forth of the tune. The playlist production section 150 can acquire the attribute information of a content from the content information storage section 148. In particular, the playlist production section 150 extracts the content ID of those contents which satisfy a predetermined condition from the analysis-result storage section 140 and searches the content information storage section 148 for content IDs corresponding to the extracted content IDs. Then, the playlist production section 150 acquires the attribute information of contents coordinated with the searched out content IDs from the content information storage section 148. The attribute information of contents is stored in the content information storage section 148.

Here, the stored substance of the content information storage section 148 is described with reference to FIG. 17.

As seen in FIG. 17, the content information storage section 148 stores information of a content ID 140$a$, a title 148$b$, an artist name 148$c$, an album name 148$d$, a genre 148$e$, a play time period 148$f$, a computed evaluation value 148$g$, an input evaluation value 148$h$ and so forth in a coordinated relationship with a content. The content ID 140$a$ is an identifier for uniquely identifying the content. The title 148$b$ is the name of a tune to be played by reproduction of the content, and the artist name 148$c$ is the name of the artist who sings, plays, composes, writes, or produces the tune. The album name 148$d$ is the name of a music album in which the tune is contained, and the genre 148$e$ is the genre (for example, jazz, pops, rock or the like) to which the tune belongs. The play time period 148$f$ is the period of play time of the tune, and the computed evaluation value 148$g$ is the evaluation point automatically added to the tune by the auto-rating. The input evaluation value 148$h$ is the evaluation point added manually to the tune by the manual rating.

Upon production of a playlist, the playlist production section 150 searches the content IDs 140$a$ for the pertaining content ID. Then, the playlist production section 150 can acquire information of the title 148$b$, artist name 148$c$, album name 148$d$, genre 148$e$, play time period 148$f$, computed evaluation value 148$g$, input evaluation value 148$h$ and so forth from the content information storage section 148 and place the acquired information as attribute information of the content into the playlist.

The playlist production section 150 produces a playlist based on contents which satisfy a predetermined condition. The predetermined condition may be, for example, the period of reproduction, total reproduction time period, reproduction time number, skip time number, rest time number, repeat time number, computed evaluation value, input evaluation value or the like.

First, a case wherein the period of reproduction is used as the predetermined condition is described. The playlist production section 150 can produce a playlist in which attribute information of contents reproduced within a predetermined period is listed based on the reproduction start date/time and the reproduction end date/time of contents stored in the reproduction history table of the analysis-result storage section 140. The predetermined period (for example, April in 2005, Dec. 23, 2004 to Dec. 25, 2004, or the like) may be inputted through the input unit 108 of the information-processing apparatus 10 to the playlist production section 150 by the user. More particularly, the playlist production section 150 can produce a playlist of contents reproduced within the inputted particular period by extracting those contents which have the reproduction start date/time and reproduction end date/time at least one of which is included in the particular period.

Now, a case wherein the total reproduction is used as the predetermined condition is described. The playlist production section 150 can produce a playlist in which attribute information of contents reproduced for a period of time equal to or longer than the predetermined period of time is listed based on the total reproduction time period of contents stored in the reproduction history table of the analysis-result storage section 140. The predetermined time period may be inputted through the input unit 108 of the information-processing apparatus 10 to the playlist production section 150 by the user. Or, the predetermined time period may be determined in advance by the playlist production section 150 or the like. It is to be noted that the playlist production section 150 may otherwise produce a playlist in which attribute information of a predetermined number of contents is listed in the descending order (or in the ascending order) of the total reproduction time period based on the total reproduction time periods of the contents described above.

Now, a case wherein the reproduction time number is used as the predetermined condition is described. The playlist production section 150 can produce a playlist in which attribute information of contents reproduced by a number of times equal to or greater than the predetermined number of times is listed based on the reproduction time number of contents stored in the reproduction history table of the analysis-result storage section 140. The predetermined time number may be inputted through the input unit 108 of the information-processing apparatus 10 to the playlist production section 150 by the user. Or, the predetermined time number may be determined in advance by the playlist production section 150 or the like. It is to be noted that the playlist production section 150 may otherwise produce a playlist in which attribute information of a predetermined number of contents is listed in the descending order (or in the ascending order) of the reproduction time number based on the reproduction time numbers of the contents described above.

Now, a case wherein the skip time number is used as the predetermined condition is described. The playlist production section 150 can produce a playlist in which attribute information of contents whose skip time number is equal to or lower than a predetermined number of times is listed based on the skip time number of contents stored in the reproduction history table of the analysis-result storage section 140. The predetermined time number may be inputted through the input unit 108 of the information-processing apparatus 10 to the playlist production section 150 by the user. Or, the predetermined time number may be determined in advance by the playlist production section 150 or the like. It is to be noted that the playlist production section 150 may otherwise produce a playlist in which attribute information of a predetermined number of contents is listed in the ascending order (or in the descending order) of the skip time number based on the skip time numbers of the contents described above.

Now, a case wherein the rest time number is used as the predetermined condition is described. The playlist production section 150 can produce a playlist in which attribute information of contents whose rest time number is equal to or lower than the predetermined number of times is listed based on the rest time number of contents stored in the reproduction history table of the analysis-result storage section 140. The predetermined time number may be inputted through the input unit 108 of the information-processing apparatus 10 to the playlist production section 150 by the user. Or, the predetermined time number may be determined in advance by the playlist production section 150 or the like. It is to be noted that the playlist production section 150 may otherwise produce a playlist in which attribute information of a predetermined number of contents is listed in the ascending order (or in the descending order) of the rest time number based on the rest time numbers of the contents described above.

Now, a case wherein the repeat time number is used as the predetermined condition is described. The playlist production section 150 can produce a playlist in which attribute information of contents whose repeat time number is equal to or greater than the predetermined number of times is listed based on the repeat time number of contents stored in the reproduction history table of the analysis-result storage section 140. The predetermined time number may be inputted through the input unit 108 of the information-processing apparatus 10 to the playlist production section 150 by the user. Or, the predetermined time number may be determined in advance by the playlist production section 150 or the like. It is to be noted that the playlist production section 150 may otherwise produce a playlist in which attribute information of a predetermined number of contents is listed in the descending order (or in the ascending order) of the repeat time number based on the repeat time numbers of the contents described above.

Now, a case wherein the computed evaluation value is used as the predetermined condition is described. The playlist production section 150 can produce a playlist in which attribute information of contents having an equal computed evaluation value or a computed evaluation value within a predetermined range is listed based on the computed evaluation value of contents stored in the content information storage section 148. The computed evaluation value which is used as a reference for production of the playlist may be inputted through the input unit 108 of the information-processing apparatus 10 to the playlist production section 150 by the user. Or, the computed evaluation value as the reference may be determined in advance by the playlist production section 150 or the like. It is to be noted that the playlist production section 150 may otherwise produce a playlist in which attribute information of a predetermined number of contents is listed in the descending order (or in the ascending order) of the computed evaluation value based on the computed evaluation values of the contents described above.

Now, a case wherein the input evaluation value is used as the predetermined condition is described. The playlist production section 150 can produce a playlist in which attribute information of contents having an equal input evaluation value or an input evaluation value within a predetermined range is listed based on the input evaluation value of contents stored in the content information storage section 148. The input evaluation value which is used as a reference for production of the playlist may be inputted through the input unit 108 of the information-processing apparatus 10 to the playlist production section 150 by the user. Or, the input evaluation value as the reference may be determined in advance by the playlist production section 150 or the like. It is to be noted that the playlist production section 150 may otherwise produce a playlist in which attribute information of a predetermined number of contents is listed in the descending order (or in the ascending order) of the input evaluation value based on the input evaluation values of the contents described above.

Or, the playlist production section 150 may produce a playlist in which attribute information of contents which is estimated to conform to the liking of the user is listed based on all or some of the total reproduction time period, reproduction time number, skip time number, rest time number, repeat time number, computed evaluation value and input evaluation value described above. In particular, the playlist production section 150 can produce a playlist in which contents conforming to the liking of the user is listed by selecting, for example, those contents which have a comparatively long total reproduction time period, a comparatively great reproduction time number and repeat time number, a comparatively small skip time number and rest time number and a high computed evaluation value and input evaluation value.

By producing a playlist based on analysis results of event logs on which a situation of reproduction operations of contents by the user is reflected in such a manner as described above, the playlist production section 150 can produce various playlists on which reproduction operations of the user are reflected.

It is to be noted that, where the analysis results stored in the analysis-result storage section 140 are analysis results of event logs of the information-processing apparatus 10, the playlist produced by the playlist production section 150 reflects reproduction operations of the user on the information-processing apparatus 10. On the other hand, where the analysis results stored in the analysis-result storage section 140 are analysis results of the event logs of the portable reproduction apparatus 20, the playlist produced by the playlist production section 150 reflects reproduction operations of the user on the portable reproduction apparatus 20. Further, where the analysis results stored in the analysis-result storage section 140 are those of event logs of both of the information-processing apparatus 10 and the portable reproduction apparatus 20, the playlist produced by the playlist production section 150 reflects reproduction operations of the user on both of the information-processing apparatus 10 and the portable reproduction apparatus 20.

The playlist storage section 152 is formed including a storage apparatus of an HDD or the like and stores the playlist produced by the playlist production section 150.

The transfer section 154 functions as an evaluation value transfer section and transfers a computed evaluation value arithmetically operated by the evaluation-value arithmetic operation section 142 to the portable reproduction apparatus 20 through the communication section 132. At this time, after the transfer of the computed evaluation value, the transfer section 154 may issue a command to the portable reproduction apparatus 20 to delete reproduction history information (event log) on which the arithmetic operation of the computed evaluation value stored in the portable reproduction apparatus 20 is based. Consequently, the reproduction history information of the portable reproduction apparatus 20 which has become unnecessary can be deleted.

Also it is possible for the transfer section 154 to transfer computed evaluation values and input evaluation values of the portable reproduction apparatus 20 stored in the content information storage section 148 to the portable reproduction apparatus 20. Further, the transfer section 154 can transmit new computed evaluation values and input evaluation values produced by synchronizing (for example, averaging) the computed evaluation values and the input evaluation values of the information-processing apparatus 10 and the computed evaluation values and the input values of the portable reproduction apparatus 20 to the portable reproduction apparatus 20.

Furthermore, the transfer section 154 functions also as a content transfer section and can transfer one or more contents stored in the content storage section 120 to the portable reproduction apparatus 20. Upon such transfer, the transfer section 154 may selectively transfer, based on the computed evaluation value and the input evaluation value of a plurality of contents to be transferred, some of the contents to be transferred. For example, those contents which have a high computed evaluation value or input evaluation value may be selectively transferred preferentially or those contents which have a computed evaluation value or an input evaluation value which is equal to or higher than a predetermined point (for example, 4.0 points or more) may be selectively transferred. This makes it possible to preferentially transfer those contents which conform to the liking of the user to the portable reproduction apparatus 20 while those contents which do not conform to the liking of the user are not transferred.

Further, where a content is ready for the subscription, or in other words, where utilization of the content is permitted for a predetermined period of time, the transfer section 154 can decide based on right information applied to the content whether or not the content is within a utilization period before the content is transferred. Then, where the content is within the utilization period, the transfer section 154 transfers the content to the portable reproduction apparatus 20, but where the content is not within the utilization period, the transfer section 154 does not transfer the content but causes an error message or the like to be displayed.

Further, the transfer section 154 functions also as a playlist transfer section and can transfer a playlist produced by the playlist-production section 150 to the portable reproduction apparatus 20. It is to be noted that the destination of transmission of the playlist by the transfer section 154 may be the portable reproduction apparatus 20 from which an event log is provided to the information-processing apparatus 10 or a content reproduction apparatus which does not have a function of recording an event log. By transmitting a playlist to such a content reproduction apparatus as just described, a playlist according to the present embodiment which reflects reproduction operations of the user on the information-processing apparatus 10 or the portable reproduction apparatus 20 can be utilized also by a common content reproduction apparatus.

When the content deletion section 156 transfers some or all of contents stored in the content storage section 120 to the portable reproduction apparatus 20 from the transfer section 154, if the content storage section 220 of the portable reproduction apparatus 20 has an insufficient capacity, then the content deletion section 156 automatically and selectively deletes some or all of the contents stored in the content storage section 220 of the portable reproduction apparatus 20 in response to the computed evaluation value or input evaluation value of the contents.

The content deletion section 156 includes, for example, a free capacity detection section of the content storage section 220 of the portable reproduction apparatus 20, and a comparison section for comparing the amount of content data of a transfer object to the portable reproduction apparatus and the free capacity detected by the free capacity detection section. The content deletion section 156 further includes a capacity shortage detection section for detecting a capacity shortage when it is decided that the free capacity is insufficient by the comparison section. The content deletion section 156 further includes a selection section for selecting, based on the computed evaluation value or input evaluation value of the contents stored in the content storage section 220 of the portable reproduction apparatus 20, one or more contents which have a data amount corresponding to the capacity shortage from among the contents. The content deletion section 156 further includes a deletion section for detecting the content data selected by the selection section from the content storage section 220 of the portable reproduction apparatus 20. The components mentioned of the content deletion section 156 are not shown in the drawings.

Then, after such automatic deletion of the contents by the content deletion section 156, the transfer section 154 transfers a content of a transfer object to the portable reproduction apparatus 20. By the configuration described, where the storage capacity of the portable reproduction apparatus 20 is insufficient, those contents of the content storage section 220 of the portable reproduction apparatus 20 which are required for the transfer can be deleted automatically. As a result, the storage capacity for storing the contents of the transfer object can be assured readily in the content storage section 220 of the portable reproduction apparatus 20. Further, by selectively deleting contents in the ascending order of the computed evaluation value or input evaluation value, it is possible to preferentially delete unnecessary contents which do not conform to the liking of the user while those necessary contents which conform to the liking of the user are left present. Accordingly, contents stored in the portable reproduction apparatus 20 can be automatically re-arranged within a limited storage capacity thereof depending upon whether or not the contents are required. Therefore, the convenience to the user is enhanced.

However, the content deletion section 156 does not delete those contents (ripped contents) ripped from the recording medium 7a by the ripping section 162 of the information-processing apparatus 10 or some other information-processing apparatus 10 from the storage medium corresponding to the portable reproduction apparatus 20, but preferentially deletes those distributed contents distributed, for example, from the distribution server 30. Consequently, such a situation that ripped contents which need be ripped again are automatically deleted without permission of the user can be prevented. Meanwhile, since it may possibly be difficult to acquire a distributed content again, the information-processing apparatus may be configured so as to preferentially delete a ripped content rather than a distributed content.

The distribution-service utilization section 158 cooperates with the distribution server 30 to perform a process relating to a content distribution service. In particular, the distribution-service utilization section 158 transmits or receives various kinds of information such as, for example, user authentication information (user ID, password or the like) necessary to utilize the content distribution service, accounting information or content distribution request information to and from the distribution server 30. Further, the distribution-service utilization section 158 supports inputting and outputting of such information.

The distribution-service utilization section 158 receives a distributed content and a license of the distributed content transmitted from the distribution server 30 through the network 5 and the communication section 115. In particular, if the user of the information-processing apparatus 10 utilizes the content distribution service to purchase a content, then the distribution-service utilization section 158 downloads the distributed content and a license, which defines a utilization condition of the distributed content, from the distribution server 30.

Further, upon such distribution of a content, the distribution-service utilization section 158 receives attribute information of the distributed content from the distribution server 30. The attribute information of the distributed content may include, for example, a title, an artist name, an album name, a genre, a reproduction time period, a content ID, distribution date/time, a data size, a data format, a type of the copyright management method and so forth.

The distribution-service utilization section 158 having such a configuration as described above is configured, for example, by installing software for a content distribution service corresponding to the content distribution service to be utilized into the information-processing apparatus 10. It is to be noted that a plurality of such distribution-service utilization sections 158 may be provided for individual ones of a plurality of content distribution services to be utilized by the user.

The evaluation-value transmission section 160 transmits computed evaluation values and input evaluation values stored in the content information storage section 148 to the distribution server 30 through the communication section 132. Consequently, the distribution server 30 can transmit the computed evaluation values and input evaluation values transmitted thereto from the information-processing apparatus 10, for example, to another apparatus owned by the same user such as another information-processing apparatus 10 so that they can be recorded into the apparatus. Consequently, the user can share computed evaluation values and input evaluation values between different apparatus owned by the user itself.

Further, the distribution server 30 can acquire the computed evaluation value and the input evaluation value of each content from a plurality of information-processing apparatus 10 owned by the same user or a plurality of users to sum up the evaluation of the content. As a result, the distribution service provider side can grasp and analyze the liking of the user (favorite artist, genre, age or the like) or a fashion (heavy seller tune or the like). Accordingly, the distribution service provider side can recommend a new content which conforms to the liking of any user.

Further, the evaluation-value transmission section 160 functions also as, for example, a reproduction history information transmission section and can transmit reproduction history information (event logs) of the information-processing apparatus 10 or the portable reproduction apparatus 20 stored in the reproduction-history storage section 130 to the distribution server 30 through the communication section 132. Consequently, the distribution server 30 can arithmetically operate a computed evaluation value based on the reproduction history information of the information-processing apparatus 10 or the portable reproduction apparatus 20 and transmit the arithmetically operated computed evaluation value to the information-processing apparatus 10 or the portable reproduction apparatus 20 so as to be recorded. In this instance, since the information-processing apparatus 10 need not perform such an evaluation value arithmetic operation process as described above, the load to the information-processing apparatus 10 can be reduced. Further, there is a merit that the distribution server 30 can sum up reproduction histories of various apparatus and the distribution service provider side can grasp and analyze the liking of users and the fashion.

The ripping section 162 rips contents recorded on the recording medium 7a such as a CD or a DVD on which music contents or video contents are recorded. In particular, the ripping section 162 controls the drive 112, for example, in response to a user input to extract music/video data from the recording medium 7a and produce, from the music/video data, a content of a format (for example, the ATRACT3 format or the like) in which the music/video data can be processed by the information-processing apparatus 10.

The search list production section 164 re-arranges (sorts) content identification information corresponding to a plurality of contents stored in the content storage section 120 based on computed evaluation values and/or input evaluation values stored in the content information storage section 148 to produce a search list. The search list is used, for example, by the user to search the contents in the content storage section 120.

More particularly, the search list production section 164 can produce a search list in which identification information of contents is sorted in the descending order of the computed evaluation value. Further, the search list production section 164 can produce a search list in which content IDs and attribute information of contents to which the same evaluation point or an evaluation point within a predetermined range is added (that is, contents whose computed evaluation value is 4.0 points or contents whose computed evaluation value is within the range from 3.0 to 5.0) are listed. The search list production section 164 outputs the produced search list to the display control section 168. Further, the search list production section 164 may transfer the produced search list to the portable reproduction apparatus 20 through the transfer section 154 so that the search list may be utilized for display control of the portable reproduction apparatus 20.

The display control section 168 controls display of various kinds of information on the display section 170. In particular, for example, the display control section 168 reads out computed evaluation values or input evaluation values regarding the same content in the content information storage section 148 and controls the display section 170 to display the input evaluation values preferentially to the computed evaluation values as described hereinabove with reference to FIG. 3. Further, if an input evaluation value of a particular content is set by the content information storage section 244 when a computed evaluation value of the particular content is displayed, then the display control section 168 controls the display section 170 to display the set input evaluation value in place of the computed evaluation value being displayed.

Further, also when the display control section 168 controls the display section 170 to display an input evaluation value corresponding to a certain content, if reproduction history information of the content is acquired from the portable reproduction apparatus 20 by the acquisition section 136, or if reproduction of the content is performed by the reproduction section 124, then the evaluation-value arithmetic operation section 142 arithmetically operates the computed evaluation value of the content again based on the reproduction history information. Then, the evaluation-value recording section 144 updates the computed evaluation value stored in the content information storage section 148 with the new computed evaluation value arithmetically operated again.

In this manner, also when an input evaluation value by manual rating is being displayed, arithmetic operation of a computed evaluation value by auto-rating is executed continuously. Consequently, even with regard to a content whose input evaluation value is set already, the computed evaluation value of the content is updated at any time to the latest value which reflects the reproduction situation then. Consequently, when a request to change over the display from display of an input evaluation value to display of a computed evaluation value is issued by a user operation, the display control section 168 can cause the latest computed evaluation value to be displayed.

Further, the display control section 168 controls the display section 170 to display a playlist stored in the playlist storage section 152. Further, when the reproduction operation section 222 performs a search for a content, the display control section 168 controls the display section 170 to display various search screens in accordance with a search list produced by the search list production section 164 in response to the substance of an operation of the user. Consequently, the display control section 168 can sort attribute information of contents stored in the content storage section 120 in the descending/ascending order of the computed evaluation value or the input evaluation value and control the display section 170 to display the attribute information. Therefore, while the user reads the substance of the display, it can search for and select a content of a high evaluation value which conforms to the liking of the user itself readily and rapidly. It is to be noted that the display section 170 is formed, for example, from the output unit 110 or the like.

Functional configurations of the components of the information-processing apparatus 10 according to the present embodiment are described above. It is to be noted that the reproduction operation section 122, reproduction section 124, date/time information production section 126, reproduction-history production section 128, connection detection section 134, acquisition section 136, reproduction-history analysis section 138, evaluation-value arithmetic operation section 142, evaluation-value recording section 144, evaluation-value input section 146, playlist production section 150, transfer section 154, content deletion section 156, distribution-service utilization section 158, evaluation-value transmission section 160, ripping section 162, search list production section 164, display control section 168 and so forth may be formed, for example, as hardware having the functions described above or may be configured by installing a program for causing a computer to implement the functions described above into the information-processing apparatus 10.

<Communication Method>

Figure 18:
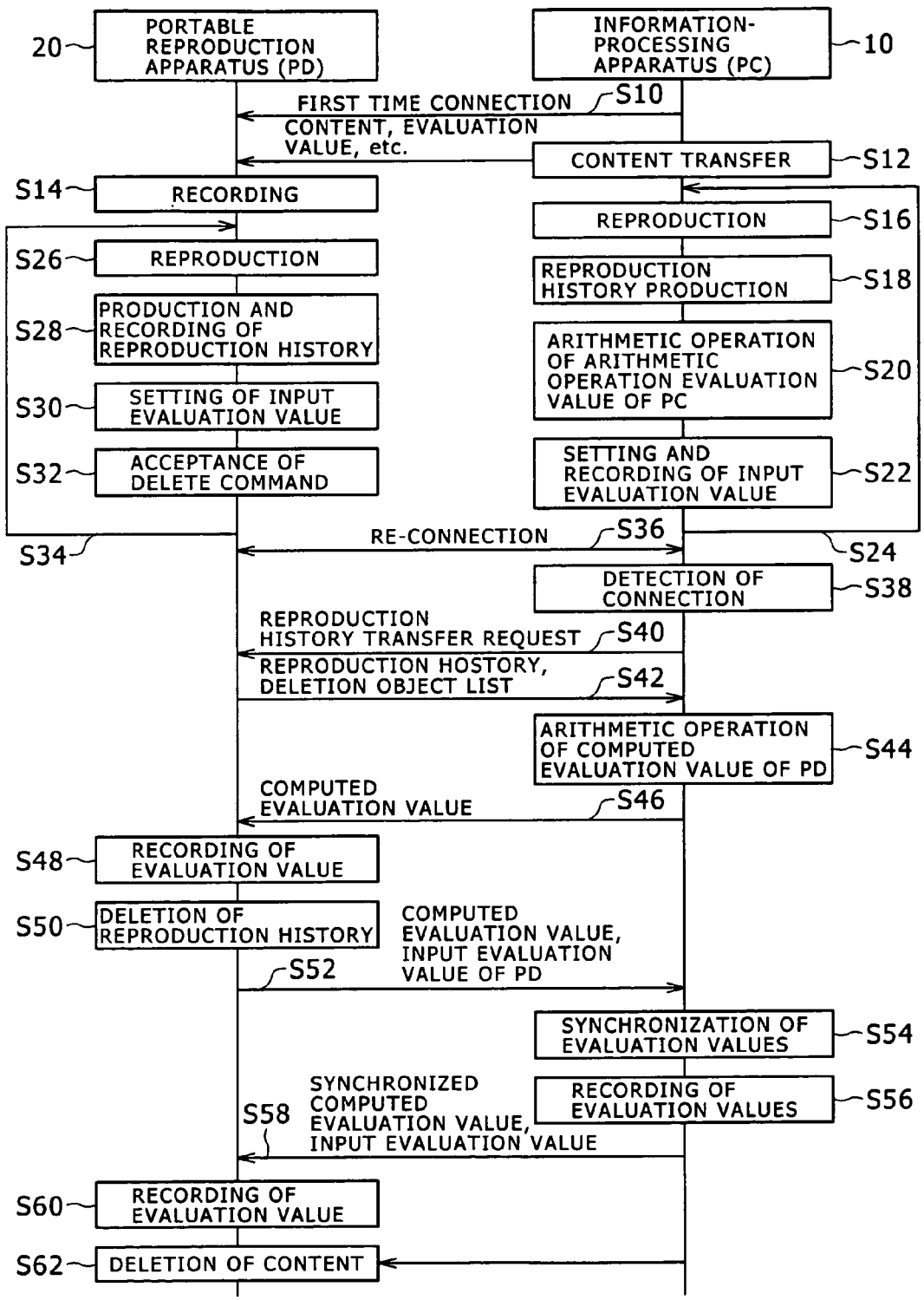
FIG. 18 is a flow chart illustrating a communication method for updating an evaluation value of a content in response to a reproduction situation and so forth according to the first embodiment of the present invention.

Now, a communication method for updating an evaluation value of a content in response to a reproduction situation or the like according to the present embodiment is described with reference to FIGS. 18 and 19A to 19E. It is to be noted that FIG. 18 is a timing chart illustrating the communication method for updating an evaluation value of a content in response to a reproduction situation or the like according to the present embodiment. FIGS. 19A to 19E are explanatory views illustrating a variation of the computed evaluation value and the input evaluation value relating to the same content stored in the information-processing apparatus 10 and the portable reproduction apparatus 20.

As an initial state, a state is assumed wherein no content is stored in the portable reproduction apparatus 20 and a plurality of contents are stored only in the information-processing apparatus 10 but reproduction of none of the contents has been performed on the information-processing apparatus 10.

In this state, the information-processing apparatus 10 and the portable reproduction apparatus 20 are connected to each other through the local line 9 as seen in FIG. 18 (step S10: initial connection step).

Then, if a transfer request for a content is received from the user, then the information-processing apparatus 10 transfers the contents stored in the content storage section 120 to the portable reproduction apparatus 20 (step S12). At this time, together with the contents, the computed evaluation value added to each content, an input evaluation value if this is set, a content ID, and attribute information such as a title, an album name, an artist name and so forth are transferred. It is to be noted that such a transfer process may be executed automatically by the information-processing apparatus 10 which detects the connection thereof to the portable reproduction apparatus 20.

As a result, the portable reproduction apparatus 20 records the contents transferred thereto into the content storage section 220 and records the attribute information including the evaluation values into the reproduction section 224 (step S14). In this state, both of the computed evaluation value added to one content stored in the information-processing apparatus 10 (the computed evaluation value is hereinafter referred to as "computed evaluation value of the information-processing apparatus 10") and the computed evaluation value added to the one content stored in the portable reproduction apparatus 20 (the computed evaluation value is hereinafter referred to as "computed evaluation value of the portable reproduction apparatus 20) are equal to their initial value, that is, 3.0. Further, as seen in FIG. 19a, both of the input evaluation value added to the one content stored in the information-processing apparatus 10 (the input evaluation value is hereinafter referred to as "input evaluation value of the information-processing apparatus 10") and the input evaluation value added to the one content stored in the portable reproduction apparatus 20 (the input evaluation value is hereinafter referred to as "input evaluation value of the portable reproduction apparatus 20") are not set as yet.

Here, it is assumed that the connection is interrupted later and a content is reproduced on each of the information-processing apparatus 10 and the portable reproduction apparatus 20.

First, a reproduction process on the information-processing apparatus 10 side is described. On the information-processing apparatus 10 side, when a content is reproduced (step S16; reproduction step), reproduction history information of the reproduced content is produced (step S18; reproduction history information production step). Then, a computed evaluation value of the content is arithmetically operated based on the reproduction history information and recorded into the content information storage section 148 (step S20; evaluation value arithmetic operation step). It is to be noted that the produced reproduction history information may be stored or otherwise may be deleted immediately after arithmetic operation of the computed evaluation value. Further, if a user input for setting an input evaluation value is received, then an input evaluation value of the content is set and recorded into the content information storage section 148 (step S22; evaluation value recording step). Such processes at steps S16 to S22 as described above are repetitively executed every time reproduction of the content is repeated (step S24).

For example, if the same content is reproduced three times in a reproduction time period equal to or longer than the predetermined addition reference time period N (for example, N=60 seconds) by the information-processing apparatus 10 as seen in FIGS. 19A to 19B, then the computed evaluation value is incremented successively by three times by "0.2" points. Further, if the content is reproduced twice in a reproduction time period shorter than a subtraction reference time period M (for example, M=60 seconds), then the computed evaluation value is successively decremented twice by "0.1" point. As a result, the computed evaluation value of the information-processing apparatus 10 is updated successively to "3.0"→"3.2"→"3.41"→"3.6"→"3.5"→"3.4" points.

In this manner, the computed evaluation value of the information-processing apparatus 10 is updated on the real time basis in response to a reproduction process, and the latest computed evaluation value is displayed at any time.

On the other hand, if "3" is inputted as an input evaluation value of the content on the information-processing processing apparatus 10 by the user as seen in FIGS. 19B and 19C, then the input evaluation value of the content is set to 3.0. Also the setting of the input evaluation value is displayed on the display screen at any time.

Now, a reproduction process on the portable reproduction apparatus 20 side is described. On the portable reproduction apparatus 20 side, when a content is reproduced (step S26; reproduction step), reproduction history information of the reproduced content is produced and recorded (step S28; reproduction history information production step). However, arithmetic operation of a computed evaluation value is not performed. Further, if a user input to set a computed evaluation value is received, then an input evaluation value of the content is set and recorded into the content information storage section 244 (step S30; input evaluation value setting step). Further, if a command to delete a content is issued by the user, then the content ID of the content is registered into a deletion object list (step S32; delete-command acceptance step). However, even if the delete command is received, the portable reproduction apparatus 20 itself does not delete the content. As a result, the content is not deleted until the portable reproduction apparatus 20 is connected to the information-processing apparatus 10. Such processes at steps S26 to S32 as described above are executed repetitively every time reproduction of the content is repeated (step S34).

For example, even if the same content is reproduced ten times in a reproduction time period equal to or longer than the predetermined addition reference time period N (for example, N=60 seconds) by the portable reproduction apparatus 20 as seen in FIGS. 19A to 19B, the computed evaluation value is not incremented nor decremented but remains "3.0" points. In this manner, even if reproduction of a content is performed on the portable reproduction apparatus 20, the computed evaluation value of the portable reproduction apparatus 20 is not updated while only reproduction history information is recorded. Further, even if a delete-command is received, the computed evaluation value is not decremented immediately.

Further, if "5" is inputted as an input evaluation value of the content on the portable reproduction apparatus 20 by the user as seen in FIGS. 19B and 19C, then the input evaluation value of the content is set to "5.0". Different from the setting of the computed evaluation value described above, the setting of the input evaluation value is immediately reflected on the display screen.

Thereafter, the information-processing apparatus 10 and the portable reproduction apparatus 20 are connected to each other again (step S36; re-connection step).

As a result, if the information-processing apparatus 10 detects the connection to the portable reproduction apparatus 20 (step S38; connection detection step), then it issues a reproduction history transfer request to the portable reproduction apparatus 20 (step S40; reproduction history transfer requesting step). In accordance with the reproduction history transfer request, the reproduction history information and the deletion object list stored in the portable reproduction apparatus 20 are transferred to the information-processing apparatus 10, and the information-processing apparatus 10 acquires the thus transferred reproduction history information of the portable reproduction apparatus 20 (step S42; transfer step, acquisition step).

Then, the information-processing apparatus 10 arithmetically operates a computed evaluation value corresponding to the content data based on the reproduction history information of the portable reproduction apparatus 20 acquired at step S42 described hereinabove (step S44; evaluation value arithmetic operation step). At this time, the information-processing apparatus 10 may transfer the reproduction history information of the portable reproduction apparatus 20 to the distribution server 30. Further, the reproduction history information of the information-processing apparatus 10 may be transferred to the distribution server 30 at any time upon production at step S18 described hereinabove.

Further, the information-processing apparatus 10 transfers the computed evaluation value arithmetically operated at step S44 described hereinabove to the portable reproduction apparatus 20 (step S46; transfer step). Thereafter, the transferred computed evaluation value is recorded into the portable reproduction apparatus 20 (step S48; evaluation value recording step). Further, the reproduction history information of the portable reproduction apparatus 20 transferred at step S42 described hereinabove is deleted from the reproduction-history storage section 230 of the portable reproduction apparatus 20 (step S50; reproduction history deletion step).

As a result, as seen in FIGS. 19C and 19D, the computed evaluation value of the portable reproduction apparatus 20 is updated from "3.0" to "4.0" reflecting a result of the addition of "0.2×10=2.0" points by ten times of reproduction of the content and the subtraction of "1.0" point by acceptance of the delete command.

Thereafter, a synchronization process of the evaluation values of the information-processing apparatus 10 and the evaluation values of the portable reproduction apparatus 20 is started.

First, the computed evaluation values and the input evaluation values of all contents stored in the portable reproduction apparatus 20 are transferred to the information-processing apparatus 10, and the information-processing apparatus 10 acquires the transferred computed evaluation values and input evaluation values (step S52; transfer step, acquisition step).

Then, the information-processing apparatus 10 performs arithmetic operation of summing up the computed evaluation values and the input evaluation values of all contents of the portable reproduction apparatus 20 acquired as described above and the computed evaluation values and the input evaluation values of the pertaining contents stored in the information-processing apparatus 10 and determining average values of the evaluation values. Consequently, new computed evaluation values and input evaluation values synchronized with each other regarding the contents are calculated (step S54; evaluation value synchronization step).

Thereafter, the information-processing apparatus 10 records the new computed evaluation values and input evaluation values synchronized in such a manner as described above into the content information storage section 148 of the information-processing apparatus 10 to update the evaluation values (step S56; evaluation value recording step). Further, the information-processing apparatus 10 transfers the synchronized new computed evaluation values and input evaluation values to the portable reproduction apparatus 20 (step S58; transfer step). Thus, the portable reproduction apparatus 20 records the computed evaluation values and the input evaluation values transferred thereto into the content information storage section 244 to update the evaluation values (step S60; evaluation value recording step).

The synchronization process of the evaluation values is completed thereby. As a result of the synchronization process, both of the computed evaluation values of the information-processing apparatus 10 and the portable reproduction apparatus 20 become "(4.0+3.4)/2=3.7" points which is an average value between them as seen in FIGS. 19D and 19E. Further, both of the input evaluation values of the information-processing apparatus 10 and the portable reproduction apparatus 20 become "(5.0+3.0)/2=4.0" points which is an average value between them. It is to be noted that the evaluation values are not limited to such examples, but in the synchronization process, not an average value of both evaluations values may be determined simply, but the evaluation values may be selectively weighted.

Thereafter, the information-processing apparatus 10 deletes contents corresponding to content IDs registered in the deletion object list from the content storage section 220 of the portable reproduction apparatus 20 (step S62; content deletion step). At this time, also the attribute information of the contents is deleted from the content information storage section 244 of the portable reproduction apparatus 20.

A communication method for updating evaluation values of contents in response to a reproduction situation and so forth according to the present embodiment is described above. According to the method, the evaluation values of contents stored in the information-processing apparatus 10 and the portable reproduction apparatus 20 can be increased or decreased so as to reflect the liking of the user in response to a reproduction situation of the contents or to a delete command of the user. Further, since the evaluation values of the portable reproduction apparatus 20 can be arithmetically operated and updated by the information-processing apparatus 10, there is no necessity to demand the portable reproduction apparatus 20 for a high processing capacity. Consequently, such a situation that the battery of the portable reproduction apparatus 20 may be exhausted inadvertently by processes other than reproduction processes of contents can be suppressed.

<Display Changeover Method>

Figure 20:
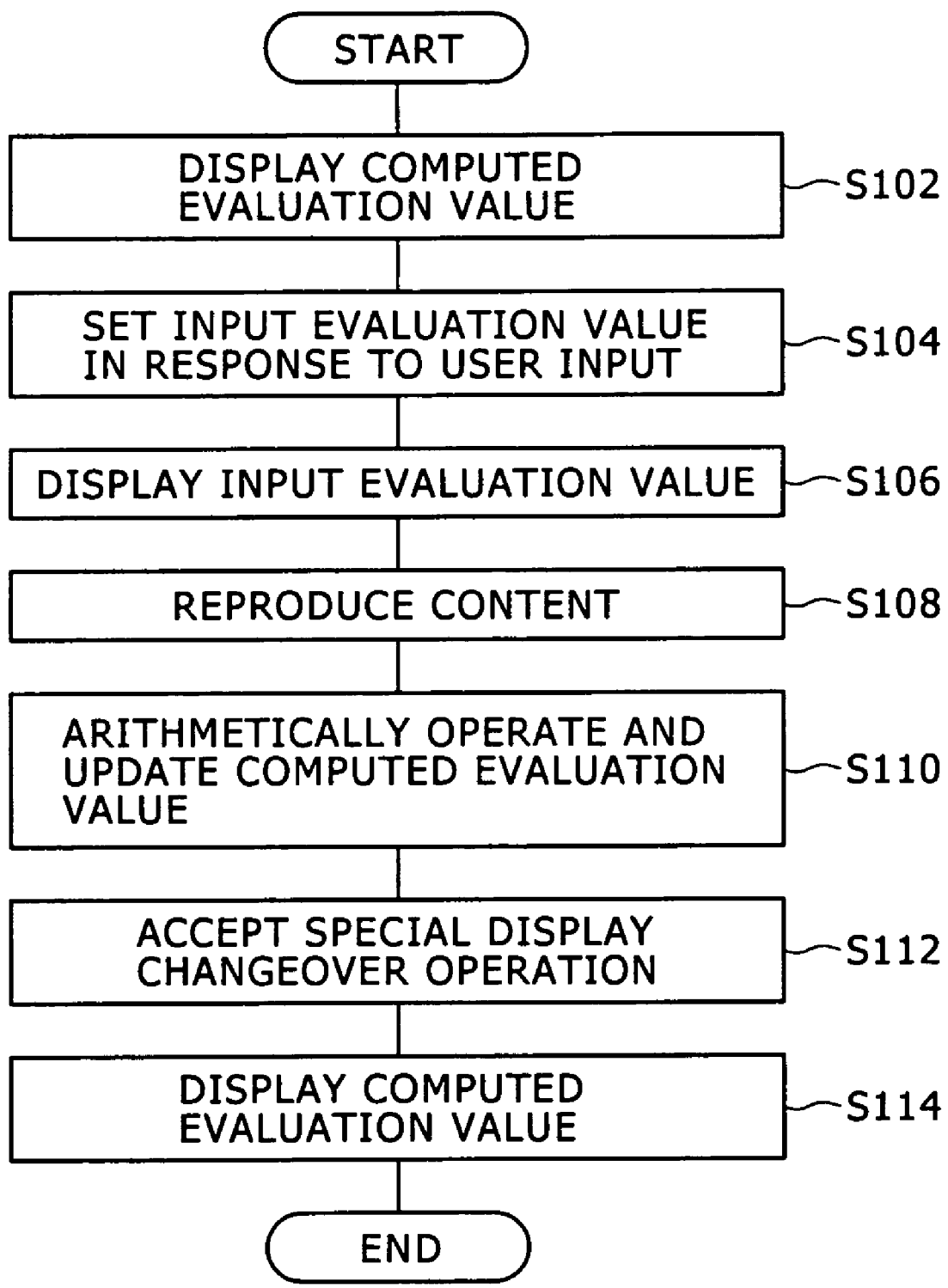
FIG. 20 is a flow chart illustrating a display changeover method between a computed evaluation value and an input evaluation value in the information-processing apparatus.

Now, a display changeover method between a computed evaluation value and an input evaluation value on the information-processing apparatus 10 and the portable reproduction apparatus 20 according to the present embodiment is described with reference to FIG. 20. FIG. 20 is a flow chart illustrating the display changeover method between a computed evaluation value and an input evaluation value on the information-processing apparatus 10 according to the present embodiment. It is to be noted that, while an example of a display changeover process of the information-processing apparatus 10 is described below, also the display changeover process of the portable reproduction apparatus 20 is substantially same. Therefore, detailed description of the display changeover process of the portable reproduction apparatus 20 is omitted herein to avoid redundancy.

Referring to FIG. 20, when an input evaluation value for a certain content is not set as yet, the computed evaluation value of the content is displayed on the display screen 4a during reproduction of the content as seen in FIG. 3A (step S102).

Then, if an input evaluation value for the content is set in response to a user input by the evaluation-value input section 146 (step S104), then the display control section 168 controls so that the computed evaluation value set in this manner is displayed on the display screen 4b as seen in FIG. 3B in place of the computed evaluation value being displayed (step S106). By displaying the input evaluation value preferentially to the computed evaluation value in this manner, the evaluation value which reflects the will of the user can be displayed preferentially. Consequently, the convenience to the user is enhanced.

However, also in the mode in which the display control section 168 displays the input evaluation value preferentially to the computed evaluation value of the content in this manner, every time reproduction history information of the content is acquired from the portable reproduction apparatus 20 by the acquisition section 136, or every time reproduction of the content is performed by the reproduction section 124 (step S108), the evaluation-value arithmetic operation section 142 arithmetically operates the computed evaluation value of the content based on the reproduction history information to calculate a new computed evaluation value. Then, the evaluation-value recording section 144 updates the computed evaluation values stored in the content information storage section 148 successively with new computed evaluation values (step S110). Consequently, also with regard to a content whose input evaluation value is set already, the computed evaluation value is updated at any time to the latest value which reflects a reproduction situation.

Further, if, in the mode in which an input evaluation value is displayed, a display changeover operation to a computed evaluation value by the user is accepted (step S112), then the display control section 168 causes the computed evaluation value to be displayed in place of the input evaluation value of the content (step S114). Consequently, the user can confirm the latest computed evaluation value in a state wherein the input evaluation value remains set.

<Screen Display Examples>

Now, display screens which may be displayed on the display section 250 of the portable reproduction apparatus 20 are described with reference to FIG. 21.

Figure 21:
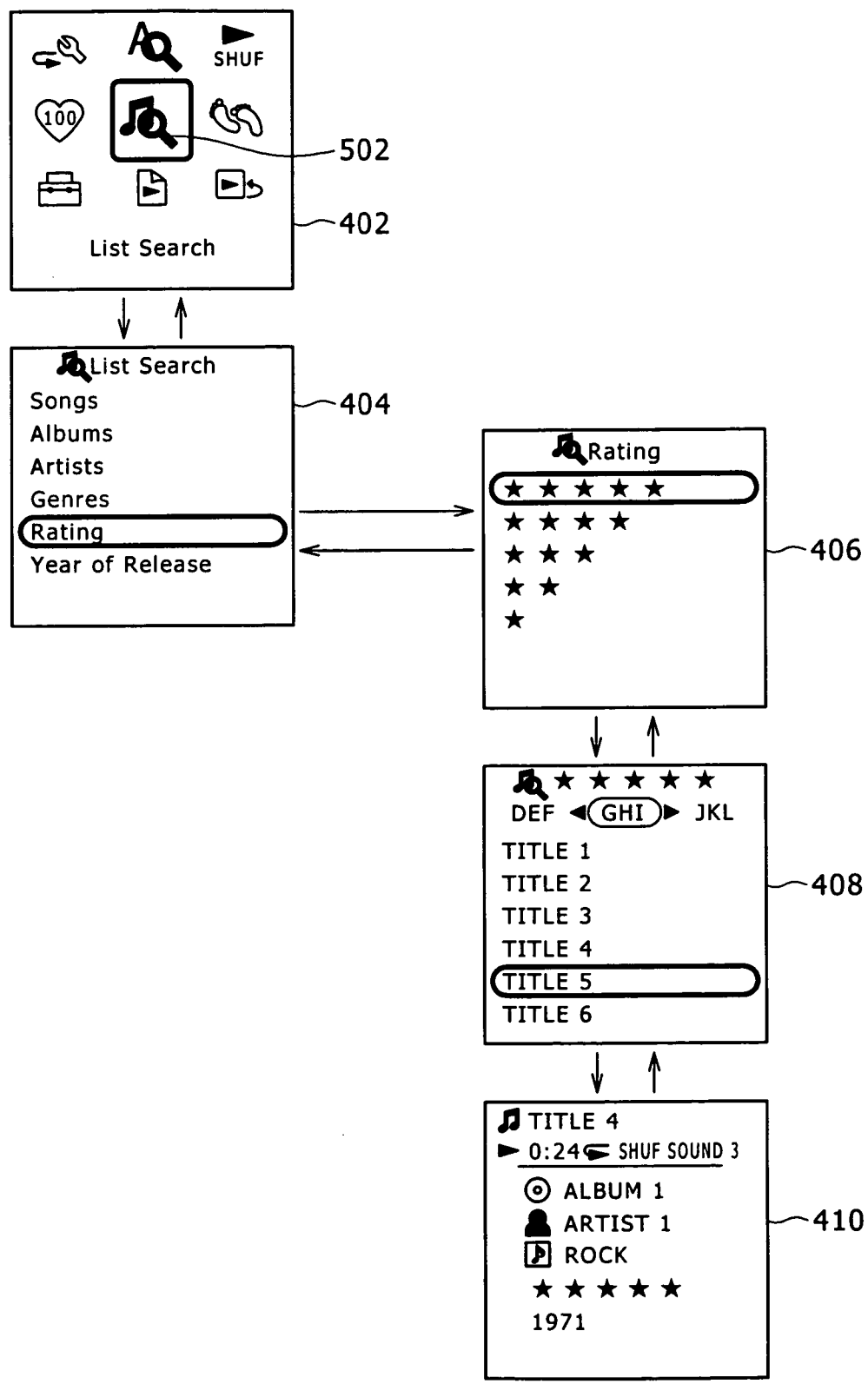
FIG. 21 is a schematic view showing an example of display screens for searching for and reproducing a content conforming to the liking of the user making use of the evaluation values in the information-processing apparatus.

FIG. 21 illustrates an example wherein display screens 402 to 410 for searching for and reproducing a content conforming to the liking of the user making use of the evaluation values added to individual contents in such a manner as described above are displayed on the display section 250.

Referring to FIG. 21, if the user first selects an icon 502 representative of a list search for a content on the operation selection screen 402, then a plurality of search keys are displayed on the search key selection screen 404. Then, if the search key "Rating" representative of a search based on rating (evaluation value) is selected on the search key selection screen 404, then the evaluation value level is displayed at five stages on the evaluation value level selection screen 406. Further, if a desired evaluation value level "★★★★★" is selected on the evaluation value level selection screen 406, then titles 1, 2, 3, . . . of the contents to which evaluation values of the evaluation value level are sorted and displayed, for example, in the descending order of the evaluation value on the search result display screen 408. Then, if the title "title 4" of the content which the user wants to reproduce is selected on the search result display screen 408, then reproduction of the content of the title is started, and detailed information of the selected content is displayed on the content information display screen 410. On the content information display screen 410, information of a title name, a reproduction time period, an album name, an artist name, a genre, an evaluation value, and a year of release is displayed as seen in FIG. 21. The user can enjoy a desired one of the contents reproduced while reading the information of the content displayed on the content information display screen 410 to confirm the attribute of the content.

<Application 1>

Figure 22:
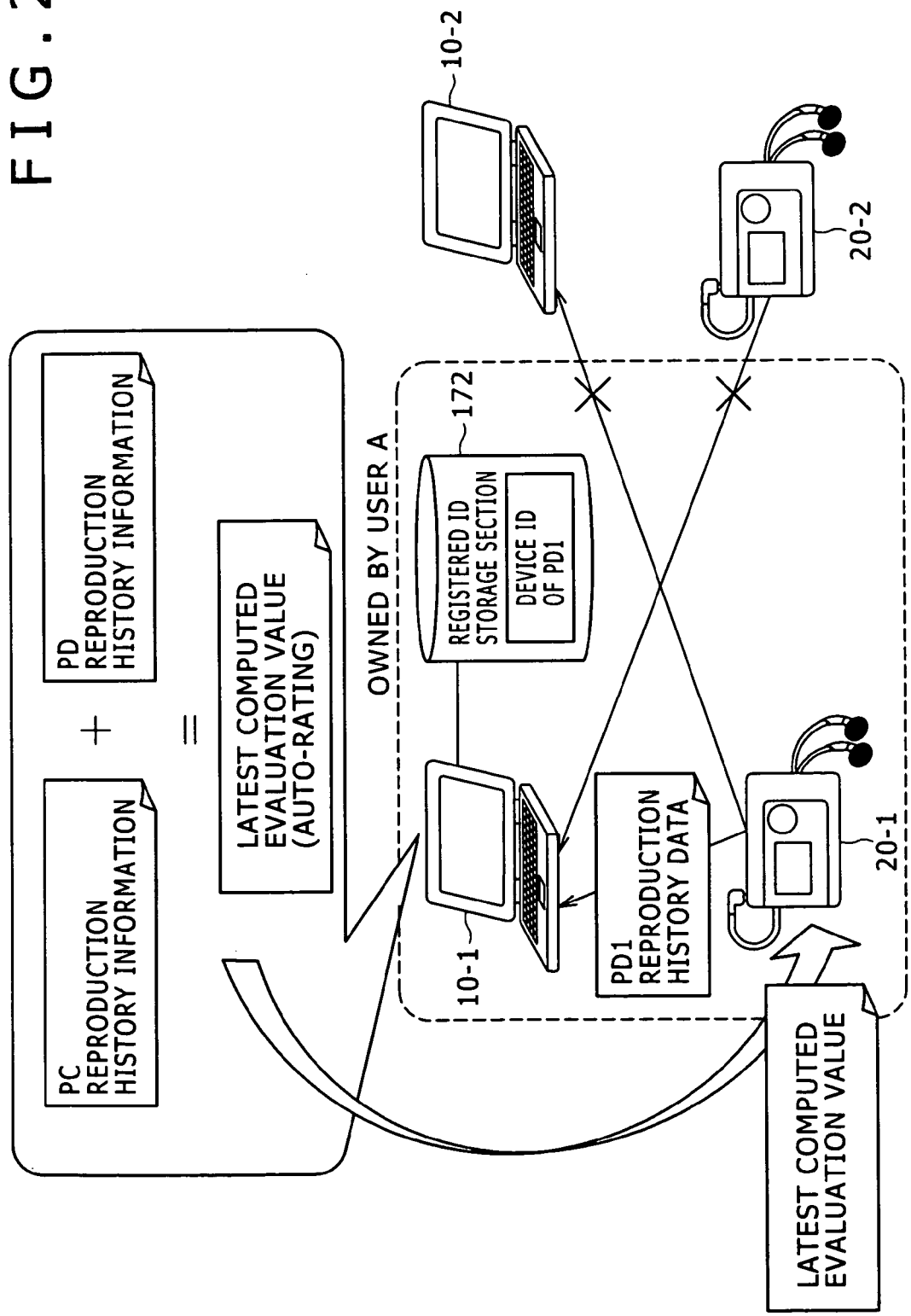
FIG. 22 is a view illustrating an example wherein the communication system is applied to a copyright management system of the check-in check-out type.

Now, an example wherein the communication system 100 according to the present embodiment is applied to a copyright management system of the check-in check-out type is described. FIG. 22 shows the example wherein the communication system according to the present embodiment is applied to a copyright management system of the check-in check-out type.

Referring to FIG. 22, the copyright management system of the check-in check-out type restricts utilization (reproduction, copying and so forth) of a content based on utilization conditions described in a license (right information) of the content to manage the copyright of the content, as proposed by the SDMI (Secure Digital Music Initiative) and so forth.

The copyright management system of the check-in checkup cannot decide whether or not the information-processing apparatus 10-1 and the portable reproduction apparatus 20-1 are owned by the same user. Accordingly, in order to prevent the computed evaluation values of the auto-rating from being updated in synchronism with each other when a portable reproduction apparatus 20 of a certain user is connected to an information-processing apparatus 10 of another user, it is necessary to restrict the number of portable reproduction apparatus 20 which make an object of synchronization of the evaluation value with a single information-processing apparatus 10 to one.

To this end, each information-processing apparatus 10 includes a registration ID storage section 172 for storing a device ID of a portable reproduction apparatus 20 for which arithmetic operation of the evaluation value by the evaluation value arithmetic operation section 142 is permitted. Thus, upon connection of the information-processing apparatus 10 and the portable reproduction apparatus 20, the information-processing apparatus 10 acquires the device ID of the portable reproduction apparatus 20 together with reproduction history information of the portable reproduction apparatus 20. Then, the evaluation value arithmetic operation section 142 performs arithmetic operation of the computed evaluation value only when the device ID stored in the registration ID storage section 172 and the acquired device ID coincide with each other. At this time, by restricting the number of device IDs which can be registered in the registration ID storage section 172 to one, the one-by-one corresponding relationship between the information-processing apparatus 10 and the portable reproduction apparatus 20 can be maintained.

In particular, in the example of FIG. 22, only the device ID of the portable reproduction apparatus 20-1 owned by the user A is registered in the information-processing apparatus 10-1 owned similarly by the user A. Therefore, when the information-processing apparatus 10-1 and the portable reproduction apparatus 20-1 are connected to each other, the computed evaluation value of the portable reproduction apparatus 20 can be arithmetically operated to establish the synchronism between the computed evaluation values and the input evaluation values of the information-processing apparatus 10-1 and the portable reproduction apparatus 20-1.

However, when the information-processing apparatus 10-1 owned by the user and the portable reproduction apparatus 20-2 owned by another user are connected to each other or when the portable reproduction apparatus 20-1 owned by the user A and another information-processing apparatus 10 owned by another user are connected each other, the computed evaluation values of the portable reproduction apparatus 20-1 and 20-2 cannot be arithmetically operated. Also the computed evaluation values and the input evaluation values of the apparatus connected in this manner cannot be synchronized with each other.

By the configuration described above, the corresponding relationship between the information-processing apparatus 10 and the portable reproduction apparatus 20 can be maintained and updating of any computed evaluation value can be prevented from being updated by functioning of the auto-rating when apparatus of different users are connected to each other.

<Application 2>

Now, an example wherein the communication system 100 according to the present embodiment is applied to a copyright management system of the group management type is described with reference to FIGS. 23 to 26.

First, an outline of the copyright management system of the group management according to the present application is described.

The copyright management system of the group management type is configured so as to manage utilization of a content between a plurality of apparatus (information-processing apparatus 10, portable reproduction apparatus 20 or the like). In particular, the copyright management system restricts utilization of contents between apparatus owned by different users in order to prevent such illegal utilization of the contents as an act of mass distribution and so forth of contents through the Internet or the like.

On the other hand, the copyright management system allows contents to be shared and utilized freely to some degree between a plurality of apparatus owned by a same user (including, for example, not only a sole user but also a user group within a limited range such as members of a family, friends, colleagues and so forth).

In this manner, the copyright management system according to the present application adopts a copyright management method wherein, while copyright management is performed, sharing of contents is acknowledged within a range of private utilization such that the convenience and the degree of freedom in content sharing between a plurality of apparatus owned by a same user can be enhanced.

In the conventional copyright management system which relies on the "check-in check-out method" complying with the SDMI described hereinabove, illegal utilization of contents is restricted by restricting the copy number (number of times of check-in and check-out) of a content in a "unit of a content" based on a license which is right information which prescribes utilization power of the content. In such a system as just described, since a copyright management process must be performed every time a content is copied (check-in check-out) between a plurality of content processing apparatus. Therefore, the copyright management system has a drawback in that the system configuration is complicated and the processing speed is low and besides the degree of freedom in content utilization within a range of private utilization is low, resulting in lack of the convenience. Further, in such a conventional copyright management system of the check-in check-out type as described above, the user must always be conscious of the copy source or the number of times of copying of a content when it utilizes the system. Further, "prevention of copying of a content to an apparatus owned by another person" which is the original object of the copyright management system is not implemented.

In contrast, the copyright management system of the group management type performs such copyright management that the management unit in content utilization is a "content providing source (source)" unit (particularly, a "unit of a user by whom a content is owned first" or a "unit of an apparatus by which a content is produced") and reproduction of a content by each apparatus is permitted/inhibited in response to a providing source of the content.

More particularly, in the copyright management system of the group management type, a plurality of apparatus owned by each user are group-registered in a unit of a user into a group management server, and each of the apparatus registered as a group controls reproduction of a content based on a source ID representative of a providing source of the content and a source ID list. By the control, a content of the same providing source can be copied and reproduced between and by the apparatus registered in the apparatus group of the same user.

Now, an outline of group registration into such a copyright management system of the group management type as described above is described with reference to FIG. 23. It is to be noted that FIG. 23 is an explanatory view showing an outline of group registration of the copyright management system according to the present application.

Figure 23:
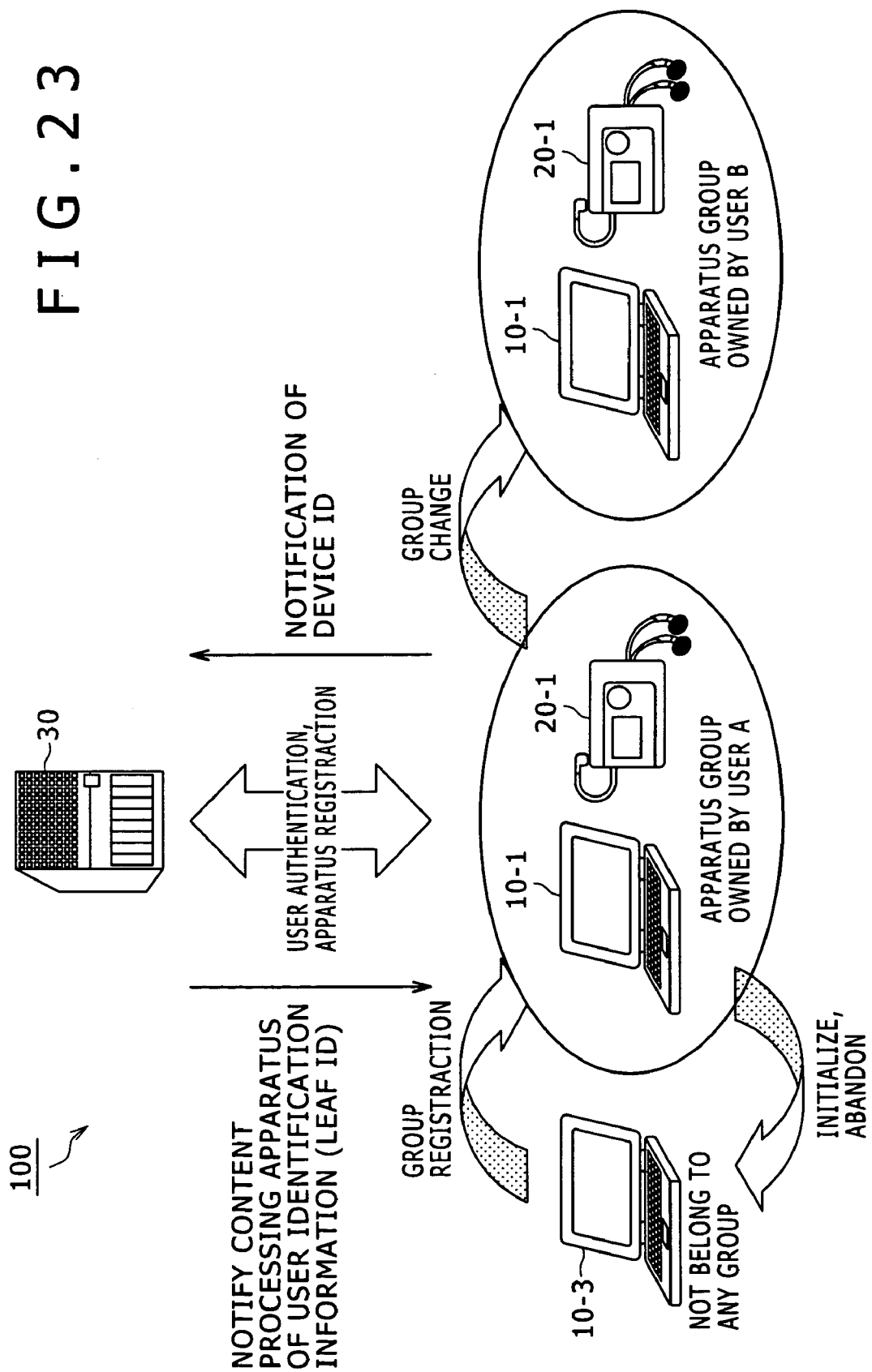
FIG. 23 is a view illustrating an outline of group registration in a copyright management system of the group management type.

As shown in FIG. 23, information-processing apparatus (PC) 10-1 and 10-2 and portable reproduction apparatus (PD) 20-1 and 20-2 are grouped, for example, into an apparatus group (information-processing apparatus 10-1 and portable reproduction apparatus 20-1) owned by a user A and another apparatus group (information-processing apparatus 10-2 and portable reproduction apparatus 20-2) owned by another user B. Such grouping of the apparatus is performed by registering the information-processing apparatus 10 and the portable reproduction apparatus 20 in a unit of a user as a group into a group management server 32.

The group registration is described particularly taking the information-processing apparatus 10-1 owned by the user A as an example. First, the user A would use the information-processing apparatus 10-1 owned by the user A itself to access the group management server 32 to perform a user authentication process and transmit a device ID (for example, a terminal ID) of the information-processing apparatus 10-1 to the group management server 32. Then, the group management server 32 stores the device ID of the information-processing apparatus 10-1 in a coordinated relationship with the user A and group-registers the device ID of the information-processing apparatus 10-1. Further, the group management server 32 transmits user identification information (for example, a leaf ID hereinafter described) representative of the user A to the information-processing apparatus 10-1, and the information-processing apparatus 10-1 stores the received user identification into a storage section of the information-processing apparatus 10-1 itself. Similarly, also the other information-processing apparatus 10 is group-registered. The group registration of each of the portable reproduction apparatus (PD) 20 is performed through an information-processing apparatus (PC) 10.

In such group registration, one apparatus (information-processing apparatus 10 and portable reproduction apparatus 20) can be registered only into an apparatus group of a single user but cannot be registered into an apparatus group of any other user at a time. Accordingly, if the owner of the information-processing apparatus 10 is changed from the user A to the user B, then it is necessary to change the group registration of the information-processing apparatus 10, that is, to perform registration cancellation from the apparatus group of the user A and re-registration into the apparatus group of the user B.

Further, for example, if the user A newly purchases an information-processing apparatus 10-3, then since the information-processing apparatus 10-3 is in a state wherein it does not belong to any group, the information-processing apparatus 10-3 can be group-registered into the apparatus group of the user A in a similar manner as described above. On the other hand, also it is possible to cancel the group registration of the information-processing apparatus 10-1 registered already in the apparatus group of the user A so that it does not belong to any group.

In this manner, in the copyright management system 100 of the group management type, individual apparatus are group-registered in a unit of a user who owns the apparatus into the group management server 32. As a result, between apparatus registered in an apparatus group of the same user, a content can be shared freely. On the other hand, a content cannot be shared between apparatus which are registered in apparatus groups of different users.

Here, an outline of copyright management of the group management type as described above is described with reference to FIG. 24. It is to be noted that FIG. 24 is a block diagram showing principal components of the copyright management system according to the present application.

Figure 24:
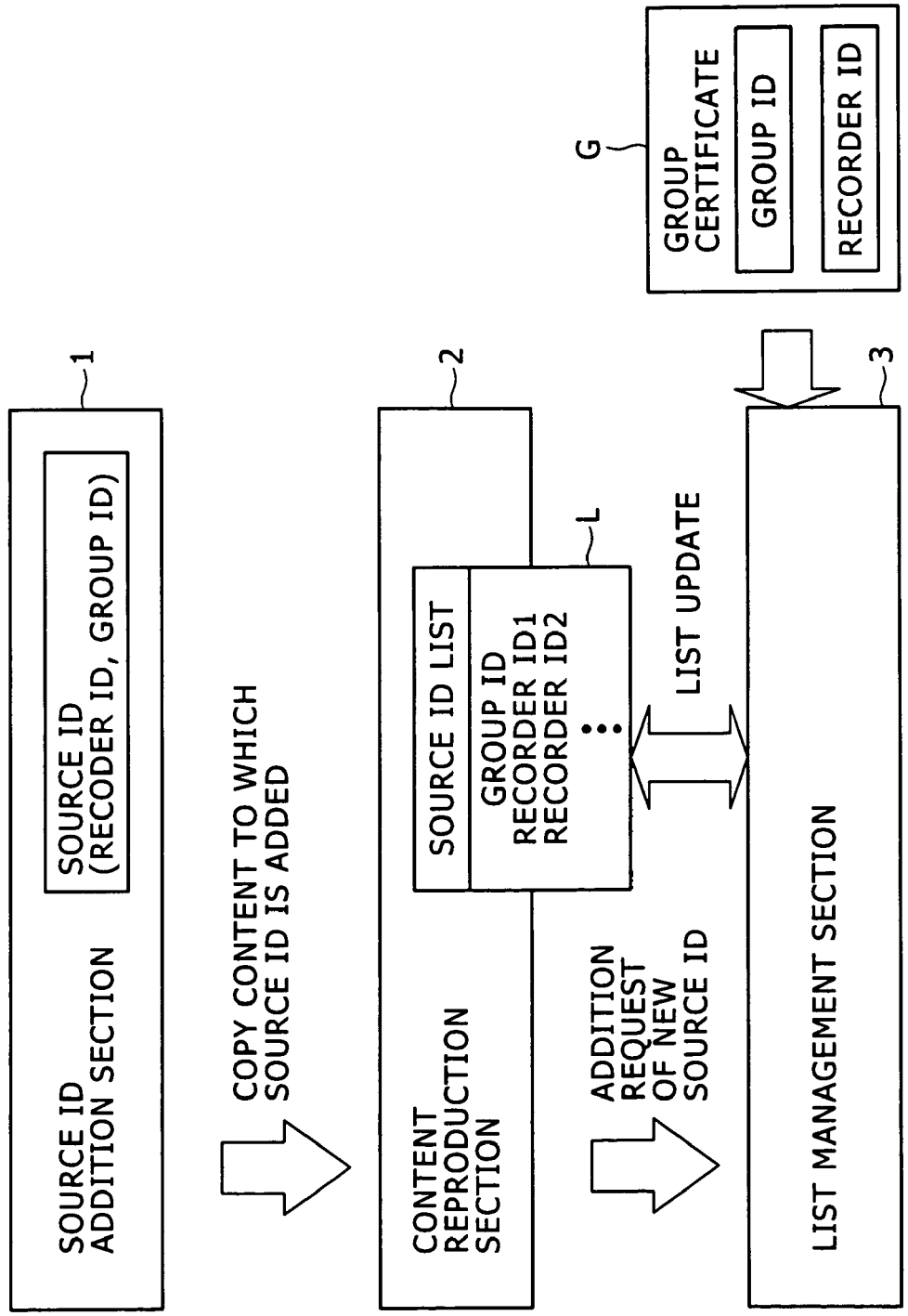
FIG. 24 is a diagrammatic view showing principal components of the copyright management system.

As shown in FIG. 24, the copyright management system according to the present application includes a source ID addition section 1, a content reproduction section 2 and a list management section 3 as principal components thereof.

The source ID addition section 1 is provided, for example, in an information-processing apparatus 10 or the like and has a function of adding, to a content, a source ID representative of a providing source of the content. It is to be noted that "to add a source ID to a content" signifies to coordinate a source ID with a content, and this includes, for example, a process of adding data of a source ID into a file (content file) which includes content data, another process of coordinating the content file and a file including the data of the source ID with each other, and so forth.

Further, the "providing source of a content" signifies the source on the personal user level of a content shared in the copyright management system 100. In particular, the providing source of a content is, for example, (1) a user who utilizes a content distribution service to acquire (purchase or the like) the content, (2) an information-processing apparatus 10 which produces the content by ripping, self recording or the like, or the like. The source ID mentioned hereinabove is an identifier applied uniquely to each of such content providing sources. A providing source of a content which is distributed in the system can be specified by adding the source ID to the content.

In the present application, for example, a recorder ID and a group ID are used each as a source ID. The recorder ID is a source ID used where an information-processing apparatus 10 is a providing source of a content, and the group ID is a source ID used where a user is a providing source of a content.

The recorder ID is an identifier applied uniquely in a unit of an information-processing apparatus 10 which has a content ripping function. The recorder ID is produced by an information-processing apparatus 10 having the ripping function mentioned hereinabove based on an device ID or the like of the information-processing apparatus 10 and is retained safely in the information-processing apparatus 10. When a content is ripped from a removable recording medium such as a music CD, the information-processing apparatus 10 adds the recorder ID of the information-processing apparatus 10 itself to the ripped content. Accordingly, an information-processing apparatus 10 of a producing source of a ripped content (accordingly, a providing source of the content) can be specified from such a recorder ID as just described.

Meanwhile, the group ID is an identifier applied uniquely in a unit of a user who owns an information-processing apparatus 10 and/or a portable reproduction apparatus 20. In particular, the group ID is applied in a unit of a user account of a content sharing service provided by the copyright management system. An apparatus group to which an information-processing apparatus 10 or a portable reproduction apparatus 20 belongs and an owner of the apparatus can be identified from such a group ID as just described.

In the present application, the group ID is produced based on a leaf ID, for example, upon group registration of an information-processing apparatus 10 or upon reception of a distribution content by the information-processing apparatus 10. The leaf ID is an identifier applied in a unit of a user and is produced, for example, upon user registration into the group management server 32 by the group management server 32. Such a leaf ID as just described is formed as an example of user identification information and is conveyed from the group management server 32 to the information-processing apparatus 10 upon group registration of or upon content distribution to each apparatus.

The information-processing apparatus 10 produces a group ID based on a leaf ID and a service ID received from the group management server 32. The service ID is an ID unique in a unit of a content distribution service or a ripping content sharing service implemented by the copyright management system 100. Here, the content distribution service is a service of distributing a content from the content distribution server to an information-processing apparatus 10. Meanwhile, the ripping content sharing service is a service of performing the group registration described hereinabove to make it possible to share a ripped content between a plurality of information-processing apparatus 10 and portable reproduction apparatus 20 owned by the same user.

For example, where the content distribution service and the ripped content sharing service are not managed separately from each other but a common service ID is used for both services, the service ID and the leaf ID are joined together in the following manner to produce one group ID.
"Group ID"="service ID"+"leaf ID"

On the other hand, where the content distribution service and the ripped content sharing service are managed separately from each other, a content distribution service ID unique in a unit of a content distribution service and a ripped content sharing service ID unique in a unit of a ripped content sharing service are produced. Therefore, the service ID and the leaf ID of each service are joined together in the following manner to produce two group IDs corresponding to the two services.
"First group ID"="content distribution service ID"+"leaf ID"
"Second group ID"="ripped content sharing service ID"+"leaf ID"

The first group ID of the two IDs is applied to a distribution content, which is distributed from the content distribution server, in order to identify a user who purchases the distribution content. Meanwhile, the second group ID is used as a reference with which, when a recorder ID is to be added to a source ID list hereinafter described in order for an information-processing apparatus 10 and a portable reproduction apparatus 20 to share a ripped content therebetween, it is decided whether or not such addition should be permitted.

In the present application, for example, the latter technique wherein a first group ID and a second group ID are produced is adopted. However, in the following description, the first group ID and the second group ID are not distinguished from each other but are both represented as group ID for the convenience of description.

Such a group ID as just mentioned is added to a distribution content distributed from the content distribution server, for example, by the information-processing apparatus 10. By applying a group ID to a distribution content in this manner, a user who purchases the distribution content (that is, a providing source of the content) can be identified.

As described above, a content to which a source ID (recorder ID, group ID) is added by the source ID addition section 1 of the information-processing apparatus 10 can be copied freely between the information-processing apparatus 10 and the portable reproduction apparatus 20. In other words, in the copyright management system of the group management type, upon copying of a content to which a source ID is applied (that is, a content of an object of copyright management), such a restriction process for the number of times of copying as is performed in the conventional copyright management system of the check-in check-out type is not performed at all.

The content reproduction section 2 is formed from a reproduction machine or reproduction software for a content or the like and provided in an information-processing apparatus 10 or a portable reproduction apparatus 20. The content reproduction section 2 has a source ID list L to which a source ID with regard to which reproduction is permitted by the content reproduction section is added. The source ID list L is provided for each content reproduction section 2, and in different content reproduction sections 2, the source IDs included in the source ID lists L of the content reproduction sections 2 are different from each other.

When a content to which the source ID described above is added is to be reproduced, the content reproduction section 2 checks the source ID list L to enable/disable reproduction of the content. In particular, if the source ID applied to the content is included in the source ID list L, then the content can be reproduced, but if the source ID added to the content is not included in the source ID list L, then the content cannot be reproduced. In this manner, the content reproduction section 2 controls reproduction of a content in a unit of a source ID, that is, in a unit of a content providing source.

Further, the content reproduction section 2 can issue a request for addition of a new source ID to the source ID list L included in the content reproduction section 2 thereof, for example, to the list management section 3. In particular, in order to reproduce a content to which a new source ID which is not included in the source ID list L held by the content reproduction section 2 itself is added, it is necessary for the content reproduction section 2 to add the new source ID to the source ID list L. To this end, the content reproduction section 2 issues a request for permission of addition of a new source ID to the list management section 3 which permits updating of the source ID list L.

The list management section 3 is provided, for example, in each information-processing apparatus 10 and updates the source ID list L held in the content reproduction section 2. Here, the updating of the source ID list L is addition or deletion of a source ID to or from the source ID list L. The list management section 3 can add/delete a source ID to/from the source ID list L to enable/disable reproduction of a content to which the source ID is added by the content reproduction section 2.

Such a list management section 3 as described above acquires a group certificate G which is sharing information by which a group ID and a recorder ID are coordinated with each other and updates the source ID list L based on such a group certificate G as just described. More particularly, where a group ID included in the group certificate G is same as a group ID included in the source ID list L, the list management section 3 adds a recorder ID included in the group certificate G to the source ID list L. Consequently, a recorder ID of an information-processing apparatus 10 registered in an apparatus group of the same user can be added to the source ID list L to make it possible to reproduce a ripped content ripped by such an information-processing apparatus 10 as just described.

As described above, in the copyright management system according to the present application, reproduction of a content by each of the information-processing apparatus 10 and the portable reproduction apparatus 20 is controlled by the source ID addition section 1, content reproduction section 2 and list management section 3 to manage the copyright of a content to be copied between the information-processing apparatus 10. An outline of the copyright management system of the group management type is such as described above.

Now, a particular example wherein the communication system 100 described hereinabove is applied to a copyright management system of the group management type is described with reference to FIG. 25.

Figure 25:
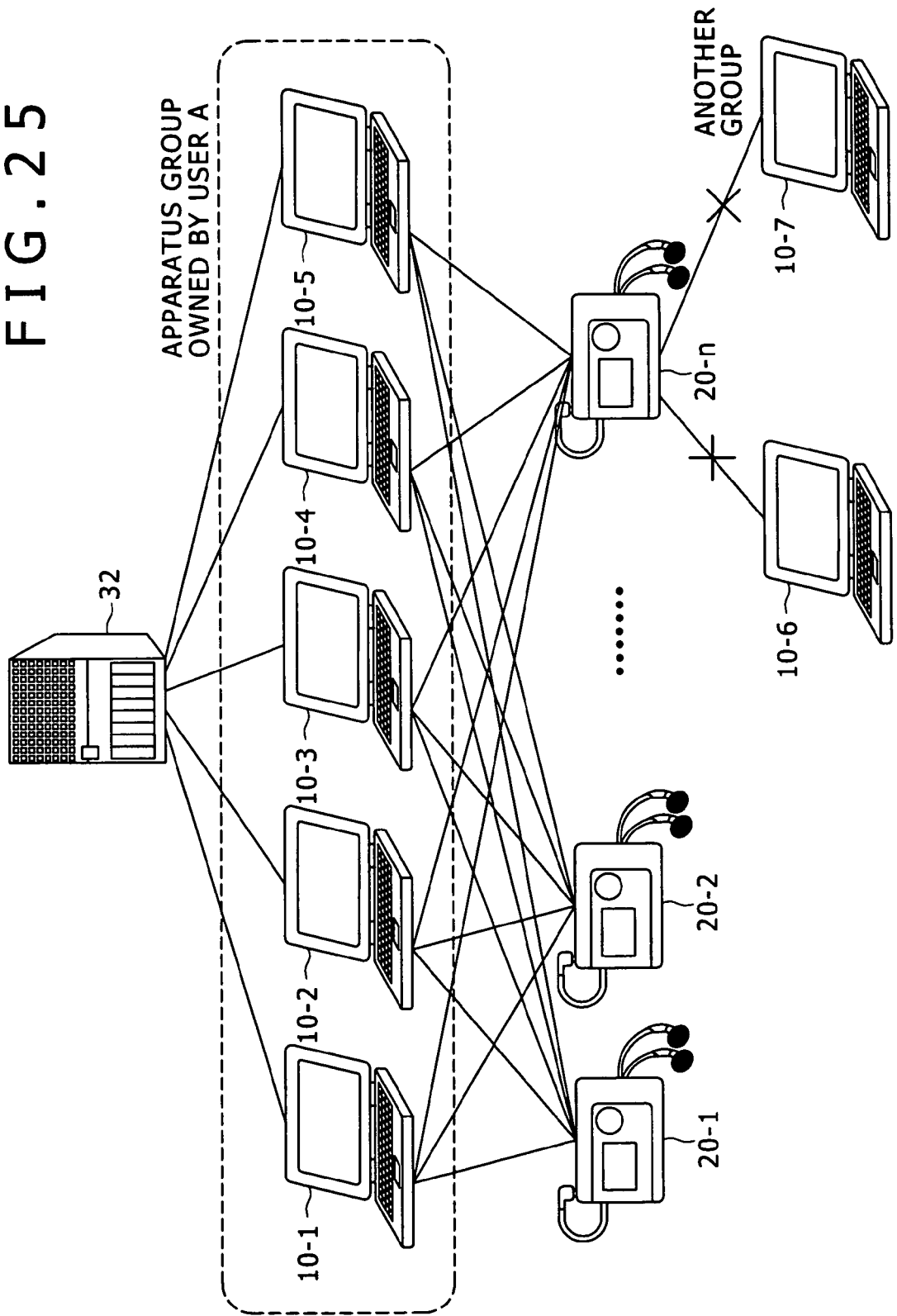
FIG. 25 is a diagrammatic view showing an application of the communication system to the copyright management system of the group management type.

As seen in FIG. 25, one user can register up to five information-processing apparatus 10 owned by the user itself in the same apparatus group. In the example shown, five information-processing apparatus 10-1 to 10-5 owned by a user A are registered in the same apparatus group. On the other hand, no restriction is set to the number of portable reproduction apparatus 20 to be registered in a group, but any number of portable reproduction apparatus 20 can be registered. In the example shown, n portable reproduction apparatus 20-1 to 20-n owned by the user A are registered in the apparatus group owned by the user A.

The information-processing apparatus 10-1 to 10-5 and the portable reproduction apparatus 20-1 to 20-n registered in the same group in this manner have the same group ID applied thereto by the group management server 32. Since the apparatus mentioned cannot be registered in an overlapping relationship in two or more apparatus groups, they can possess only one group ID.

In the group of apparatus registered in the same apparatus group in this manner, such an evaluation value arithmetic operation process as described above can be executed between one of the information-processing apparatus 10 and one of the portable reproduction apparatus 20 which are connected to each other. In particular, since the information-processing apparatus 10-1 to 10-5 and the portable reproduction apparatus 20-1 to 20-n have the same group ID, the information-processing apparatus 10-1 to 10-5 can arithmetically operate the computed evaluation value of the portable reproduction apparatus 20-1 to 20-n based on reproduction history information of the portable reproduction apparatus 20-1 to 20-n. However, since an information-processing apparatus 10-6 which is registered in another group or an information-processing apparatus 10-7 which is not registered as yet does not have a group ID same as that of the portable reproduction apparatus 20-1 to 20-n, it cannot arithmetically operate the computed evaluation value of the portable reproduction apparatus 20-1 to 20-n based on reproduction history information of the portable reproduction apparatus 20-1 to 20-n.

Accordingly, where the communication system 100 described hereinabove is applied to a copyright management system of the group management type, any information-processing apparatus 10 acquires, from a portable reproduction apparatus 20 connected thereto, the group ID stored in the portable reproduction apparatus 20 together with reproduction history information of the portable reproduction apparatus 20. Then, only when the group ID stored in the information-processing apparatus 10 itself and the group ID acquired from the portable reproduction apparatus 20 coincide with each other, the information-processing apparatus 10 executes arithmetic operation of the computed evaluation value based on the reproduction history information of the portable reproduction apparatus 20.

Consequently, between apparatus owned by the same user, it is possible to share reproduction history information and arithmetically operate the computed evaluation value based on the reproduction history information of the apparatus or synchronize the computed evaluation value and input evaluation value with each other.

Now, an application wherein the communication system 100 described hereinabove is applied to a copyright management system of the group management type is described with reference to FIGS. 26A to 26D. FIGS. 26A to 26D show an application wherein the communication system 100 according to the present embodiment is applied to a copyright management system of the group management type.

Figure 26A:
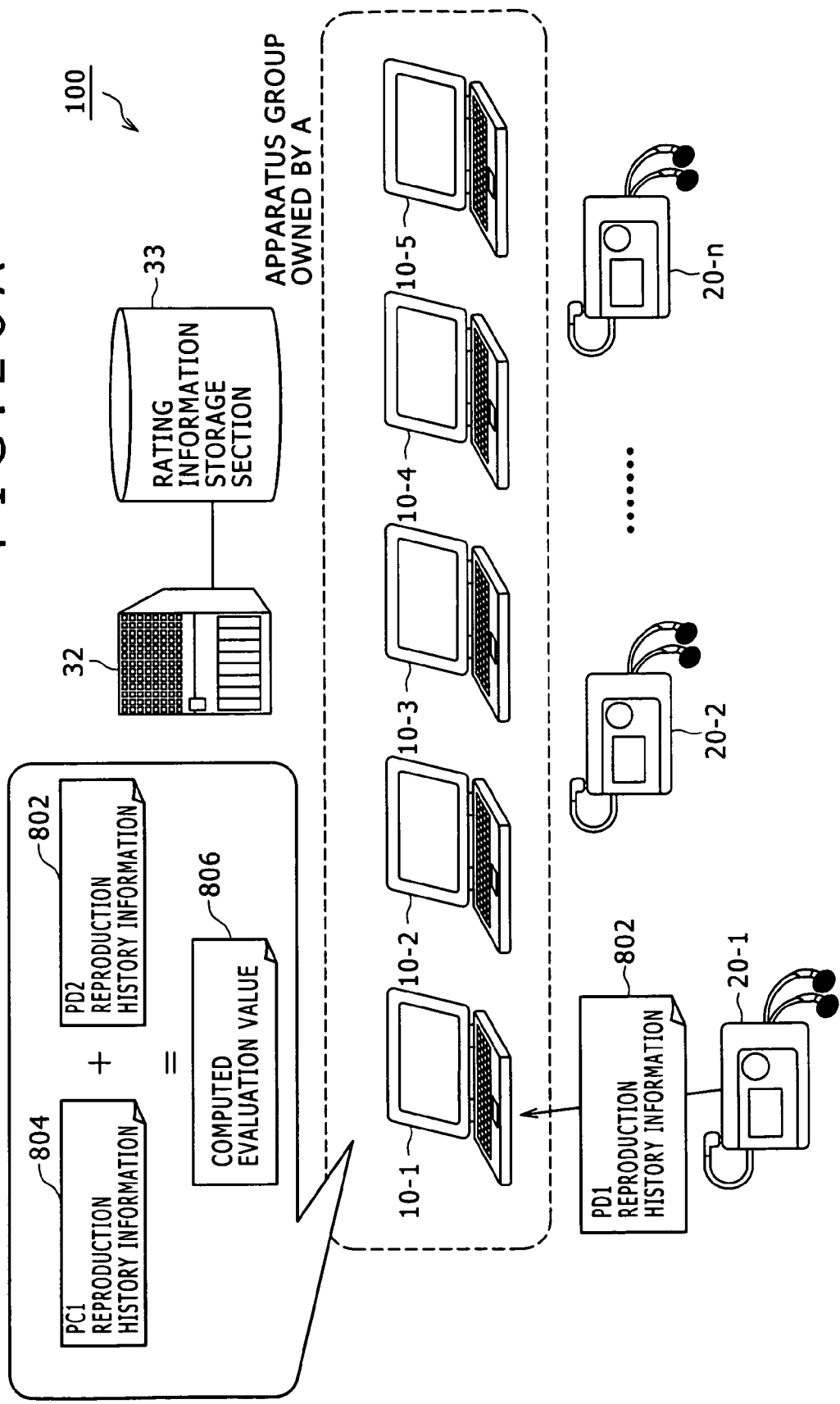

Referring first to FIG. 26A, if the information-processing apparatus 10-1 and the portable reproduction apparatus 20-1 which belong to the same apparatus group are connected to each other, then the portable reproduction apparatus 20-1 transmits reproduction history information 802 of the portable reproduction apparatus 20 to the information-processing apparatus 10-1. Consequently, the information-processing apparatus 10-1 arithmetically operates a computed evaluation value 806 of auto-rating based on the reproduction history information 802 of the portable reproduction apparatus 20-1 transferred thereto and reproduction history information 804 of the information-processing apparatus 10-1 itself. Such a transfer process of the reproduction history information 802 and an arithmetic operation process of the computed evaluation value 806 as just described are performed not only immediately after the connection between the information-processing apparatus 10-1 and the portable reproduction apparatus 20-1 is established but also after every lapse of a predetermined interval of time (for example, after every one hour) while the connection continues.

Then, the information-processing apparatus 10-1 transfers, immediately after the arithmetic operation of the computed evaluation value 806, the computed evaluation value 806 to the group management server 32 and the portable reproduction apparatus 20-1 as seen in FIG. 26B. The portable reproduction apparatus 20-1 receives and records the computed evaluation value 806 on a recording medium therein, and the group management server 32 receives and records the computed evaluation value 806 into the rating information storage section 33.

Further, if rating software of the information-processing apparatus 10-2 to 10-5 are started in a state wherein the group management server 32 and the information-processing apparatus 10-2 to 10-5 are connected to each other as seen in FIG. 26C, then the group management server 32 immediately transmits the computed evaluation value 806 to the information-processing apparatus 10-2 to 10-5. In this manner, the computed evaluation value 806 which reflects the reproduction history information 802 and 804 of the information-processing apparatus 10-1 and the portable reproduction apparatus 20-1 is distributed to the information-processing apparatus 10-2 to 10-5 owned by the same user by the group management server 32.

Thereafter, the information-processing apparatus 10 sums (for example, calculates an average value between) the computed evaluation value 806 received from the group management server 32 and the computed evaluation value (not shown) owned in advance by the information-processing apparatus 10 itself to calculate a new computed evaluation value 808 and retains the calculated computed evaluation value 808. Further, if the information-processing apparatus 10 and the portable reproduction apparatus 20-2 are connected to each other, then the portable reproduction apparatus 20-2 transmits computed evaluation value 810 possessed thereby to the information-processing apparatus 10. The information-processing apparatus 10 receives the computed evaluation value 810 and sums (for example, calculates an average value between) the computed evaluation value 808 possessed thereby and the received computed evaluation value 810 of the portable reproduction apparatus 20-2 to calculate a new computed evaluation value 812 and transmits the calculated computed evaluation value 812 to the group management server 32.

By repeating such a summing process (synchronization process) of computed evaluation values and a transmission/reception process through the group management server 32 as described above, the latest computed evaluation value can be updated and shared within the apparatus group of the same user. Consequently, such a situation that the computed evaluation value of the auto-rating becomes one-sided data produced based only on the reproduction history information of some of the apparatus. In other words, a computer evaluation value which coordinates reproduction history information of the entire apparatus owned by the user can be calculated.

Further, the group management server 32 acquires and stores the computed evaluation value of various users into the rating information storage section 33. Consequently, the service provider can collect and analyze information relating to the liking and reproduction situations of the users to grasp the liking and the tendency of the users and can recommend contents conforming to the liking to the individual users.

The communication system 100 according to the present embodiment and the information-processing apparatus 10, portable reproduction apparatus 20 and various server apparatus which compose the communication system 100 are described in detail above. According to the present embodiment, the computed evaluation value of each content can be calculated automatically based on reproduction history information of the information-processing apparatus 10 and the portable reproduction apparatus 20. Therefore, such a problem that an inputting operation of an evaluation value is cumbersome as in the related apparatus can be eliminated, and a computed evaluation value can be added automatically to a very great number of contents stored in a storage medium. Accordingly, each user can utilize the computed evaluation value added objectively to each content thereof to implement management (classification, arrangement, search) of the contents owned by the user itself. Further, a variety of reproduction styles of contents which sufficiently reflect the liking of the user itself can be provided.

Further, the user can quantitatively grasp the tendency of contents (tunes) conforming to the liking of the user itself. Further, when contents possessed by an information-processing apparatus 10 and contents possessed by a portable reproduction apparatus 20 are to be synchronized with each other, those contents which conform to the liking of the user can be synchronized preferentially based on the computed evaluation values and the input evaluation values so as to be shared by both apparatus. Further, the user can utilize the computed evaluation values and the input evaluation values to produce a playlist in which contents conforming to the liking of the user are listed. Meanwhile, the service provider can analyze the tendency of the liking of each user and recommend new contents conforming to the liking of the user.

A preferred embodiment of the present invention is described above with reference to the accompanying drawings. However, it is a matter of course that the present invention is not limited to the specific embodiment described above. It is apparent that various alterations or modifications may be made by those skilled in the art within the scope of the invention described in the claims, and it is to be understood that also such alterations and modifications naturally fall within the technical scope of the present invention.

For example, in the embodiment described above, an information-processing apparatus 10 arithmetically operates a computed evaluation value of a portable reproduction apparatus 20 based on reproduction history information of the portable reproduction apparatus 20. However, the present invention is not limited to the specific example. For example, also such a system configuration that a server apparatus such as the distribution server 30 or the group management server 32 acquires reproduction history information of a content from an information-processing apparatus 10 or a portable reproduction apparatus 20 to arithmetically operate a computed evaluation value and transfers the arithmetically operated computed evaluation value to the information-processing apparatus 10 or portable reproduction apparatus 20 can be implemented in a similar manner as described above.

Further, in the embodiment described above, each of the portable reproduction apparatus 20 and the information-processing apparatus 10 may produce two different event log files. In particular, each of the portable reproduction apparatus 20 and the information-processing apparatus 10 may produce an event log file which includes event longs regarding contents ready for the subscription and another event log file which includes event logs regarding all contents including the contents ready for the subscription.

Furthermore, each of the portable reproduction apparatus 20 and the information-processing apparatus 10 may encrypt an event log file which includes only event logs regarding contents ready for the subscription so that the event log file cannot be operated by any user. Then, the information-processing apparatus 10 may acquire the encrypted event log file and transmit the acquired encrypted event log file to a copyright management server, which performs copyright management of contents, together with the encrypted event log file possessed by the information-processing apparatus 10 itself.

With the configuration just described, an event log file which includes only event logs regarding contents ready for the subscription can be utilized for distribution of the funds by the copyright management server.

What is claimed is:
1. An information-processing apparatus, comprising:
a central processing unit;
an acquisition section configured to acquire, in conjunction with the processing unit, from a portable reproduction apparatus which reproduces content data stored therein, reproduction history information of the content data reproduced by the portable reproduction apparatus;

an evaluation value arithmetic operation section configured to arithmetically operate, in conjunction with the processing unit, a computed evaluation value corresponding to the content data based on the reproduction history information acquired by said acquisition section;

a transfer section configured to transfer, in conjunction with the processing unit, the computed evaluation value to the portable reproduction apparatus; and a connection detection section configured to detect that the portable reproduction apparatus is connected to said information-processing apparatus; wherein if said connection detection section detects that the portable reproduction apparatus is connected, said acquisition section acquires the reproduction history information of the content data in the portable reproduction apparatus from the portable reproduction apparatus and said evaluation value arithmetic operation section arithmetically operates the computed evaluation value corresponding to the content data based on the reproduction history information of the content data in the portable reproduction apparatus acquired by said acquisition section, and said transfer section transfers the computed evaluation value arithmetically operated by said evaluation value arithmetic operation section to the portable reproduction apparatus;

if a continuous connection duration between the portable reproduction apparatus and the information-processing apparatus is detected to exceed the specific time period, the arithmetically operating is executed to arithmetically re-operate the computed evaluation value, which is stored in the evaluation value storage section and corresponds to the content data stored in the portable reproduction apparatus, based on the reproduction history information newly produced in the producing, and the transferring is executed to transfer the arithmetically re-operated computed evaluation value to the portable reproduction apparatus.

2. The information-processing apparatus according to claim 1, further comprising:
a content storage section configured to store one or more content data;
a reproduction section configured to reproduce the content data stored in said content storage section;
a reproduction history production section configured to produce second reproduction history information of the content data reproduced by said reproduction section;
an evaluation value storage section configured to store the computed evaluation value; and
an evaluation value recording section configured to record the computed evaluation value in the evaluation value storage section in connection with the content data;
said evaluation value arithmetic operation section being operable to arithmetically operate the computed evaluation value based on both the reproduction history information acquired from the portable reproduction apparatus and the second reproduction history information produced by said reproduction history production section.

3. The information-processing apparatus according to claim 2, further comprising:
a reproduction history storage section configured to store the second reproduction history information, wherein;
said evaluation value arithmetic operation section arithmetically operates the computed evaluation value based on both the reproduction history information acquired from the portable reproduction apparatus and the second reproduction history information stored in said reproduction history storage section.

4. The information-processing apparatus according to claim 2, wherein
said evaluation value arithmetic operation section arithmetically operates a second computed evaluation value corresponding to the content data based on the second reproduction history information produced by said reproduction history production section;
said evaluation value arithmetic operation section arithmetically operates the computed evaluation value corresponding to the content data stored in the portable reproduction apparatus based on the reproduction history information acquired from the portable reproduction apparatus and further arithmetically operates a new computed evaluation value corresponding to the content data based on the second computed evaluation value and the computed evaluation value stored in said evaluation value storage section; and
said evaluation value recording section stores the new computed evaluation value in said evaluation value storage section.

5. The information-processing apparatus according to claim 4, wherein said acquisition section acquires, from the portable reproduction apparatus, both of the reproduction history information and the computed evaluation value currently stored in the portable reproduction apparatus; and
said evaluation value arithmetic operation section arithmetically operates the new computed evaluation value corresponding to the content data based on both the reproduction history information and the computed evaluation value which are acquired from the portable reproduction apparatus.

6. The information-processing apparatus according to claim 4, wherein, every time the content data is reproduced by said reproduction section, said evaluation value arithmetic operation section arithmetically operates and updates the computed evaluation value corresponding to the content data, and said evaluation value recording section records the updated computed evaluation value into said evaluation value storage section.

7. The information-processing apparatus according to claim 2, wherein, when the content data stored in said content storage section is transferred to the portable reproduction apparatus, said transfer section selectively transfers the content data based on the computed evaluation value of the content data.

8. The information-processing apparatus according to claim 2, further comprising:
a playlist production section configured to produce a playlist in which content identification information corresponding to the content data is listed based on the computed evaluation value stored in said evaluation value storage section.

9. The information-processing apparatus according to claim 2, further comprising:
an evaluation value transmission section configured to transmit the computed evaluation value stored in said evaluation value storage section to an external apparatus which is configured to provide the content data to said information-processing apparatus.

10. The information-processing apparatus according to claim 1, further comprising:
a registration ID storage section configured to store a device ID of the portable reproduction apparatus for permitting evaluation value arithmetic operation by said evaluation value arithmetic operation section; wherein said acquisition section acquires the device ID of the portable reproduction apparatus together with reproduction history information of the content data in the portable reproduction apparatus, and said evaluation value arithmetic operation section arithmetically operates the computed evaluation value only when the device ID stored in said registration ID storage section and the device ID acquired by said acquisition section coincide with each other.

11. The information-processing apparatus according to claim 1, wherein the information-processing apparatus and the portable reproduction apparatus store group IDs each assigned by a group management server to which said information-processing apparatus and the portable reproduction apparatus are registered, a common group ID being assigned to the information-processing apparatus and the portable reproduction apparatus belonging to a common group;

said acquisition section acquires the group ID stored in the portable reproduction apparatus together with the reproduction history information of the content data in the portable reproduction apparatus; and said evaluation value arithmetic operation section arithmetically operates the computed evaluation value only when the group ID stored in the information-processing apparatus and the acquired group ID coincide with each other.

12. The information-processing apparatus according to claim 1, further comprising:

an evaluation value input section configured to set an input evaluation value corresponding to the content data stored in said content storage section based on a user input; and an evaluation value recording section configured to record the computed evaluation value arithmetically operated by said evaluation value arithmetic operation section and the input evaluation value set by said evaluation value input section in a coordinated relationship with the content data; wherein said transfer section transfers the computed evaluation value and the input evaluation value stored in said evaluation value storage section to the portable reproduction apparatus.

13. The information-processing apparatus according to claim 12, wherein said acquisition section acquires one or both of the computed evaluation value and the input evaluation value corresponding to the content data stored in the portable reproduction apparatus;

said evaluation value arithmetic operation section executes one or both of a process of arithmetically operating a new computed evaluation value corresponding to the content data based on the computed evaluation value of the content data acquired by said acquisition section and the computed evaluation value of the content data stored in said evaluation value storage section and another process of arithmetically operating a new input evaluation value corresponding to the content data based on the input evaluation value of the content data acquired by said acquisition section and the input evaluation value of the content data stored in said evaluation value storage section;

said evaluation value recording section records one or both of the arithmetically operated new computed evaluation value and the acquired new input evaluation value in a coordinated relationship with the content data into said evaluation value storage section; and said transfer section transfers one or both of the arithmetically operated new computed evaluation value and the acquired new input evaluation value to the portable reproduction apparatus.

14. The information-processing apparatus according to claim 1, further comprising:

a content storage section configured to store one or more content data; and a reproduction section configured to reproduce the content data stored in said content storage section; wherein said evaluation value arithmetic operation section arithmetically operates the computed evaluation value so that the evaluation of the content data becomes higher every time reproduction of the content data is started by said reproduction section.

15. The information-processing apparatus according to claim 1, wherein said evaluation value arithmetic operation section arithmetically operates a continuous reproduction duration of the content data based on the reproduction history information of the content data and arithmetically operates the computed evaluation value so that the evaluation of the content data whose continuous reproduction duration is equal to or longer than a specific time period becomes higher.

16. The information-processing apparatus according to claim 1, wherein, if said evaluation value arithmetic operation section detects based on the reproduction history information of the content data that the object of reproduction is changed over to a different of the content data within a specific period of time after reproduction of one of the content data is started, then said evaluation value arithmetic operation section updates the computed evaluation value so that the evaluation of the one content data becomes lower.

17. The information-processing apparatus according to claim 1, wherein said evaluation value arithmetic operation section arithmetically operates a continuous reproduction duration of the content data based on the reproduction history information of the content data and arithmetically operates the computed evaluation value so that the evaluation of the content data whose continuous reproduction duration is equal to or shorter than a specific time period becomes lower.

18. The information-processing apparatus according to claim 1, wherein said acquisition section acquires content identification information corresponding to one or more content data designated as an object of deletion on the portable reproduction apparatus from the portable reproduction apparatus; and said evaluation value arithmetic operation section arithmetically operates the computed evaluation value so that the evaluation of the content data corresponding to the content identification information acquired by said acquisition section becomes lower.

19. The information-processing apparatus according to claim 1, further comprising:

a content storage section configured to store one or more content data;

a reproduction section configured to reproduce the content data stored in said content storage section;

an evaluation value input section configured to set an input evaluation value corresponding to the content data stored in said content storage section based on a user input; and an evaluation value recording section configured to record, where the content data corresponding to the reproduction history information acquired from the portable reproduction apparatus by said acquisition section is stored also in said content storage section, the computed evaluation value of the content data arithmetically operated by said evaluation value arithmetic operation section and the input evaluation value of the content data set by said evaluation value input section in a coordinated relationship with the content data into said evaluation value storage section.

20. The information-processing apparatus according to claim 19, further comprising:
a display control section configured to cause a display section to selectively display the computed evaluation value and the input evaluation value regarding the same content data recorded in said evaluation value storage section.

21. The information-processing apparatus according to claim 20, wherein said display control section causes said display section to display the input evaluation value preferentially to the computed evaluation value recorded in said evaluation value storage section.

22. The information-processing apparatus according to claim 20, wherein
if the computed evaluation value is recorded but the input evaluation value is not recorded in said evaluation value storage section regarding specific content data, said display control section controls said display section to display the computed evaluation value; and
if the input evaluation value regarding the specific content data is set by said evaluation value input section, said evaluation value recording section records the input evaluation value in a coordinated relationship with the specific content data into said evaluation value storage section and said display control section controls said display section to display the input evaluation value in place of the computed evaluation value.

23. The information-processing apparatus according to claim 22, wherein, when said display control section controls said display section to display the input evaluation value corresponding to the specific content data, if the reproduction history information of the specific content data is acquired from the portable reproduction apparatus by said acquisition section or reproduction of the specific content data is performed by said reproduction section,
said evaluation value arithmetic operation section arithmetically re-operates the computed evaluation value corresponding to the specific content data based on the reproduction history information of the specific content data acquired by said acquisition section or on the reproduction history information of the specific content data reproduced by said reproduction section, and
said evaluation value recording section updates the computed evaluation value stored in said evaluation value storage section to the arithmetically re-operated new computed evaluation value.

24. The information-processing apparatus according to claim 1, further comprising:
a content storage section configured to store one or more content data;
a reproduction section configured to reproduce the content data stored in said content storage section;
a reproduction history production section configured to produce reproduction history information of the content data by said reproduction section; and
an evaluation value recording section configured to record the computed evaluation value arithmetically operated by said evaluation value arithmetic operation section based on the reproduction history information produced by said reproduction history production section into said evaluation value storage section; wherein
if said connection detection section detects that a continuous connection duration between the portable reproduction apparatus and said information-processing apparatus exceeds a specific time period, then said evaluation value arithmetic operation section arithmetically re-operates the computed evaluation value, which is stored in said evaluation value storage section and corresponds to the content data stored in the portable reproduction apparatus, based on the reproduction history information newly produced by said reproduction history production section, and said transfer section transfers the computed evaluation value arithmetically re-operated by said evaluation value arithmetic operation section to the portable reproduction apparatus.

25. The information-processing apparatus according to claim 1, wherein, after the computed evaluation value arithmetically operated by said evaluation value arithmetic operation section based on the reproduction history information of the content data in the portable reproduction apparatus is transferred to the portable reproduction apparatus by said transfer section, a command is issued to the portable reproduction apparatus to delete the reproduction history information stored in the portable reproduction apparatus.

26. The information-processing apparatus according to claim 1, further comprising:
a content storage section configured to store a plurality of content data including content data same as the content data stored in the portable reproduction apparatus;
a search list production section configured to produce a list of content identification information corresponding to the plural content data; and
an evaluation value recording section configured to record the computed evaluation value arithmetically operated by said evaluation value arithmetic operation section in a coordinated relationship with the content data into said evaluation value storage section; wherein
said search list production section produces a list in which the plural pieces of content identification information are sorted in response to the computed evaluation values stored in said evaluation value storage section.

27. The information-processing apparatus according to claim 1, further comprising:
a content storage section configured to store one or more content data; and
a content deletion section configured to delete, when some or all of the content data stored in said content storage section are transferred to the portable reproduction apparatus by said transfer section, some of contents stored in a storage medium corresponding to the portable reproduction apparatus in response to the computed evaluation value of the content data; and wherein
said transfer section transfers the content data to be transferred to the portable reproduction apparatus after the content data is deleted by said content deletion section.

28. The information-processing apparatus according to claim 27, wherein said deletion section includes:
a free capacity detection section configured to detect a free capacity of the storage medium corresponding to the portable reproduction apparatus;
a comparison section configured to compare the capacity of the content data to be transferred to the portable reproduction apparatus by said transfer section and the free capacity detected by said free capacity detection section;

an under-capacity detection section configured to detect an under-capacity where said comparison section decides that the free capacity is insufficient;
- a selection section configured to select content data corresponding to the under-capacity from within the content data stored in the storage medium corresponding to the portable reproduction apparatus in response to the computed evaluation value of the content data; and
- a deletion section configured to delete the content data selected by said selection section from the storage medium corresponding to the portable reproduction apparatus.

29. The information-processing apparatus according to claim 27, wherein said content deletion section does not delete the content data, which has been ripped from a removable storage medium and is stored in said content storage section by the information-processing apparatus, from the storage medium corresponding to the portable reproduction apparatus.

30. The information-processing apparatus according to claim 1, wherein the reproduction history information includes content ID information of the content data reproduced by the portable reproduction apparatus and further includes information indicating how the content data is reproduced by the portable reproduction apparatus.

31. A reproduction apparatus, comprising:
- a central processing unit;
- a content storage section configured to store one or more content data;
- a reproduction section configured to reproduce, in conjunction with the processing unit, the content data stored in said content storage section;
- a reproduction history production section configured to produce, in conjunction with the processing unit, reproduction history information of the content data reproduced by said reproduction section;
- a reproduction history storage section configured to store the reproduction history information;
- a transfer section configured to transfer, in conjunction with the processing unit, the reproduction history information, which is stored in said reproduction history storage section, to an external apparatus in response to a request from the external apparatus;
- an acquisition section configured to acquire, in conjunction with the processing unit, a computed evaluation value of the content data, the computed evaluation value being arithmetically operated by the external apparatus at least based on the reproduction history information transferred to the external apparatus;
- an evaluation value storage section configured to store the computed evaluation value;
- an evaluation value recording section configured to record, in conjunction with the processing unit, the computed evaluation value acquired by said acquisition section in the evaluation value storage section in connection with the content data; and
- an evaluation value input section configured to set an input evaluation value corresponding to the content data stored in said content storage section in accordance with a user input; wherein
- said evaluation value recording section records the computed evaluation value acquired by said acquisition section and the input evaluation value set by said evaluation value input section in said evaluation value storage section in connection with the content data,
- said transfer section transfers one or both of the computed evaluation value and the input evaluation value corresponding to the content data stored in said evaluation value storage section to the external apparatus in response to the request from the external apparatus;
- said acquisition section acquires one or both of a first new input evaluation value, which is arithmetically operated by the external apparatus based on the transferred computed evaluation value and the computed evaluation value stored in the external apparatus, and a second new input evaluation value, which is arithmetically operated by the external apparatus based on the transferred input evaluation value and the input evaluation value stored in the external apparatus; and
- said evaluation value recording section updates one or both of the computed evaluation value and the input evaluation value stored in said evaluation value storage section in connection with the content data, to one or both of the acquired new computed evaluation value and the acquired new input evaluation value, respectively.

32. The reproduction apparatus according to claim 31, wherein said transfer section transfers a device ID of the reproduction apparatus together with the reproduction history information of the content data to the external apparatus in response to the request from the external apparatus.

33. The reproduction apparatus according to claim 31, wherein:
- the external apparatus and the reproduction apparatus store group IDs each assigned by a group management server to which the external apparatus and said reproduction apparatus are registered, a common group ID being assigned to the external apparatus and the reproduction apparatus belonging to a common group; and
- said transfer section transfers the group ID stored in said reproduction apparatus together with the reproduction history information of the content data to the external apparatus in response to the request from the external apparatus.

34. The reproduction apparatus according to claim 31, further comprising:
- a display section;
- a display control section configured to control the display section to selectively display the computed evaluation value and the input evaluation value regarding the same content data recorded in said evaluation value storage section.

35. The reproduction apparatus according to claim 34, wherein said display control section controls said display section to display the input evaluation value preferentially to the computed evaluation value recorded in said evaluation value storage section.

36. The reproduction apparatus according to claim 34, wherein, if the computed evaluation value is recorded but the input evaluation value is not recorded in said evaluation value storage section regarding specific content data, said display control section controls said display section to display the computed evaluation value; and
- if the input evaluation value regarding the specific content data is set by said evaluation value input section, said evaluation value recording section records the input evaluation value in said evaluation value storage section in connection with the specific content data, and said display control section controls said display section to display the input evaluation value in place of the computed evaluation value.

37. The reproduction apparatus according to claim 36, wherein, in a mode where said display control section controls said display section to display the input evaluation value corresponding to the specific content data, said transfer section transfers the reproduction history information of the content data to the external apparatus in response to the request from the external apparatus;

said acquisition section acquires the computed evaluation value of the content data arithmetically operated by the external apparatus based on the reproduction history information; and said evaluation value recording section records the computed evaluation value acquired by said acquisition section in a coordinated relationship with the content data into said evaluation value storage section.

38. The reproduction apparatus according to claim 31, wherein:
said transfer section transfers the reproduction history information and the computed evaluation value stored in said evaluation value storage section to the external apparatus in response to the request from the external apparatus;

said acquisition section acquires a new computed evaluation value corresponding to the content data arithmetically operated by the external apparatus at least based on the reproduction history information and the transferred computed evaluation value; and said evaluation value recording section updates the computed evaluation value stored in a coordinated relationship with the content data in said evaluation value storage section to the acquired new computed evaluation value.

39. The reproduction apparatus according to claim 31, further comprising:
a deletion instruction section configured to record, if a deletion instruction for one or more content data stored in said content storage section is received, content identification information corresponding to the content data to be deleted in a deletion content storage section; wherein said transfer section transfers the content identification information recorded in said deletion content storage section together with the reproduction history information of the specific content data to the external apparatus in response to the request from the external apparatus.

40. The reproduction apparatus according to claim 31, wherein the reproduction history information stored in said reproduction history storage section is deleted after the computed evaluation value arithmetically operated by the external apparatus based on the reproduction history information is acquired by said acquisition section in response to the transfer of the reproduction history information of the content data by said transfer section.

41. The reproduction apparatus according to claim 31, wherein the reproduction history information includes content ID information of the content data reproduced by the reproduction section and further includes information indicating how the content data is reproduced by the reproduction section.

42. A communication method for an information-processing apparatus to communicate with a portable reproduction apparatus which reproduces content data, the method comprising:
acquiring, from the portable reproducing apparatus, reproduction history information of the content data reproduced by the portable reproduction apparatus;

arithmetically operating a computed evaluation value corresponding to the content data based on the reproduction history information acquired in the acquiring;

transferring the computed evaluation value to the portable reproduction apparatus;

detecting that the portable reproduction apparatus is connected to the information-processing apparatus; wherein, if the detecting detects that the portable reproduction apparatus is connected, the acquiring, the arithmetically operating and the transferring are executed; reproducing one or more content data stored in a content storage section of the information-processing apparatus;

producing reproduction history information of the content data reproduced in the reproducing;

recording the computed evaluation value arithmetically operated based on the reproduction history information of the content data reproduced in the evaluation value storage section; and detecting that a continuous connection duration between the portable reproduction apparatus and the information-processing apparatus exceeds a specific time period; wherein, if the continuous connection duration between the portable reproduction apparatus and the information-processing apparatus is detected to exceed the specific time period, the arithmetically operating is executed to arithmetically re-operate the computed evaluation value, which is stored in the evaluation value storage section and corresponds to the content data stored in the portable reproduction apparatus, based on the reproduction history information newly produced in the producing, and the transferring is executed to transfer the arithmetically re-operated computed evaluation value to the portable reproduction apparatus.

43. The communication method according to claim 42, further comprising:
reproducing one or more content data stored in a content storage section of the information-processing apparatus;

producing second reproduction history information of the content data reproduced in the reproducing; and recording the computed evaluation value in an evaluation value storage section of the information-processing apparatus; wherein, in the arithmetically operating, the computed evaluation value corresponding to the content data is arithmetically operated based on both the reproduction history information acquired in the acquiring and the second reproduction history information produced in the producing.

44. The communication method according to claim 43, further comprising:
storing the second reproduction history information in a reproduction history storage section of the information-processing apparatus, wherein;

in the arithmetically operating, the computed evaluation value corresponding to the content data is arithmetically operated based on both the reproduction history information acquired from the portable reproduction apparatus and the second reproduction history information stored in the reproduction history storage section;

in the recording, the computed evaluation value is stored in the evaluation value storage section in connection with the data content; and, in the transferring, the computed evaluation value is transferred to the reproduction apparatus.

45. The communication method according to claim 43, further comprising:
firstly arithmetically operating a first computed evaluation value corresponding to the content data based on the reproduction history information of the content data reproduced in the reproducing;

firstly recording the computed evaluation value, which is arithmetically operated in the firstly arithmetically operating, in the evaluation value storage section;

secondly arithmetically operating a second computed evaluation value corresponding to the content data in the portable reproduction apparatus based on the reproduction history information acquired from the portable reproduction apparatus in the acquiring;

firstly transferring the computed evaluation value, which is arithmetically operated in the secondly arithmetically operating, to the portable reproduction apparatus;

thirdly arithmetically operating a new computed evaluation value corresponding to the content data based on both of the second computed evaluation value transferred in the firstly transferring and the first computed evaluation value recorded in the evaluation value storage section in the firstly recording; and secondly transferring the new computed evaluation value, which is arithmetically operated in the thirdly arithmetically operating, to the portable reproduction apparatus.

46. The communication method according to claim 45, wherein, every time the content data is reproduced at the reproduction step, the processes in the firstly arithmetically operating and firstly recording are executed so that the new computed evaluation value corresponding to the content data is arithmetically operated and updated.

47. The communication method according to claim 45, further comprising:
issuing an instruction for the portable reproduction apparatus to delete the reproduction history information stored in the portable reproduction apparatus after the process in the firstly transferring is performed but before the process in the thirdly arithmetically operating is performed.

48. The communication method according to claim 42, further comprising:
setting an input evaluation value corresponding to the content data stored in a content storage section of the information-processing apparatus based on a user input;
recording the computed evaluation value arithmetically operated at the arithmetically operating and the input evaluation value set in the setting, in the evaluation value storage section; wherein
in the transferring, the computed evaluation value and the input evaluation value recorded in the evaluation value storage section are transferred to the portable reproduction apparatus.

49. The communication method according to claim 48, wherein;
in the acquiring, one or both of the computed evaluation value and the input evaluation value corresponding to the content data stored in the portable reproduction apparatus are acquired from the portable reproduction apparatus;
the arithmetically operating includes one or both of
arithmetically operating a new computed evaluation value corresponding to the content data based on the computed evaluation value of the content data acquired in the acquiring and the computed evaluation value of the content data stored in the evaluation value storage section, and
arithmetically operating a new input evaluation value corresponding to the
content data based on the input evaluation value of the content data acquired in the acquiring and the input evaluation value of the content data stored in the evaluation value storage section;

in the recording, one or both of the new computed evaluation value and the new input evaluation value are recorded in the evaluation value storage section in connection with the content data; and in the transferring, one or both of the new computed evaluation value and the new input evaluation value are transferred to the portable reproduction apparatus.

50. The communication method according to claim 42, further comprising:
setting an input evaluation value corresponding to the content data stored in a content storage section of the information-processing apparatus based on a user input;
recording the computed evaluation value arithmetically operated in the arithmetically operating and the input evaluation value set in the setting, in the evaluation value storage section; and
controlling a display section to selectively display the computed evaluation value and the input evaluation value regarding the same content data stored in the evaluation value storage section.

51. The communication method according to claim 50, wherein, in the controlling, the input evaluation value is displayed preferentially to the computed evaluation value recorded in the evaluation value storage section on the display section.

52. The communication method according to claim 50, wherein, if the computed evaluation value is recorded but the input evaluation value is not recorded in the evaluation value storage section regarding specific content data, the computed evaluation value is displayed by the display section in the controlling; and,
if the input evaluation value regarding the specific content data is set in the setting, the input evaluation value is recorded in the evaluation value storage section, and in the controlling, the input evaluation value is displayed in place of the computed evaluation value on the display section.

53. The communication method according to claim 52, wherein, if, when the input evaluation value corresponding to the specific content data is displayed on the display section in the controlling, the reproduction history information of the specific content data is acquired from the portable reproduction apparatus in the acquiring or reproduction of the specific content data stored in a content storage section of the information-processing apparatus is performed in the reproducing,
the arithmetically operating is executed to arithmetically re-operate the computed evaluation value corresponding to the specific content data based on the reproduction history information of the specific content data acquired in the acquiring or on the reproduction history information of the specific content data reproduced in the reproducing, and
the recording is executed to update the computed evaluation value stored in the evaluation value storage section to the arithmetically re-operated new computed evaluation value.

54. The communication method according to claim 42, further comprising:
deciding whether or not a storage medium corresponding to the portable reproduction apparatus has a free capacity;
deleting, if the deciding decides that the storage medium does not have a free capacity, some of the content data stored in the storage medium corresponding to the portable reproduction apparatus in response to the computed evaluation value of the content data; and transferring some or all of the content data stored in a content storage section of the information-processing apparatus to the portable reproduction apparatus.

55. The communication method according to claim 42, wherein the reproduction history information includes content ID information of the content data reproduced by the portable reproduction apparatus and further includes information indicating how the content data is reproduced by the portable reproduction apparatus.

56. A communication method for a reproduction apparatus to communicate with an external apparatus, the method comprising:
reproducing one or more content data stored in a content storage section of the reproduction apparatus;
producing reproduction history information of the content data reproduced in the reproducing;
recording the reproduction history information into a reproduction history storage section of the reproduction apparatus;
transferring the reproduction history information, which is recorded in the reproduction history storage section, to the external apparatus in response to a request from the external apparatus;
acquiring a computed evaluation value of the content data arithmetically operated by the external apparatus at least based on the reproduction history information transferred to the external apparatus;
recording the computed evaluation value acquired in the acquiring into an evaluation value storage section of the reproduction apparatus in connection with the content data;
setting an input evaluation value corresponding to the content data stored in the content storage section in accordance with a user input; wherein
in the recording, the computed evaluation value acquired in the acquiring and the input evaluation value set in the setting are recorded in the evaluation value storage section in connection with the content data, wherein
in the transferring, one or both of the computed evaluation value and the input evaluation value corresponding to the content data stored in the evaluation value storage section are transferred to the external apparatus in response to the request from the external apparatus;
in the acquiring, one or both of a first new input evaluation value, which is arithmetically operated by the external apparatus based on the transferred computed evaluation value and the computed evaluation value stored in the external apparatus, and a second new input evaluation value, which is arithmetically operated by the external apparatus based on the transferred input evaluation value and the input evaluation value stored in the external apparatus, are acquired, and
in the recording, one or both of the computed evaluation value and the input evaluation value stored in the evaluation value storage section in connection with the content data are updated to one or both of the acquired new computed evaluation value and the acquired new input evaluation value, respectively.

57. The communication method according to claim 56, further comprising:
controlling a display section to selectively display the computed evaluation value and the input evaluation value regarding the same content data recorded in the evaluation value storage section.

58. The communication method according to claim 57, wherein in the controlling, the display section is controlled to display the input evaluation value preferentially to the computed evaluation value recorded in the evaluation value storage section.

59. The communication method according to claim 58, wherein, if the computed evaluation value is recorded but the input evaluation value is not recorded in the evaluation value storage section regarding specific content data, the display section is controlled to display the computed evaluation value at the display control step; and
if the input evaluation value regarding the specific content data is set in the setting, the input evaluation value is recorded in the evaluation value storage section in the recording in connection with the content data and the display section is controlled to display the input evaluation value in place of the computed evaluation value in the controlling.

60. The reproduction apparatus according to claim 59, wherein, in a mode where the display section is controlled to display the input evaluation value corresponding to the specific content data in the controlling,
the transferring, the acquiring and the recording are executed.

61. The communication method according to claim 56, further comprising:
receiving a deletion instruction for one or more content data stored in the content storage section; and
recording content identification information corresponding to the content data to be deleted in a deletion content storage section; wherein
in the transferring, the content identification information recorded in the deletion content storage section is transferred together with the reproduction history information of the specific content data to the external apparatus in response to the request from the external apparatus.

62. The communication method according to claim 56, further comprising:
firstly transferring the reproduction history information of the content data in response to the request from the external apparatus;
firstly acquiring, from the external apparatus, the computed evaluation value of the content data stored in the reproduction apparatus, the computed evaluation value being arithmetically operated by the external apparatus based at least on the reproduction history information;
firstly recording the computed evaluation value acquired in the acquiring into the evaluation value storage section in connection with the content data;
secondly transferring to the external apparatus the computed evaluation value recorded in the first recording;
secondly acquiring, from the external apparatus, a new computed evaluation value corresponding to the content data, the new computed evaluation value being arithmetically operated by the external apparatus based on the computed evaluation value transferred in the second transferring and the computed evaluation value stored in the external apparatus; and
secondly recording the new computed evaluation value acquired in the second acquiring in the evaluation value storage section in connection with the content data.

63. The communication method according to claim 62, further comprising:
deleting the reproduction history information stored in the reproduction history storage section after the first acquiring but before the second transferring.

64. The communication method according to claim 56, wherein the reproduction history information includes content ID information of the content data reproduced in the reproducing and further includes information indicating how the content data is reproduced in the reproducing.

65. A non-transitory computer-readable medium having instructions recorded thereon that when executed by a processor performs steps for an information-processing apparatus to communicate with a portable reproduction apparatus which reproduces content data, the steps comprising:
acquiring, from the portable reproduction apparatus, reproduction history information of the content data reproduced by the portable reproduction apparatus;
arithmetically operating a computed evaluation value corresponding to the content data based on the reproduction history information acquired in the acquiring;
transferring the computed evaluation value to the portable reproduction apparatus;
detecting that the portable reproduction apparatus is connected to the information-processing apparatus; wherein,
if the detecting detects that the portable reproduction apparatus is connected, the acquiring, the arithmetically operating and the transferring are executed; reproducing one or more content data stored in a content storage section of the information-processing apparatus;
producing reproduction history information of the content data reproduced in the reproducing;
recording the computed evaluation value arithmetically operated based on the reproduction history information of the content data reproduced in the evaluation value storage section; and
detecting that a continuous connection duration between the portable reproduction apparatus and the information-processing apparatus exceeds a specific time period; wherein,
if the continuous connection duration between the portable reproduction apparatus and the information-processing apparatus is detected to exceed the specific time period,
the arithmetically operating is executed to arithmetically re-operate the computed evaluation value, which is stored in the evaluation value storage section and corresponds to the content data stored in the portable reproduction apparatus, based on the reproduction history information newly produced in the producing, and
the transferring is executed to transfer the arithmetically re-operated computed evaluation value to the portable reproduction apparatus.

66. A non-transitory computer-readable medium having instructions recorded thereon that when executed by a processor performs steps for a reproduction apparatus to communicate with an external apparatus, the steps comprising:
reproducing one or more content data stored in a content storage section of the reproduction apparatus;
producing reproduction history information of the content data reproduced in the reproducing;
recording the reproduction history information into a reproduction history storage section of the reproduction apparatus;
transferring the reproduction history information, which is recorded in the reproduction history storage section, to the external apparatus in response to a request from the external apparatus;
acquiring a computed evaluation value of the content data arithmetically operated by the external apparatus at least based on the reproduction history information transferred to the external apparatus;
recording the computed evaluation value acquired in the acquiring into an evaluation value storage section of the reproduction apparatus in connection with the content data;
setting an input evaluation value corresponding to the content data stored in the content storage section in accordance with a user input; wherein
in the recording, the computed evaluation value acquired in the acquiring and the input evaluation value set in the setting are recorded in the evaluation value storage section in connection with the content data, wherein
in the transferring, one or both of the computed evaluation value and the input evaluation value corresponding to the content data stored in the evaluation value storage section are transferred to the external apparatus in response to the request from the external apparatus;
in the acquiring, one or both of a first new input evaluation value, which is arithmetically operated by the external apparatus based on the transferred computed evaluation value and the computed evaluation value stored in the external apparatus, and a second new input evaluation value, which is arithmetically operated by the external apparatus based on the transferred input evaluation value and the input evaluation value stored in the external apparatus, are acquired, and
in the recording, one or both of the computed evaluation value and the input evaluation value stored in the evaluation value storage section in connection with the content data are updated to one or both of the acquired new computed evaluation value and the acquired new input evaluation value, respectively.

* * * * *